United States Patent
Colafrancheschi et al.

(10) Patent No.: US 11,636,556 B2
(45) Date of Patent: *Apr. 25, 2023

(54) SYSTEMS AND METHODS FOR GENERATING AND UPDATING DYNAMIC DIGITAL TICKETS WITHIN A DIGITAL BOARD

(71) Applicant: Valeriy Stephanovich Skurikhin, Nobosibirsk Region (RU)

(72) Inventors: Alessandro Colafrancheschi, Johannesburg (ZA); Mikhail Vladimirovich Zybin, Nobosibirsk Region (RU); Anna Vladimirovna Zybina, Nobosibirsk Region (RU); Polina Vadimovna Zlobina, Nobosibirsk Region (RU); Mikhail Yur'evich Chagin, Moscow (RU); Valeriy Stephanovich Skurikhin, Nobosibirsk Region (RU)

(73) Assignee: Valeriy Stepanovich Skurikhin, Novosibirsk Region (RU)

( * ) Notice: Subject to any disclaimer, the term of this patent is extended or adjusted under 35 U.S.C. 154(b) by 37 days.

This patent is subject to a terminal disclaimer.

(21) Appl. No.: 17/348,301

(22) Filed: Jun. 15, 2021

(65) Prior Publication Data

US 2021/0312573 A1    Oct. 7, 2021

Related U.S. Application Data

(63) Continuation of application No. 16/358,318, filed on Mar. 19, 2019, now Pat. No. 11,069,006.

(Continued)

(51) Int. Cl.
*G06Q 50/02* (2012.01)
*G06Q 10/0631* (2023.01)
*G06Q 10/06* (2023.01)

(52) U.S. Cl.
CPC ............ *G06Q 50/02* (2013.01); *G06Q 10/06* (2013.01); *G06Q 10/063114* (2013.01)

(58) Field of Classification Search
CPC . G06Q 50/02; G06Q 10/06; G06Q 10/063114

(Continued)

(56) References Cited

U.S. PATENT DOCUMENTS

| | | | | |
|---|---|---|---|---|
| 9,344,529 B2 * | 5/2016 | Killpack | ............... | H04L 67/125 |
| 2006/0106539 A1 * | 5/2006 | Choate | .................. | G06Q 50/02 |
| | | | | 702/2 |

(Continued)

OTHER PUBLICATIONS

Smartphone based precise monitoring method for farm operation. Caicong, Wu; Lin, Zhou; Jie, Wang; Yaping, Cai. International Journal of Agricultural and Biological Engineering9.3: 111-121. International Journal of Agricultural and Biological Engineering (IJABE). (May 2016).*

(Continued)

*Primary Examiner* — Timothy Padot
(74) *Attorney, Agent, or Firm* — Dentons US LLP

(57) ABSTRACT

A communication application may include a request-response mechanism, which may enable real-time interaction between multiple users executing multiple tasks at multiple locations. Using the communication application, a first user may generate a digital ticket for the tasks, which may be shared with a second user. A response associated with the digital ticket by the second user may occur in a particular structured format within the communication application. The response may include location information of the second user and status of machines executing the tasks. The communication application may bring every user action and response data associated with the tasks into one unique digital board associated with the communication application. The digital board may create and implement a collab- (Continued)

orative network and successfully orchestrate value-exchanging interactions among the users in the data sharing ecosystem.

19 Claims, 40 Drawing Sheets

Related U.S. Application Data

(60) Provisional application No. 62/645,082, filed on Mar. 19, 2018.
(58) Field of Classification Search
USPC .......................................................... 705/7.15
See application file for complete search history.

(56) References Cited

U.S. PATENT DOCUMENTS

| | | | | |
|---|---|---|---|---|
| 2009/0164054 | A1* | 6/2009 | Peterson | G06Q 10/06 701/2 |
| 2011/0295638 | A1* | 12/2011 | Hunt | G06Q 50/02 705/7.15 |
| 2013/0304614 | A1* | 11/2013 | Christie | G06Q 10/08 705/29 |
| 2015/0025926 | A1* | 1/2015 | Green | G06Q 50/02 705/7.13 |
| 2016/0071410 | A1* | 3/2016 | Rupp | H04W 4/70 701/50 |

OTHER PUBLICATIONS

Applications of Information and Communication Technology for Improvements of Water and Soil Monitoring and Assessments in Agricultural Areas—A Case Study in the Taoyuan Irrigation District. Yu-Pin, Lin; Chang, Tsun-Kuo; Fan, Chihhao; Johnathen Anthony; Petway, Joy R; et al. Environments 4.1 MDPI AG. (Mar. 2017).*

New apps to streamline farming: mobile technology continues to spur productivity. Potter, Ben. Farm Journal 139.4: 65(1). Farm Journal Media. (Mar. 2015).*

Technology is king down on the farm. Gannett News Service [McLean] Dec. 2, 2012.*

Notification of Transmittal of the International Search Report and Written Opinion of the International Searching Authority, dated Jul. 15, 2019, issued in corresponding International Application PCT/IB2019/000277, 11 pages.

Spatial Information Collecting Methods and Its Data Application for Precision Agriculture Based on PDA, GPS Wu, Nen-Bo; Zhang, Shu-Hei; et al. Journal of Jilin University (Engineering and Technology Edition) 35.3: 323-328.

Smart farming system using sensors for agricultural task automation Chetan Dwarkani M., et al., 2015 IEEE Technological Innovation in ICT for Agriculture and Rural Development (TIAR), Chennai, 2015, pp. 49-53.

Mobile farm equipment as a data source in an agricultural service architecture. George Steinberger, et al., Computers and Electronics in Agriculture, vol. 65, Issue 2, 2009, pp. 238-246.

* cited by examiner

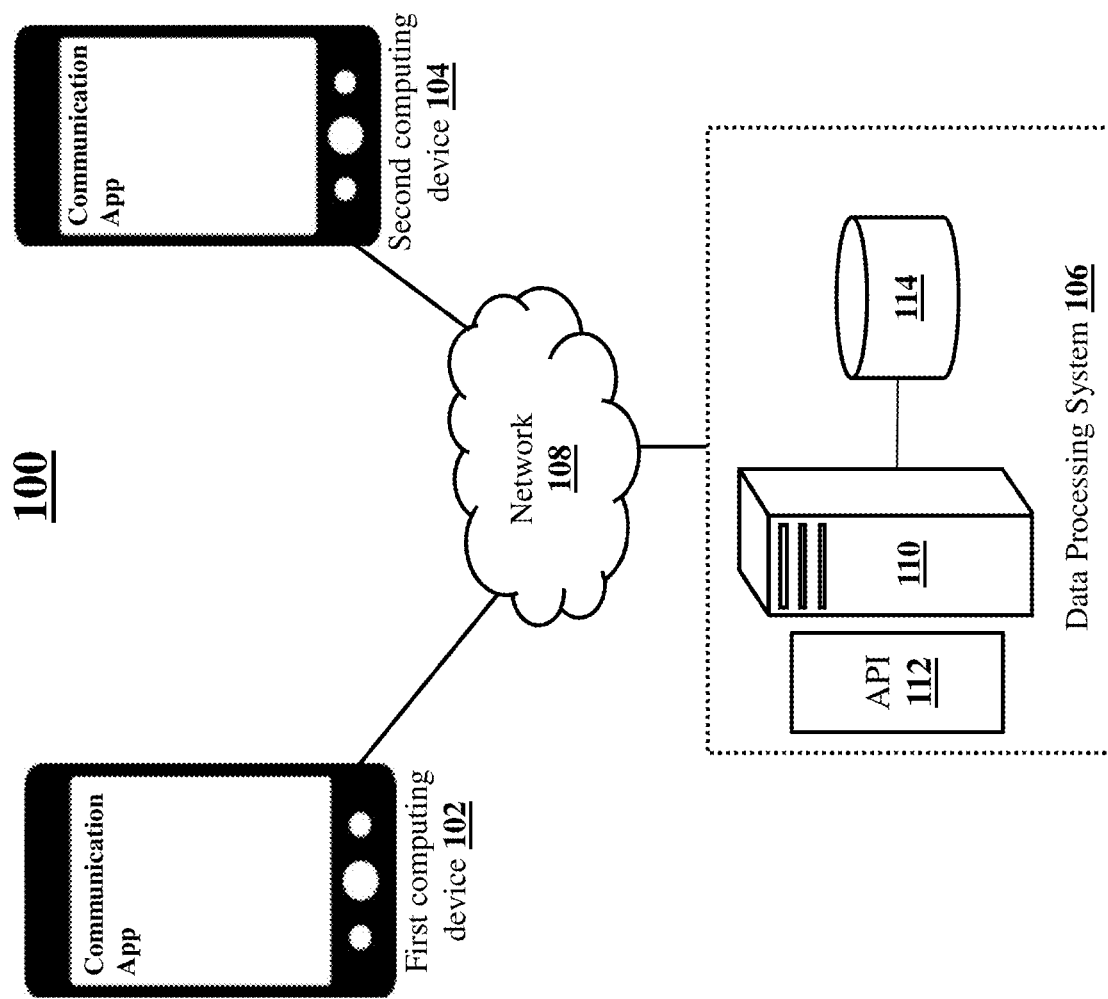

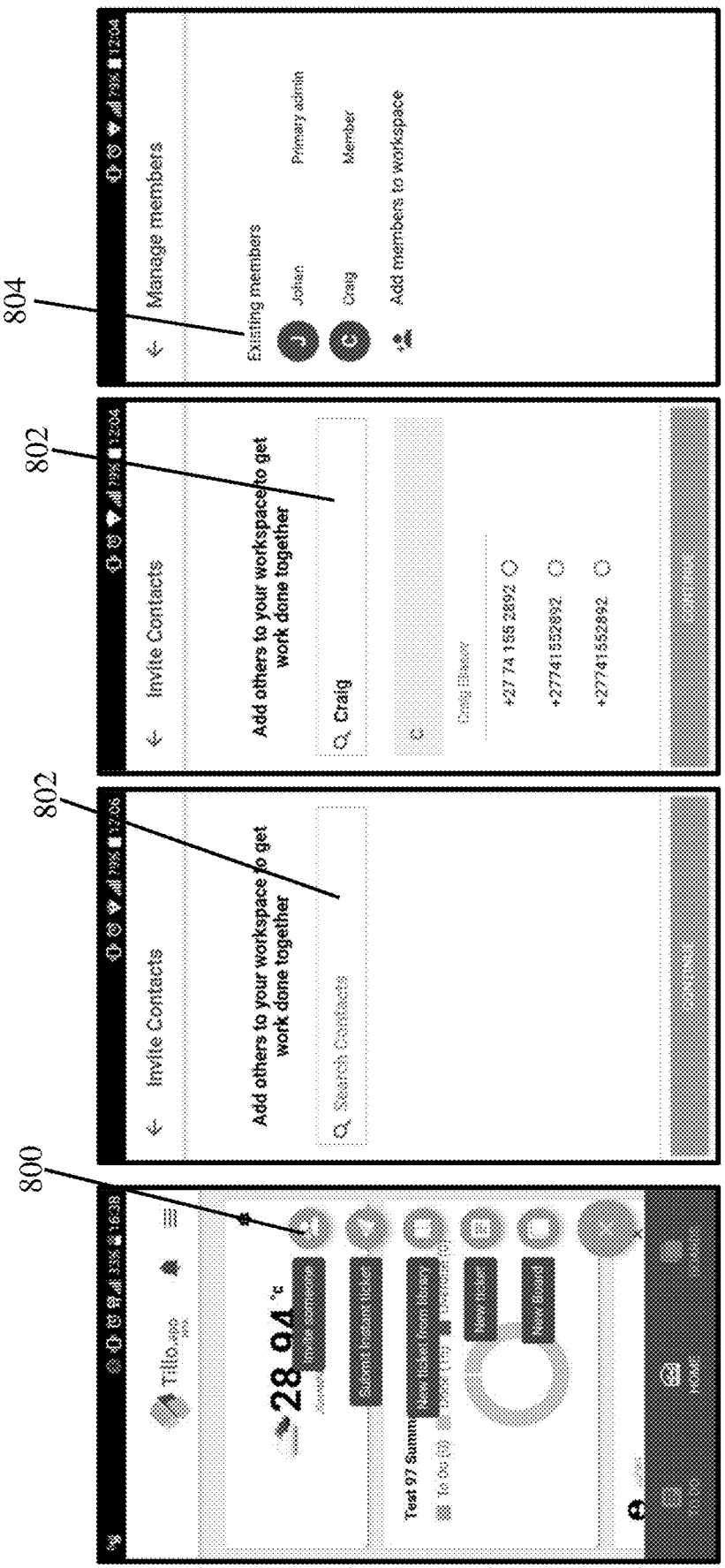

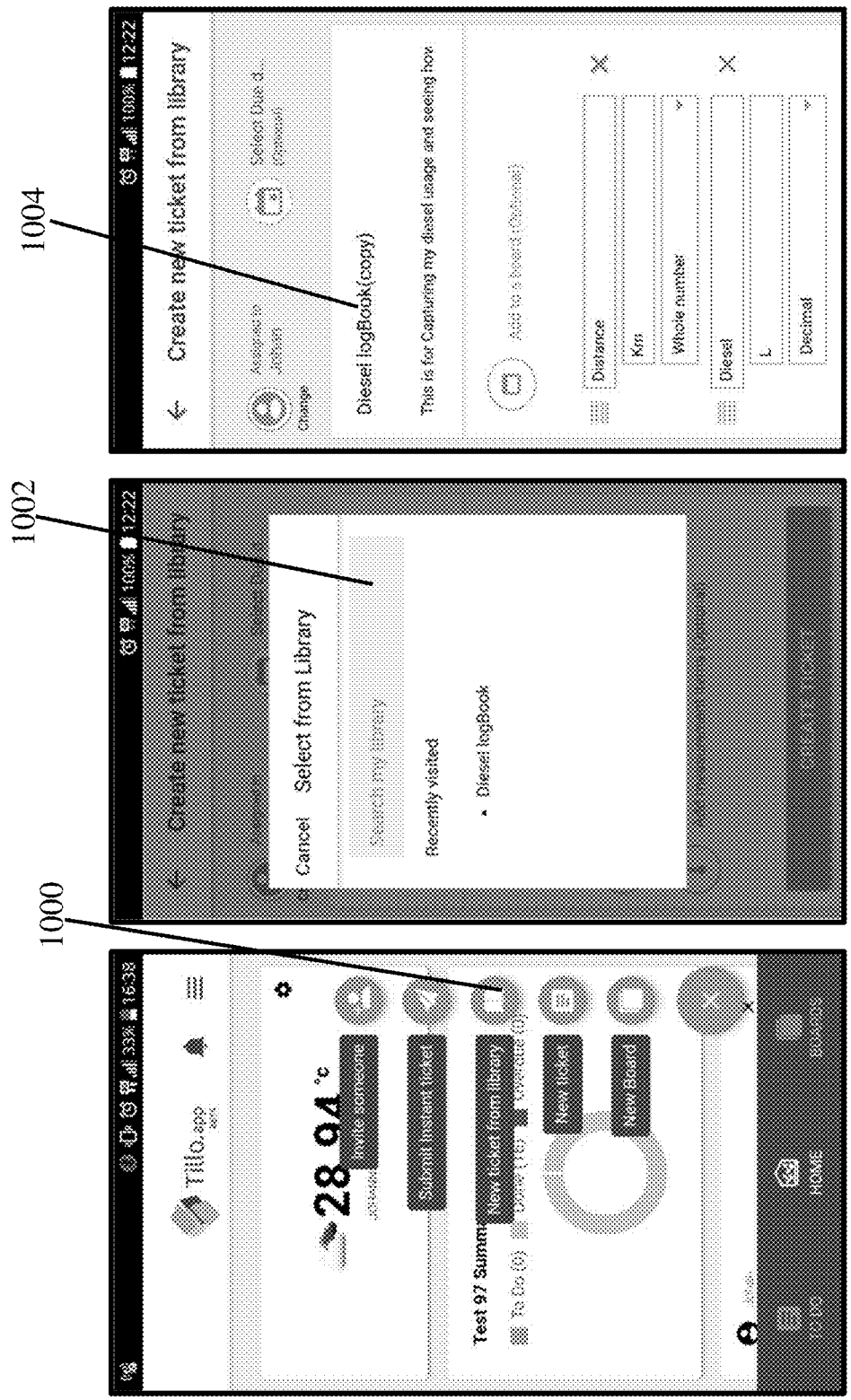

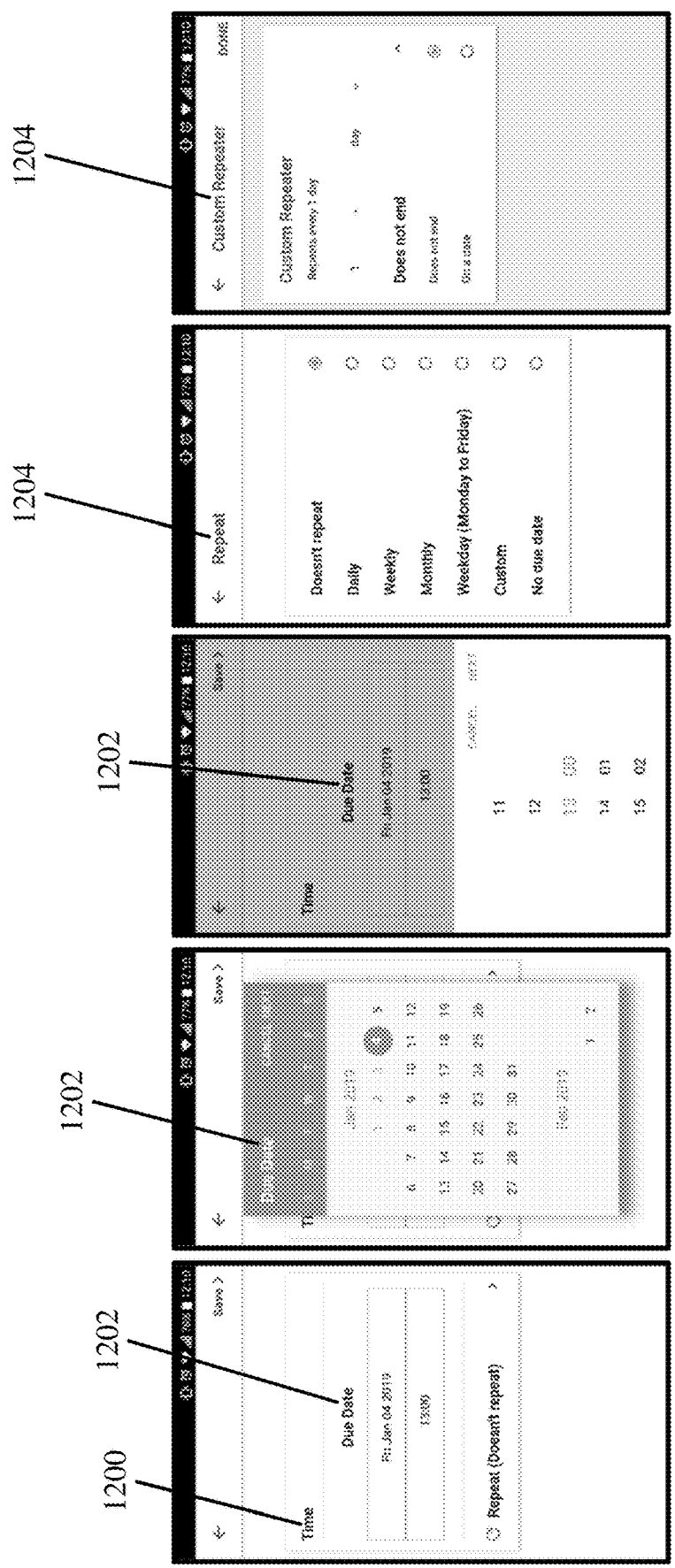

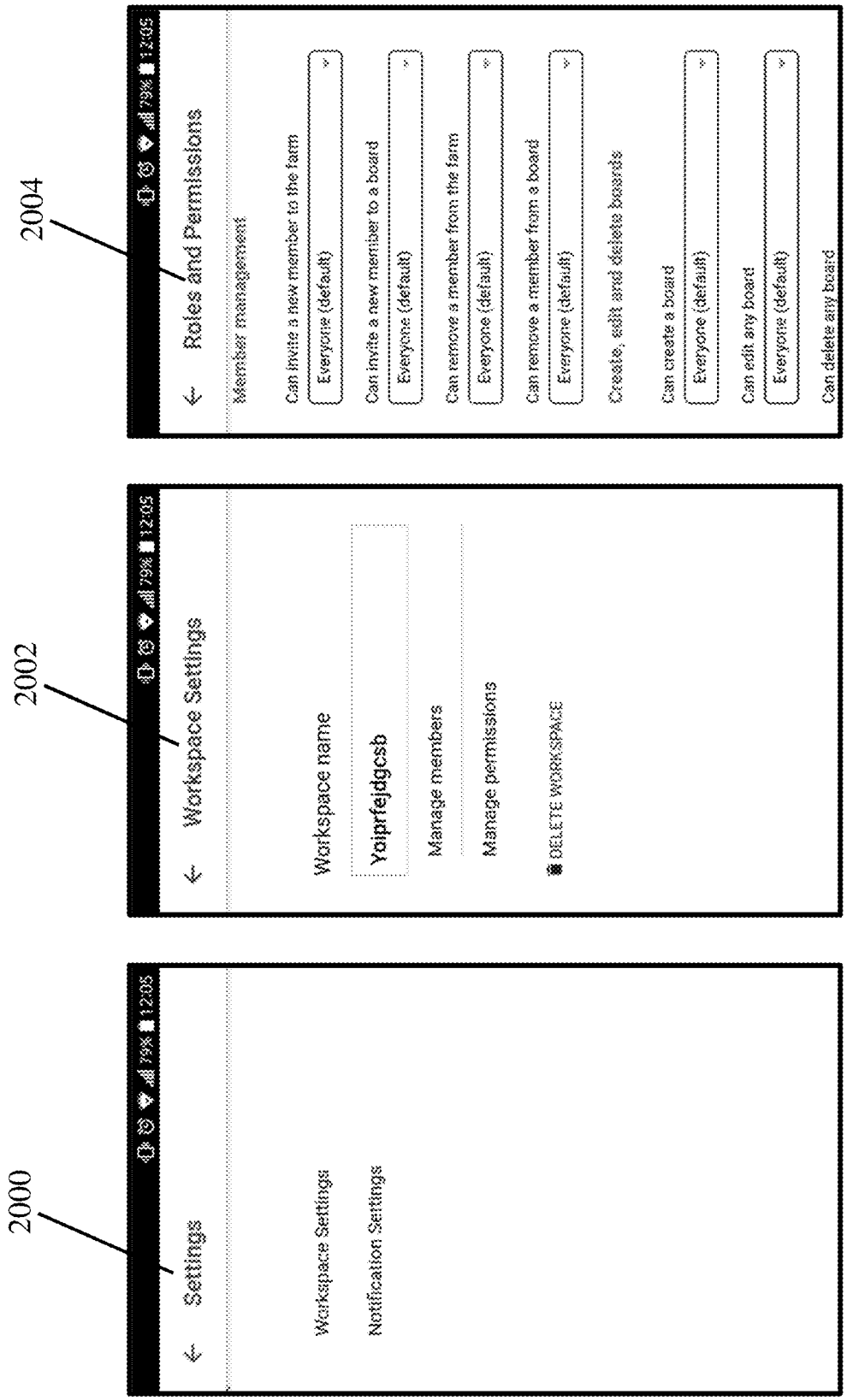

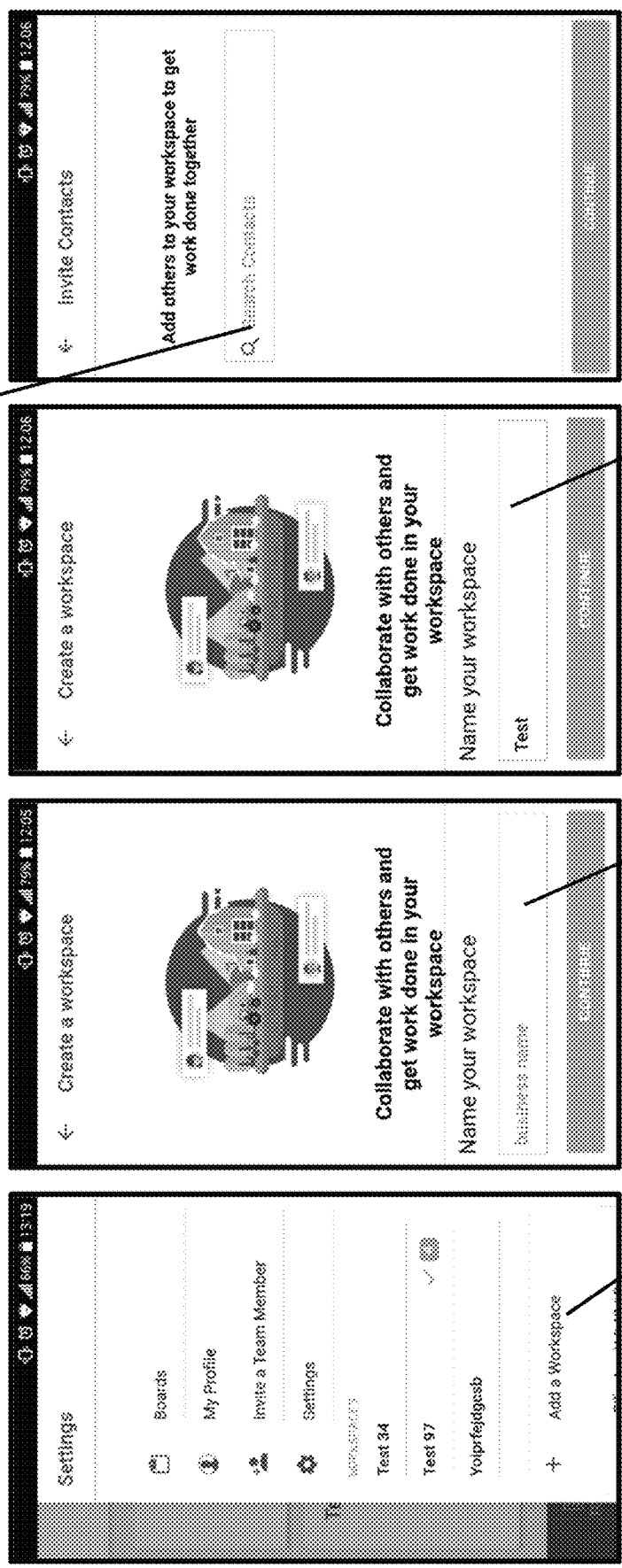

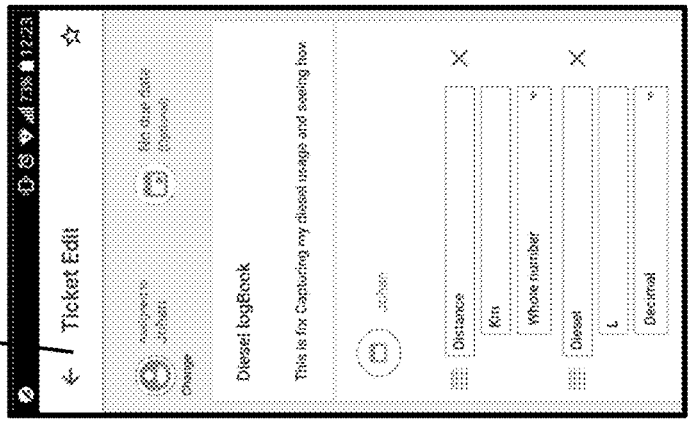
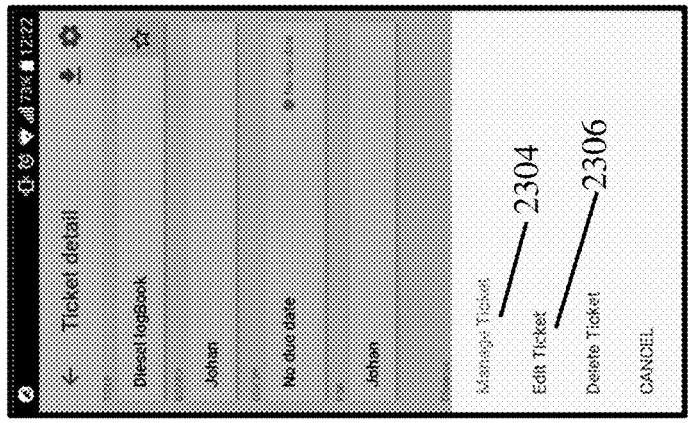
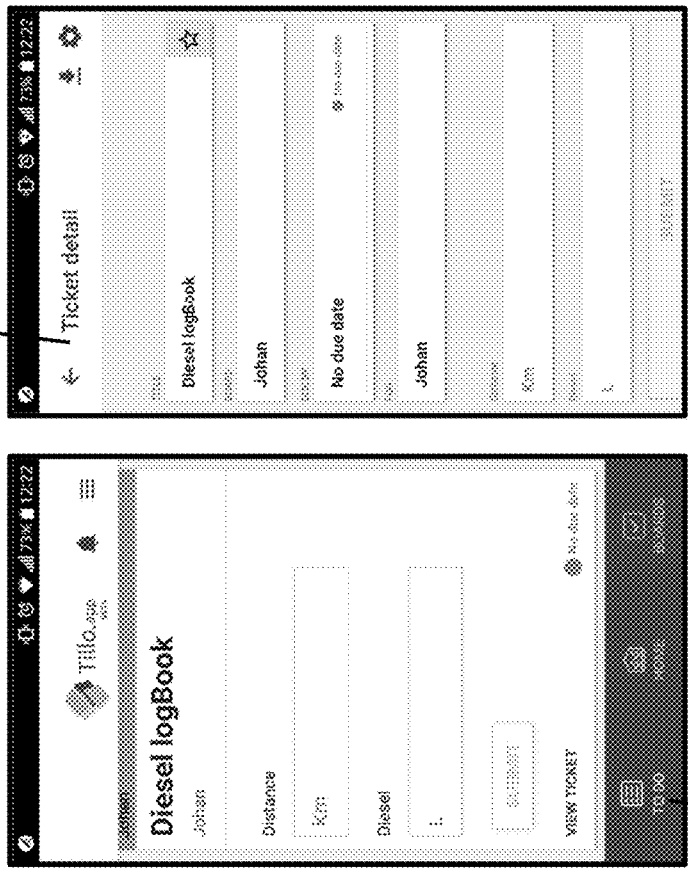
FIG. 23A     FIG. 23B     FIG. 23C     FIG. 23D

FIG. 34

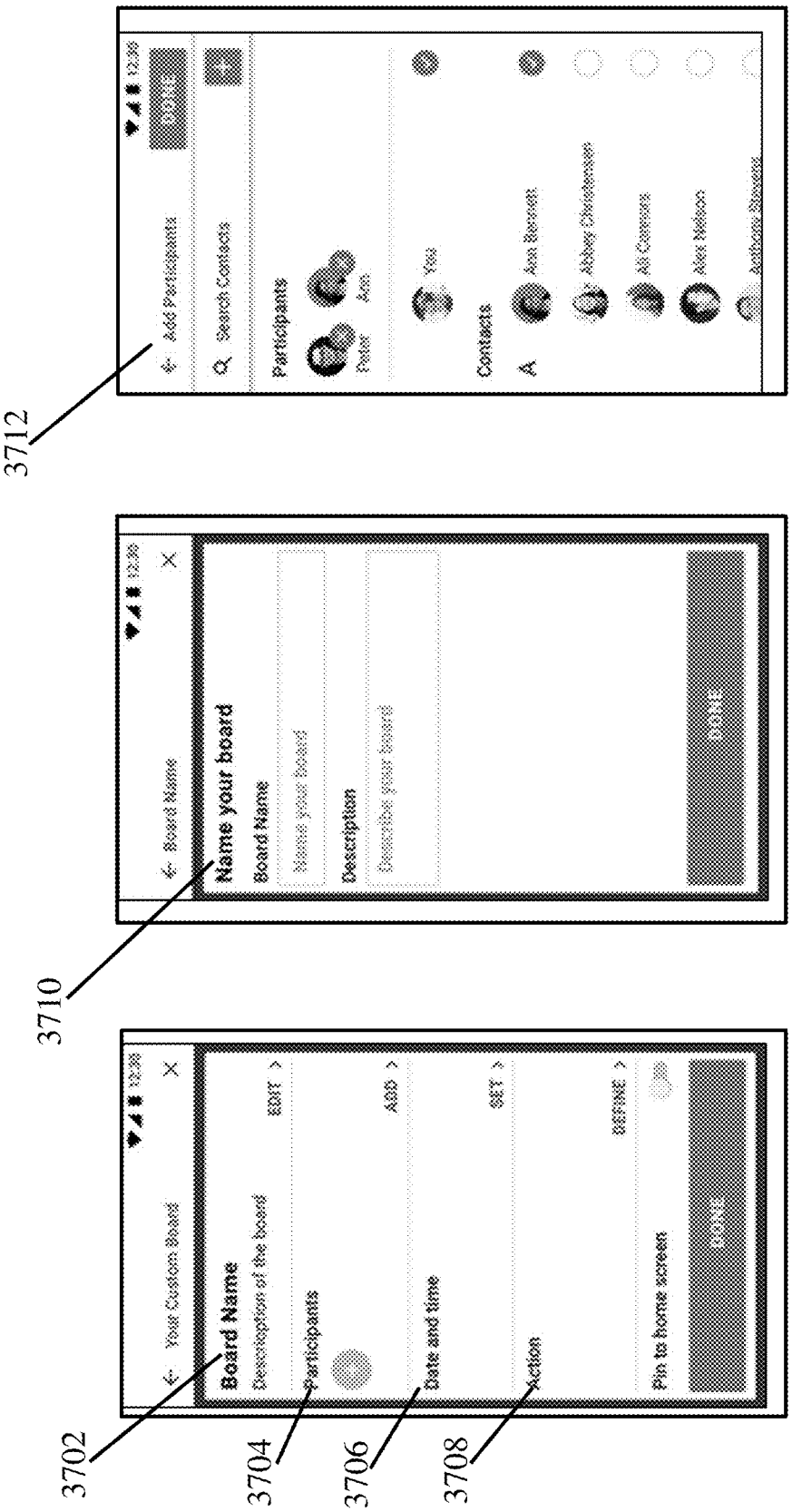

SYSTEMS AND METHODS FOR GENERATING AND UPDATING DYNAMIC DIGITAL TICKETS WITHIN A DIGITAL BOARD

CROSS-REFERENCE TO RELATED APPLICATIONS

This application is a continuation of and claims the benefit of the earlier filing date of U.S. patent application Ser. No. 16/358,318 filed Mar. 19, 2019, allowed, which claims the benefit of the earlier filing date of U.S. Provisional Patent Application No. 62/645,082, filed on Mar. 19, 2018, both of which are hereby incorporated by reference in their entireties to the extent permitted by law.

TECHNICAL FIELD

This application relates generally to the field of dynamic digital tickets, and more specifically to methods, systems, and computer program products for generating and updating dynamic digital tickets within digital boards.

BACKGROUND

Conventional mobile communication tools (e.g., mobile applications) are inadequate for data capture and data sharing. These tools merely capture and store communications between the different entities. For example, messaging platforms such as WHATSAPP® or FACEBOOK MESSENGER® support groups and group conversations. The group conversations are limited to text, audio, video, or icons. There is no mechanism or tool for structured data capture and sharing of the captured data.

In addition to the inadequacy of the conventional mobile communication tools for data capture and sharing, there is no mechanism for digital recordkeeping based on the communications within the mobile communication tools. All the conventional communication tools provide is an archive for the messages that are passed around. Although the archived message may be text searched, there are no data structures for digital recordkeeping based upon captured and shared data.

A farm typically has multiple and parallel farming operations distributed across various locations and performed by a combination of people and machinery. For example, ploughing and sowing operations may be in a parcel of land and may involve a tractor and a tractor operator. Pasturing operations may involve transporting cattle from corral to pasture and not involve any machinery. The technical challenge therefore is to track, share, and digitally record the statuses and/or any other information of these varied operations. Furthermore, as farming involves various on-field (e.g., outdoor operations), the digital tools for tracking, sharing, and digital recordkeeping have to be supported by mobile devices and/or any other type of embedded devices.

However, as described above, the conventional mobile applications do not adequately address the aforementioned technical challenge.

SUMMARY

What is therefore needed are digital tracking, sharing, and recordkeeping systems and methods for farming operations or any other type of operations. What is further needed are the systems and methods that can be hosted by and performed by mobile devices such as smartphones.

Embodiments disclosed herein attempt to solve the aforementioned technical problems and may provide other benefits as well. An illustrative communication system may include an arrangement of hardware components and software algorithms, which may be configured to generate and update dynamic digital tickets within a digital board. The digital board is presented on a communication application, which is being executed on computing devices of the participants. The digital tickets may be associated with the one or more tasks, which have to be performed by one or more participants at the one or more locations using one or more machines. The digital tickets may be updated based on real-time data associated with the execution of the one or more tasks by the one or more participants. The real-time data may include location data associated with the participants and status of the one or more machines being used to execute the one or more tasks. Using the real-time sharing of the data between the computing devices of the participants operating at different locations via the dynamic updating of the digital tickets, the communication system may enable efficient and structured interactions associated with the one or more tasks on the digital board between the participants.

In one embodiment, a computer-implemented method may include generating, by a first instance of an application in a first computer, a digital board associated with a farm project within a workspace associated with a first type of farm operation; generating, by the first instance of the application in the first computer, a digital ticket within the digital board, the digital ticket configured for a farm task associated with the farm project, and the digital ticket including a data template configured to receive data records associated with the farm task; transmitting, by the first instance of the application in the first computer, the digital ticket to a second instance of the application in a second computer; receiving, by a second instance of the application in a second computer, the digital ticket transmitted by the first instance of the application in the first computer; in response to the second instance of the application in the second computer receiving an indication to activate the digital ticket; continuously tracking, by the second instance of the application in the second computer, the geolocation of the second computer; continuously retrieving, by the second instance of the application in the second computer, dispensing data through an application programming interface of a farm machinery associated with the farm task; continuously updating, by the second instance of the application in the second computer, the digital ticket based on the continuously tracked geolocation and continuously retrieved dispensing data; determining, by the second instance of the application in the second computer, that the farm task is complete based upon the continuous updates to the digital ticket; and transmitting, by the second instance of the application in the second computer to the first instance of the application in the first computer, a final updated digital ticket and a notification that the farm task is complete.

In another embodiment, a system may include a first computer having a first application of an application, wherein the first instance of the application in the first computer is configured to: generate a digital board associated with a farm project within a workspace associated with a first type of farm operation; generate a digital ticket within the digital board, the digital ticket configured for a farm task associated with the farm project, and the digital ticket including a data template configured to receive data records associated with the farm task; transmit the digital ticket to a second instance of the application in a second computer, wherein the second instance of the application in the second computer is configured to: receive a second instance of the application in a second computer, the digital ticket transmitted by the first instance of the application in the first computer; in response to the second instance of the application in the second computer receiving an indication to activate the digital ticket; continuously track the geolocation of the second computer; continuously retrieve dispensing data through an application programming interface of a farm machinery associated with the farm task; continuously update the digital ticket based on the continuously tracked geolocation and continuously retrieved dispensing data; determine that the farm task is complete based upon the continuous updates to the digital ticket; and transmit to the first instance of the application in the first computer, a final updated digital ticket and a notification that the farm task is complete.

BRIEF DESCRIPTION OF THE DRAWINGS

The accompanying drawings constitute a part of this specification and illustrate embodiments of the subject matter disclosed herein.

FIG. 1A shows a communication system for enabling interaction between users executing one or more tasks at one or more locations, according to an embodiment.

FIG. 8A shows a graphical user interface showing a webpage of a communication application executing on a computing device, according to an embodiment.

FIG. 8B shows a graphical user interface showing a webpage of a communication application executing on a computing device, according to an embodiment.

FIG. 8C shows a graphical user interface showing a webpage of a communication application executing on a computing device, according to an embodiment.

FIG. 8D shows a graphical user interface showing a webpage of a communication application executing on a computing device, according to an embodiment.

FIG. 10A shows a graphical user interface showing a webpage of a communication application executing on a computing device, according to an embodiment.

FIG. 10B shows a graphical user interface showing a webpage of a communication application executing on a computing device, according to an embodiment.

FIG. 10C shows a graphical user interface showing a webpage of a communication application executing on a computing device, according to an embodiment.

FIG. 12A shows a graphical user interface showing a webpage of a communication application executing on a computing device, according to an embodiment.

FIG. 12B shows a graphical user interface showing a webpage of a communication application executing on a computing device, according to an embodiment.

FIG. 12C shows a graphical user interface showing a webpage of a communication application executing on a computing device, according to an embodiment.

FIG. 12D shows a graphical user interface showing a webpage of a communication application executing on a computing device, according to an embodiment.

FIG. 12E shows a graphical user interface showing a webpage of a communication application executing on a computing device, according to an embodiment.

FIG. 20A shows a graphical user interface showing a webpage of a communication application executing on a computing device, according to an embodiment.

FIG. 20B shows a graphical user interface showing a webpage of a communication application executing on a computing device, according to an embodiment.

FIG. 20C shows a graphical user interface showing a webpage of a communication application executing on a computing device, according to an embodiment.

FIG. 22A shows a graphical user interface showing a webpage of a communication application executing on a computing device, according to an embodiment.

FIG. 22B shows a graphical user interface showing a webpage of a communication application executing on a computing device, according to an embodiment.

FIG. 22C shows a graphical user interface showing a webpage of a communication application executing on a computing device, according to an embodiment.

FIG. 22D shows a graphical user interface showing a webpage of a communication application executing on a computing device, according to an embodiment.

FIG. 23A shows a graphical user interface showing a webpage of a communication application executing on a computing device, according to an embodiment.

FIG. 23B shows a graphical user interface showing a webpage of a communication application executing on a computing device, according to an embodiment.

FIG. 23C shows a graphical user interface showing a webpage of a communication application executing on a computing device, according to an embodiment.

FIG. 23D shows a graphical user interface showing a webpage of a communication application executing on a computing device, according to an embodiment.

FIG. 34 shows a graphical user interface showing a list of tasks on a communication application executing on a computing device, according to an embodiment.

FIG. 37A shows a graphical user interface showing a process for editing a digital board in a communication application executing on a computing device, according to an embodiment.

FIG. 37B shows a graphical user interface showing a process for adding a name of a digital board in a communication application executing on a computing device, according to an embodiment.

FIG. 37C shows a graphical user interface showing a process for adding participants in a digital board in a communication application executing on a computing device, according to an embodiment.

DETAILED DESCRIPTION

Figure 1B:
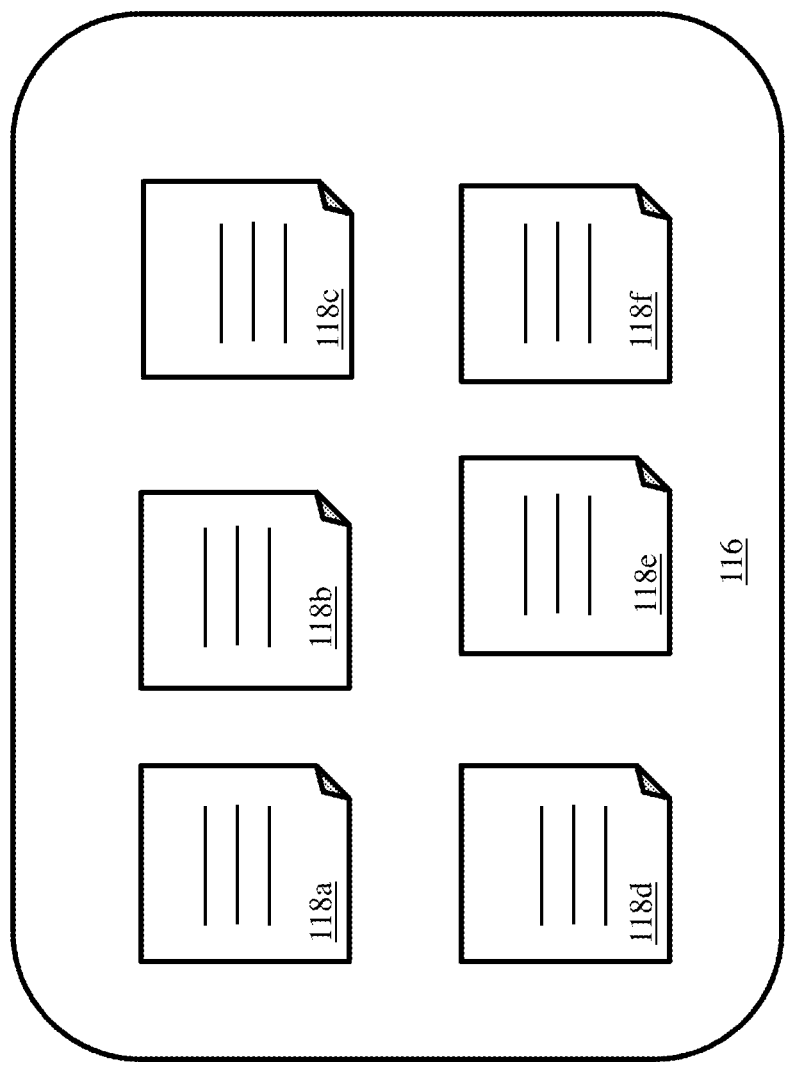
FIG. 1B shows a board containing multiple tickets, according to an embodiment.
Figures 2A, 2B, 2C:
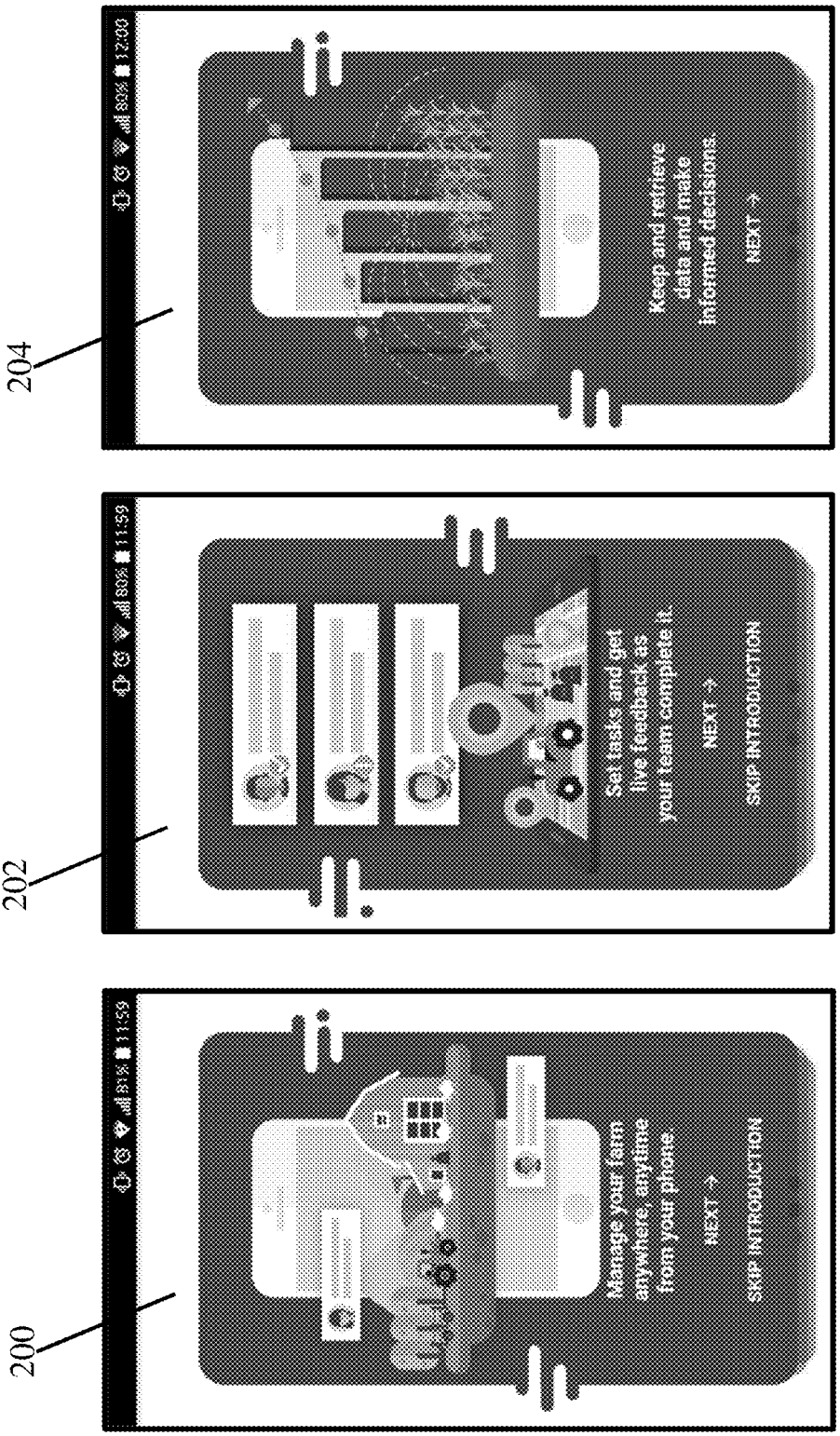
FIG. 2A shows a graphical user interface showing a webpage of a communication application executing on a computing device, according to an embodiment.
FIG. 2B shows a graphical user interface showing a webpage of a communication application executing on a computing device, according to an embodiment.
FIG. 2C shows a graphical user interface showing a webpage of a communication application executing on a computing device, according to an embodiment.

As noted above, and as easily understood herein, the invention is applicable to a variety of projects and operations not just farm projects and operations. Farm projects and operations are used herein as just one exemplary application.

Embodiments disclosed herein describe systems and methods for generating and updating dynamic digital tickets within digital boards. A digital board may be associated with a project (as one example, a farm project) and the dynamic digital tickets may be configured for a task (as one example, a farm task) within the project (as one example, a farm project). The digital boards and the dynamic digital tickets may be implemented within an application such as a mobile phone application (also referred to as communication application). Once a dynamic digital ticket is instantiated within a corresponding digital board, the associated participants may update the dynamic digital ticket. Furthermore, the mobile phone application may automatically update the dynamic digital ticket based upon data such as geolocation data or data retrieved from application programming interfaces (APIs) of other devices. The mobile phone application (or any other computing system) may use the updates to the dynamic digital ticket for digital recordkeeping.

The digital board may be associated with a set of parameters. The set of parameters may include title, participants, time, and action. The communication application may be configured to bring every user action into one unique digital board. The user actions may include, but not limited to, measurement of information, communication between the users, task planning, and execution control associated with data, such as, operation data (as one example, farm operation data).

The digital board may be configured to create and implement a collaborative communication network. The digital board may orchestrate value-exchanging interactions among the users in the data sharing ecosystems using information about the various users. The data sharing ecosystems may be multifarious, diversified, and comprehensive, in response to rapidly evolving farming markets, and requirements of the users or other interested parties. The other interested parties may not necessarily be the users of the communication application. The other interested parties may cause a different software program to be integrated with the communication application, and thereby allowing cooperation of the communication application with the different software program.

Using the digital board, the users may invite and connect with other users, and share content, data, and various tasks within the digital board with the other users. During the sharing and communication process, the digital board may work as a container of all the farm data shared between the users. The users may communicate, via a messaging chat application, in each digital board. During the communication session, communication data may be generated. All the communication data may be stored for easy and convenient 'anywhere, anytime' access by the users via the communication application.

The users may execute instructions to create the dynamic digital tickets (also referred to as digital tickets) within the digital board, and assign specific tasks to other users along with selected time ranges and instructions. The users may input the data on the digital board, via automated software-generated input, where the users may connect to pre-defined data providers (for example, plug-and-play infrastructure via built-in APIs). The users may customize and personalize the form and the view of the digital boards, which may result in tailored presentation of the digital ticket on the digital board.

The communication application may solve 'in-the-farm' problems, such as, user management, farming tasks planning and control, farming activities planning and control, farming record-keeping, and real-time communication between the users. The communication application may save time for the users for management of the farm data, and get things done in the farm by eliminating the use of paper and inefficient ways of communication among the users of the farm. The communication application may provide a platform for an easy input of data for the users, via a digital board framework, which may include subject matter information and user's information.

A computing device (e.g., a mobile phone) may execute a communication application, which may facilitate interaction between two or more users via a digital board associated with the communication application. During the interaction, transfer of electronic data messages may occur between the computing devices of the users. A user may command the communication application to transmit a task or share farm data with other users, via a data processing system, which may host the digital board. The data processing system may be associated with various social media processing systems, which may provide instructions to the data processing system to transmit task from the digital board associated with a first user to the same digital board associated with a second user.

Although the communication application described herein as taking a form of a messaging application on the computing devices, it should be appreciated that some embodiments are not limited to such a form factor. For instance, in some cases, the users may access the data processing system via a website. The data processing system may include a webserver in communication with an application server, which may be configured to perform various processes and tasks described herein. The user may access the data processing system through a native application (e.g., the communication application) installed on a local computing device of the user, which was downloaded from a server of the data processing system. Additionally or alternatively, the user may access the data processing system through an Internet browser application through which the user may provide various process instructions to the webserver of the data processing system. Other embodiments of the communication application may include a messaging application, executed by the computing device, through which the user interfaces with the data processing system, via a chat messaging interface, on the computing device of the user. The data processing system may then perform various tasks and processes described herein, based upon the chat-based (e.g., SMS (short messenger service), IMESSAGE®) instructions received from the computing device of the user.

When the user having an account associated with the communication application uses the computing device to execute the communication application to share information with other users on the digital board, the user may be required to enter login details to access the communication application on the computing device. Upon the entry of login information by the user, the data processing system that runs (e.g., executes and controls the functional behavior of) the communication application may execute a layer of security protocols to verify an identity of the user. For instance, upon entry of the login information in the communication application, the user may receive a code on the computing device of the user. The user may enter the code into a graphical user interface associated with webpages of the communication application on the computing device to verify that the account being accessed by the user belongs to the user. When the code entered by the user is correct, the data processing system may allow the user to access the communication application on the computing device, to access digital board, create digital tickets, and share and view the data corresponding to the digital ticket on the digital board associated with the communication application.

A communication system (e.g., a system that manages communication application, the digital board, and the digital tickets) may be configured for aggregating the data associated with the farm operation from different devices on a real-time basis. For example, the communication system may aggregate the operation data and the location data from a first device of a first farm user assigned to manage livestock and from a second device of a second farm user assigned to crop management. The communication system may analyze aggregated data to generate various results, such as, characteristics of the farm harvest, volume of the farm harvest, information about efficiency of farming, and farm production. The results may include various statistics, which may be shared with a bank, an official body or any other party who needs and requests such statistics with the consent of the user according to privacy policy agreement. The communication system may present the data in various types of graphical illustrative forms, which may be used for making management decisions. Furthermore, the communication system may use the historical data, and predict future results. For example, based on crop yields and weather data over a period of time for a parcel of land, the communication system may predict future crop yields for the parcel of land. The communication system may present the predictions in various types of graphical illustrative forms on user interfaces associated with the digital board.

Reference will now be made to the embodiments in the drawings, and specific language will be used here to describe the same. It will nevertheless be understood that no limitation of the scope of the claims or this disclosure is thereby intended. Alterations and further modifications of the features explained herein, and additional applications of the principles of the subject matter explained herein, which would occur to one skilled in the relevant art and having possession of this disclosure, are to be considered within the scope of the subject matter disclosed herein. The present disclosure is here described in detail with reference to embodiments explained in the drawings, which form a part here. Other embodiments may be used and/or other changes may be made without departing from the spirit or scope of the present disclosure. The embodiments described in the detailed description are not meant to be limiting of the subject matter presented here.

FIG. 1A shows a communication system 100. The communication system 100 may include hardware components and software algorithms, which may enable interaction between users working on a farm, and aggregate farm operation data acquired from the users. The farm operation data may be obtained from individual users in a real-time basis. The communication system 100 may process the farm operation data, and generate graphical displays of statistical data of, for example, characteristics and volume of crop yields, productivity of the soil, productivity of the users, and efficiency of the farm operation. The communication system 100 may allow sharing of the aggregated farm operation data and the processed farm operation data to third parties, such as, a bank, an official body, or any other counterparty, which may need or request such data.

The communication system 100 may generate useful historical data based on real-time feed associated with the farm operation data, which may be used for data-driven decision making in a farming context. The farming context and the farming examples described therein are merely exemplary, and should not be construed to limit the scope of this disclosure. The farming example is chosen merely for the ease of explanation. The embodiments disclosed herein are equally applicable to other collaborative situations, wherein multiple users scattered across multiple locations in any industry may exchange and keep track of information and action items. For instance, the embodiments disclosed herein may be used in various types of industrial operations, such as, vehicle fleet management and warehouse operations.

The communication system 100 may include a first computing device 102 (for example, a first farmer device 102), a second computing device 104 (for example, a second farmer device 104), a data processing system 106, and a network 108. The data processing system 106 may include a server 110, an application programming interface (API 112), and a database 114.

The first computing device 102, the second computing device 104, and the data processing system 106 communicate with each other over a network 108. The server 110 and the database 114 communicate with each other over the network 108. The network 108 may include, but is not limited to, private or public local area network, wireless local area network, metropolitan area network, wide-area network, and the Internet. The network 108 may further include both wired and wireless communications according to one or more standards via one or more transport mediums. The communication over the network 108 may be performed in accordance with various communication protocols such as transmission control protocol and internet protocol, user datagram protocol, and institute of electrical and electronics engineers communication protocols. The network 108 may further include wireless communications according to Bluetooth specification sets, or another standard or proprietary wireless communication protocol. The network 108 may further include communications over a cellular network, including, for example, a global system for mobile communications, code division multiple access, and enhanced data for global evolution network.

In operation, a first farmer device, such as, the first computing device 102 and a second farmer device, such as, the second computing device 104 may share data (such as, farm data) on a digital board accessible via a common communication application (such as, a farm data sharing application) available on the first computing device 102 and the second computing device 104. For instance, the first computing device 102 may execute the communication application. A first user may use the communication application to generate the digital board. The first user may assign a second user to the digital board. The first user may generate a digital ticket within the digital board. The digital ticket may include one or more tasks for the second user. The digital ticket may include one or more instructions and datasets associated with the one or more tasks. The communication application of the first computing device 102 may share the digital board and the digital ticket with the communication application of the second computing device 104. The communication application of the second computing device 104 may track location of the second computing device 104 operated by the second user when the second user is executing the one or more tasks. The communication application of the second computing device 104 may further track status of one or more machines used by the second user to execute the one or more tasks. The communication application of the second computing device 104 may process information associated with the status of the one or more machines and the location data of the second user to determine whether the one or more tasks are completed. Upon determining that the one or more tasks are completed, the communication application of the second computing device 104 may update the digital ticket. Updated digital ticket may include a message that the one or more tasks are completed. The communication application of the second computing device 104 may transmit the updated digital ticket to the communication application of the first computing device 102. The first computing device 102 may review information associated with the updated digital ticket. The first computing device 102 may parse the information associated with the updated digital ticket to review the information. The first computing device 102 may close the updated digital ticket upon confirming that one or more tasks have been completed by the second user.

A first computing device 102 may be a portable or non-portable computing device with a processor that performs one or more operations according to one or more programming instructions. The examples of the first computing device 102 may include, but are not limited to, a mobile phone, a cellular phone, a tablet computer, a smart watch, a personal data assistant, a laptop, or a personal computer. The first computing device 102 may be capable of communicating with the data processing system 106 through the network 108 using wired or wireless communication capabilities.

A second computing device 104 may be a portable or non-portable computing device with a processor that performs one or more operations according to one or more programming instructions. The examples of the second computing device 104 may include, but are not limited to, a mobile phone, a cellular phone, a tablet computer, a smart watch, a personal data assistant, a laptop, or a personal computer. The second computing device 104 may be capable of communicating with the data processing system 106 through the network 108 using wired or wireless communication capabilities.

The first computing device 102 and the second computing device 104 may include one or more input/output devices. The input/output devices may be configured to allow the user interaction with one or more programs. The programs may be configured to communicate with the data processing system 106 to perform exchange and management of the data through the server 110. The user may have a communication application installed on the first computing device 102 from which the user may access and interact with the data processing system 106 to perform exchange and management of the data. The communication application may be a software stack running on an operating system of the first computing device 102 and the second computing device 104. The communication application may have a protocol layer and a user interface layer where each layer may be responsible for specific functions. The protocol layer may communicate with the operating system of the first computing device 102 and the second computing device 104. The protocol layer may manage the connections of the first computing device 102 and the second computing device 104 over the network 108. The protocol layer may communicate with the user interface layer. The protocol layer may be arranged to control the user interface layer to present the data to the user, via the user interface of the communication application, on the first computing device 102 and the second computing device 104, and to receive the data from the user, via the user interface of the communication application, on the first computing device 102 and the second computing device 104.

The user may have the communication application installed on the first computing device 102 and the second computing device 104, from which the user may access and interact with the server 110, to perform exchange and management of the data. The user may access features of the communication application, via a social networking application, to perform farm data transmission transactions. The social networking application may be a software stack running on an operating system of the first computing device 102 and the second computing device 104. The social networking application may have a protocol layer and a user interface (or a digital board) layer where each layer may be responsible for specific functions. The protocol layer of the social networking application may communicate with the operating system of the first computing device 102 and the second computing device 104. The protocol layer may manage the connections of the first computing device 102 and the second computing device 104 over the network 108. The protocol layer may communicate with the user interface layer. The protocol layer may be arranged to control the user interface layer, to present the data to the user, via the user interface of the social networking application, on the first computing device 102 and the second computing device 104, and to receive the data from the user, via the user interface of the social networking application, on the first computing device 102. The protocol layer may communicate with the user interface layer, and may be arranged to control the user interface layer, to present information to the user, via the user interface of the social networking application, on the first computing device 102 and the second computing device 104, and to receive the data from the user, via the user interface of the social networking application, on the first computing device 102.

The first computing device 102 may run a web browser, which may access and present a communication application to be executed by a processor of the first computing device 102, the second computing device 104, or the server 110. The first computing device 102 may allow the user to perform farm data exchange and management transactions using the communication application on the first computing device 102 as well as the second computing device 104. The user may execute the communication application to present a digital board. The digital board may be accessed to generate a digital ticket. The digital ticket may include tasks assigned for multiple users and responses by the multiple users for the assigned tasks. The first computing device 102 and the second computing device 104 may execute the communication application outside of a web browser, for example, an operating system-specific communication application, which may access and present processed data. The processor of the first computing device 102, the second computing device 104, or the server 110 may process the data to generate the processed data in order to perform the farm data exchange and management transactions.

The first computing device 102 and the second computing device 104 may store the data associated with the farm information exchange and the management transactions, which may be performed by the user, via the communication application. The data may be stored in a local database associated with the first computing device 102 or the second computing device 104. The data may include, but not limited to, a list of recipients, a list of invoices, a list of farm videos, or any other transaction information transmitted over the network 108 from the first computing device 102 and the second computing device 104. The data within the local database may be formatted in accordance with a variety of different protocols, such as, security and communication protocols. For example, all or a portion of the network 108 may be a packet-based, Internet Protocol network, which may communicate the data from the first computing device 102 and the second computing device 104 to the local database in Transmission Control Protocol/Internet Protocol packets. In one example, the data may be formatted in accordance with a formatting specification or protocol expected by the digital board and/or the local database. The processor of the first computing device 102 and/or the second computing device 104 may transmit formatted data to the digital board and/or the local database.

A local database associated with the first computing device 102, the local database associated with the second computing device 104, and the database 114 may be in communication to each other via the network 108. Each database may include a non-transitory machine-readable storage media capable of receiving and storing the data associated with operation and management of the farm. Each database may have a logical construct of data files, which may be stored in a non-transitory machine-readable storage media, such as, a hard disk or memory, controlled by software modules of a database program (for example, SQL), and a related database management system (DBMS) that executes the code modules (for example, SQL scripts) for various data queries and management functions generated by the server 110, the first computing device 102, or the second computing device 104.

A data processing system 106 may include servers 110. At least some of the servers 110 may handle secure data messages and transactions to process all the messages with multiple mobile or electronic devices (such as the first computing device 102 and the second computing device 104) of the users. A server 110 may be a portable or non-portable computing server device with a processor that performs one or more operations according to one or more programming instructions. The examples of the server 110 may include, but are not limited to, a server computer, a personal data assistant, a gaming console, a laptop, or a personal computer. The server 110 may be capable of communicating with components of the communication system 100 through the network 108 using wired or wireless communication capabilities. It should be understood that the data processing system 106 as shown and described is merely illustrative and other types of data processing systems should also be considered within the scope of this disclosure. For example, the data processing system 106 may use a blockchain (public and/or consortium) for uploading, retrieving, and modifying data records generated in the system 100. In some embodiments, the data processing system 106 may use the blockchain in association with a local database (e.g., database 114). In these embodiments, the blockchain may store the hashes of data records and the data records (not hashed) may be stored in the local database.

The processor of the server 110 may operate the data processing system 106. A single processor of the server 110 may operate the data processing system 106. Multiple processors of the server 110 may operate the data processing system 106 as a multi-processor system. The processor may include, but not limited to, suitable logic, circuitry, and interfaces, which are operable to execute one or more instructions to perform data transfer and processing operations. The processor may be realized through a number of processor technologies. The examples of the processor may include, but are not limited to, an x86 processor a reduced instruction set computing processor, an application-specific integrated circuit processor, or a complex instruction set computing processor. The processor may also include a graphics processing unit, which may execute the set of instructions to perform one or more processing operations.

The processor may process data exchange associated with a digital ticket conducted on a digital board of the computing devices (such as the first computing device 102 and the second computing device 104) of the users. In some cases, the first farmer device (for instance, the first computing device 102) may initiate a message transfer to a second farmer device (for instance, the second computing device 104) through the server 110, via digital board of the communication application, of the data processing system 106. The data processing system 106 can, based on the message transfer request, generate instructions to transfer message between a sender digital board to a recipient digital board, and may communicate with the sender and recipient mobile or other electronic devices (such as the first computing device 102 and the second computing device 104).

The digital board may be associated with the communication application installed on the first computing device 102 and the second computing device 104. The digital board may be an information sharing platform managed by the users of the farm, and may be associated with one or more field numbers within the farm. The data contained within the digital board may be stored at a local database associated with the server 110. The server 110 may communicate with a record server. The server 110 may communicate with the record server over an external network 108. To transfer messages between the digital boards accessible on the sender and the recipient devices, the server 110 may identify permissions on the accounts of the sender and the recipient devices. The server 110 may submit a request to an appropriate record server, to publish and transfer the message on the digital board. The record server may receive and process the request by transmitting the message to the digital board of the appropriate receiver device.

A server 110 may be positioned between the first computing device 102, the second computing device 104, and the record server. The server 110 may be part of the data processing system 106, which may also include the API 112 and the database 114. The server 110 may use the API 112 to communicate with the first computing device 102 and the second computing device 104 belonging to the users over the network 108. The database 114 may include information such a user profile, one or more lists of the users, and a list of farming fields of the users. In the communication system 100 seen in FIG. 1A, the server 110 may receive transmissions regarding message requests that occur between the user using the first and the second computing devices 102, 104, and the record server. Upon receiving the message transfer and publication request from the user, the server 110 may forward the message to the record server. The record server may be hosted by a social media institute or a third party, which may provide a service to the communication system 100. The record server may include, but not limited to, one or more processors to execute one or more farming tasks of the communication system 100.

In operation, the user may access a communication application of the data processing system 106 on a graphical user interface of the first computing device 102. The first computing device 102 may have a display screen. The display screen of the first computing device 102 may include, but not limited to, a cathode ray tube (CRT) display, a liquid crystal display (LCD), a plasma, or a light emitting diode (LED) display. The display screen may provide some or all of the functionality of the graphical user interface of the first computing device 102. The display screen may be a touch-sensitive or a presence-sensitive display, which may display the graphical user interface, and detect input from the user in a form of user input gestures. A graphics subsystem may receive textual and graphical information, and process the information for output to the display screen. The display screen may include the graphical user interface, which may allow the user interact with the first computing device 102. The examples of the graphical user interface may include, but are not limited to, a keypad embedded on the first computing device 102, a keyboard, a mouse, a roller ball, buttons, stylus, or other devices, which may allow the user to interact with the first computing device 102. The first computing device 102 may not include the graphical user interface, and the user may interact with the first computing device 102 with the display screen (e.g., by providing various user gestures). The user may interact with the first computing device 102 with the graphical user interface and the display screen. The graphical user interface may contain multiple portions. Each portion may be used for a specific purpose, such as, sending and receiving task messages via the communication application, generating a task message via the communication application, and interacting with a third party application.

Figure 29:
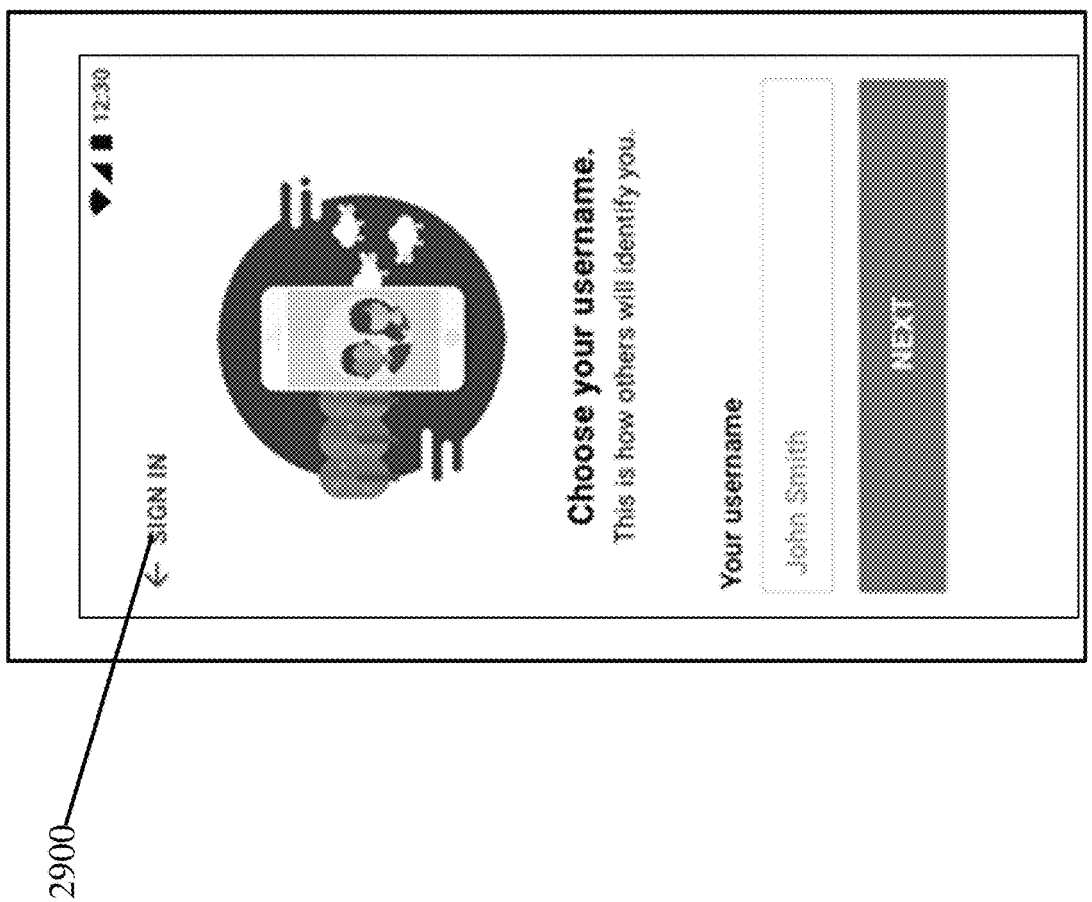
FIG. 29 shows a graphical user interface showing a registration process of a communication application executing on a computing device, according to an embodiment.
Figure 30:
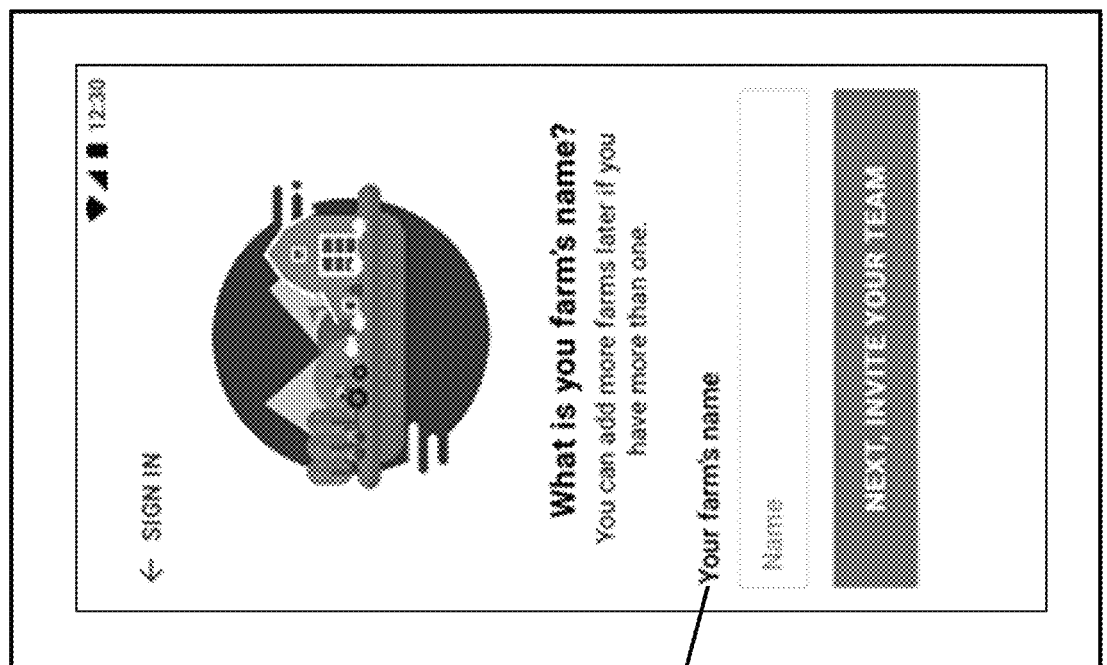
FIG. 30 shows a graphical user interface showing a registration process of a communication application executing on a computing device, according to an embodiment.
Figure 31:
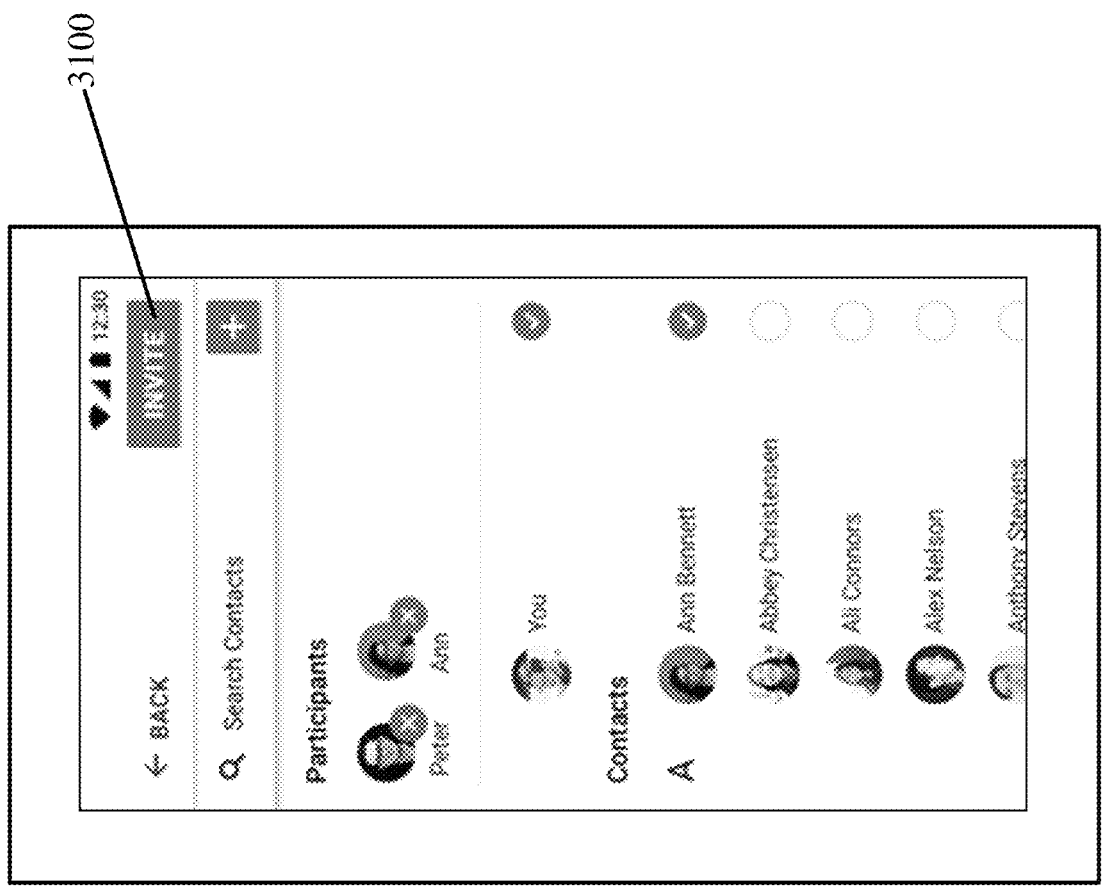
FIG. 31 shows a graphical user interface showing a registration process of a communication application executing on a computing device, according to an embodiment.

Initially, the user may not have an account on the communication application executing on the first computing device 102. The user may register on the communication application using a register (sign in) button 2900, as depicted in FIG. 29. The user may register on the communication application by generating a username using a full name, a phone number, and/or e-mail address to access the features of the communication application. Upon the user completing the sign in process, a button 3000 may be displayed on the graphical user interface of the first computing device 102, as illustrated in FIG. 30, to submit a name of a farm in the communication application. Upon the user submitting the name of the farm or skipping the submission of the farm name for the time-being, a list of participants (for example, team members) may be added to the user's account on the communication application, using a invite button 3100 on the graphical user interface of the first computing device 102, as illustrated in FIG. 31. For instance, the first computing device 102 may contain a list of contacts. The list of contacts may include one or more of: name of each recipient user, a phone number of each recipient user, a username associated to the recipient user data sharing application, e-mail address of each recipient user, and account details for each recipient user. The list of contacts and their corresponding details may be stored on a local database of the first computing device 102 or the database 114. The user may select at least some of the contacts from the list of contacts and add the selected list of contacts to their account on the farm communication application.

Upon generating an account at the communication application, the user may then enter login data to access the account. The server 110 associated with the communication application may then receive the login data entered by the user during the signing in process. The server 110 may implement a series of security protocols in order to verify that the account at the communication application being accessed by the user on the first computing device 102 belongs to the user. For instance, in one of the security protocol implemented by the server 110, the server 110 may generate a security code that may be transmitted to a phone number of the user operating the first computing device 102. The server 110 may then request the user of the first computing device 102 to enter the code on an interface of the communication application. In one example, a code may include a secret token. The secret token may be a globally unique identifier, such as, a unique string of characters. The unique string of characters may include, but not limited to, letters or numbers or both. In another example, a code may include Uniform Resource Locators (URLs). The URL may be used to designate an address from which the user of the first computing device 102 may obtain instructions and information for logging into the account. The code may be associated with an expiry time. The expiry time may be included in the code. The expiry time may be recorded together with the secret token associated with the code at the database 114 when the code is generated.

Figure 32:
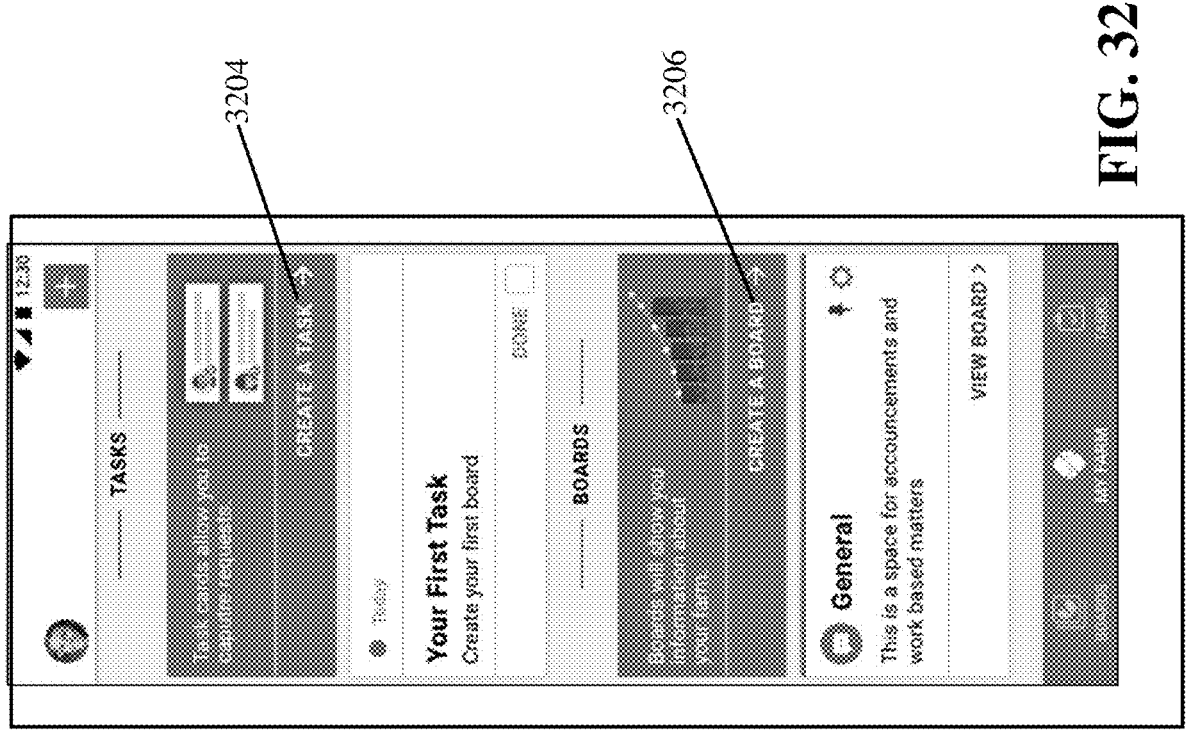
FIG. 32 shows a graphical user interface showing digital boards and tasks on a communication application executing on a computing device, according to an embodiment.

The user upon logging into the account in the communication application on the first computing device 102 may generate a digital board and a task, using a create board button 3206 and a create task button 3204 presented on the communication application being executed on the first computing device 102, as illustrated in the FIG. 32. A first user operating the computing device 102 may generate or select one or more tasks on the digital board to be completed by a second user operating the second computing device 104. The digital board may be accessible to the users (such as the first user and the second user) of both the first computing device 102 and the second computing device 104, via the communication application. The digital board may display the tasks to all other users, which the other users may view on same digital board of their farm communication application. The digital board may display all the tasks created by all other users that are registered as participants of the digital board for each other to execute.

Figure 33:
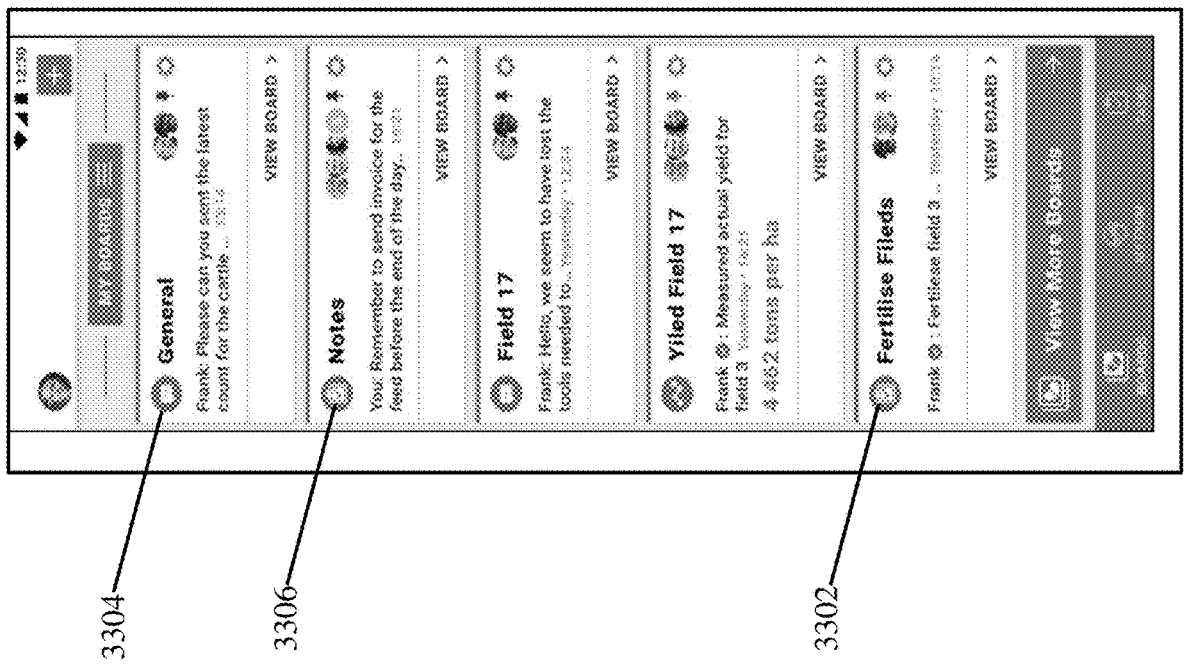
FIG. 33 shows a graphical user interface showing a list of digital boards on a communication application executing on a computing device, according to an embodiment.
Figure 34:
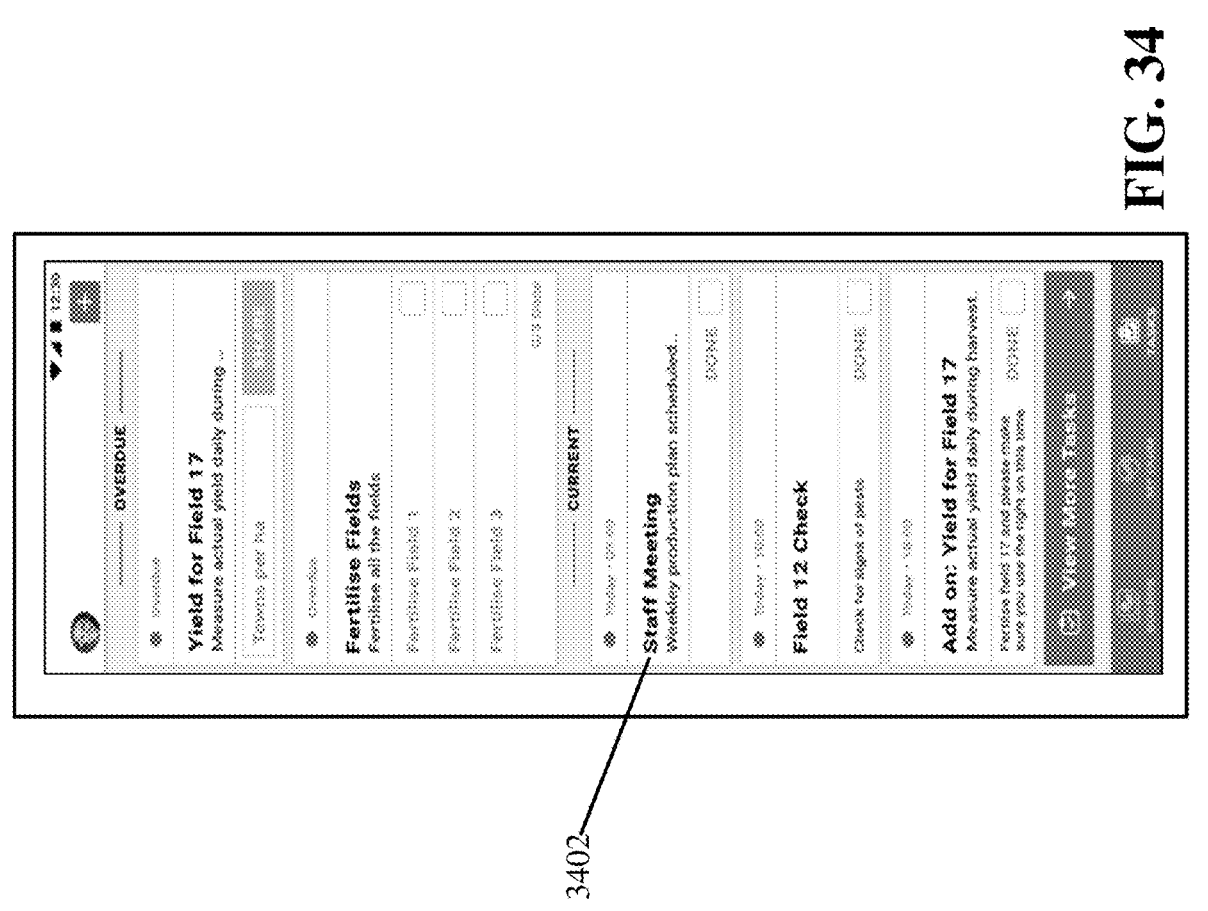

A first non-limiting example of a task generated on a digital board by a first user operating a first computing device 102 may be a request for a second user operating a second computing device 104 to fertilize fields on a specific location in a particular field of the farm. As depicted in FIG. 33, a fertilize field task 3302 may be displayed on the digital board associated with the farm communication application being executed on the computing devices of the first user and the second user. A second non-limiting example of a task generated on a digital board by the first user operating the first computing device 102 may be a request for the second user operating the second computing device 104 to count a number of cattle in the fields. As depicted in FIG. 33, a general task 3304 associated with a count of cattle may be displayed on the digital board associated with the farm communication application being executed on the computing devices of the first user and the second user. A third non-limiting example of a task generated on a digital board by the first user operating the first computing device 102 may be a request for the second user of the second computing device 104 to wait until a pre-defined date and time in order to send invoices. As depicted in FIG. 33, a notes task 3306 displayed on the digital board associated with the farm communication application being executed on the computing devices of the first user and the second user may require the second user to wait until a pre-defined date (for example, the end of the day) in order to transmit the invoice. A fourth non-limiting example of a task generated on a digital board by the first user operating the first computing device 102 may be a request for the second user of the second computing device 104 to wait until a pre-defined date and time to have a staff meeting. As depicted in FIG. 34, a meeting task 3402 displayed on the digital board of the devices of the first user and the second user may require the second user to wait until a pre-defined date (for example, every week) in order to attend or coordinate a staff meeting.

Figure 35:
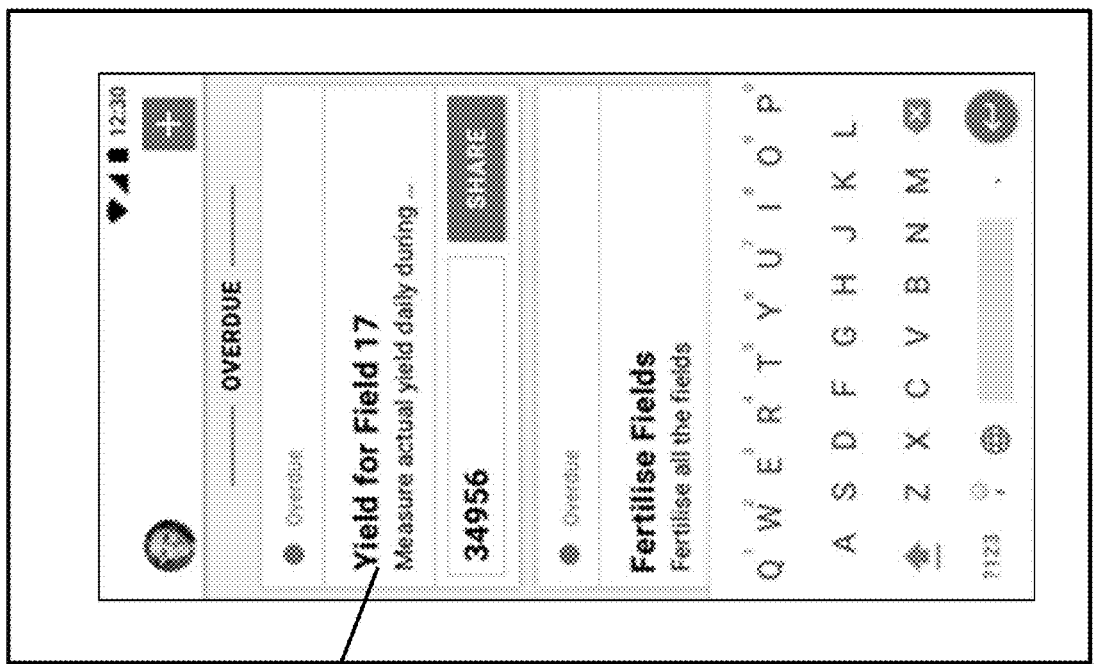
FIG. 35 shows a graphical user interface showing a process for entering a task on a digital board in a communication application executing on a computing device, according to an embodiment.

Upon logging into the communication application on the first computing device 102, a first user may generate a task message on a digital board comprising at least one task for a second user operating the second computing device 104. As depicted in FIG. 35, a task 3502 displayed on the digital board associated with the farm communication application being executed on the computing devices of the first user and the second user may require the second user to measure yield data. The task message may include one or more items for the second user. For example, the first user of the first computing device 102 may select the items, such as, an image, a video file, a file document, or any suitable information from a local database of the first computing device 102. The selected item may be a gift item offered by the first user to the second user, and may be a product or service offered by one or more retailers. Examples of the items that may be selected include a virtual item, such as, an electronic movie ticket, digital song or gaming content. The examples of the items that may be selected include real gifts coupons associated with, but not limited to, a tangible item, such as: books, food items, consumer products, and other physical good; and a service coupon such as a spa treatment. Other examples of the items that may be selected may be associated with an intangible item, such as, monetary credit and gift points, redeemable at a particular retailer or group of retailers.

Figure 36:
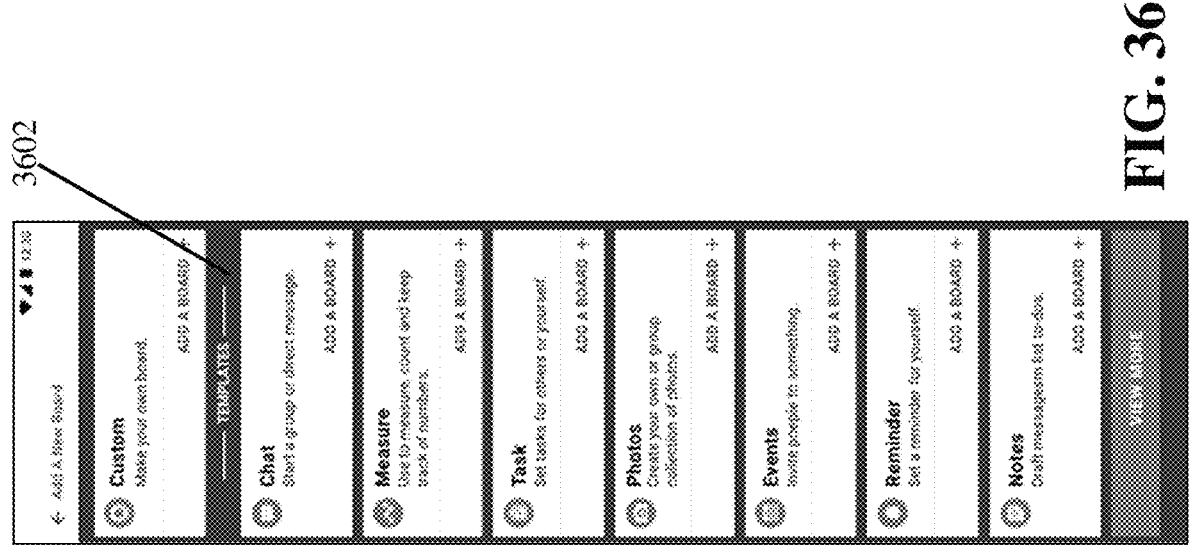
FIG. 36 shows a graphical user interface showing a process for selecting a digital board in a communication application executing on a computing device, according to an embodiment.

A first user of the first computing device 102 may arrange digital boards within the communication application, and tasks within the digital boards in a pre-defined order for display on the graphical user interface associated with the communication application. The first user of the first computing device 102 may arrange the digital boards and the tasks in the pre-defined order, for display on the graphical user interface of the computing devices of other users, where other users are participants of the digital boards. As depicted in the FIG. 36, templates 3602 may be displayed on the graphical user interface of the first computing device 102, which may be selected by the first user to generate digital boards. The templates for creating the digital board may include a chat template, a measure template, a task template, a photo template, an event template, a reminder template, and a note template. Upon the creation of the digital boards, the first user of the first computing device 102 may then arrange the created digital boards in the pre-defined order within the communication application. The digital boards may appear in a pre-defined order in communication application accounts of the users who are registered to access the digital boards.

Figures 37D, 37E, 37F:
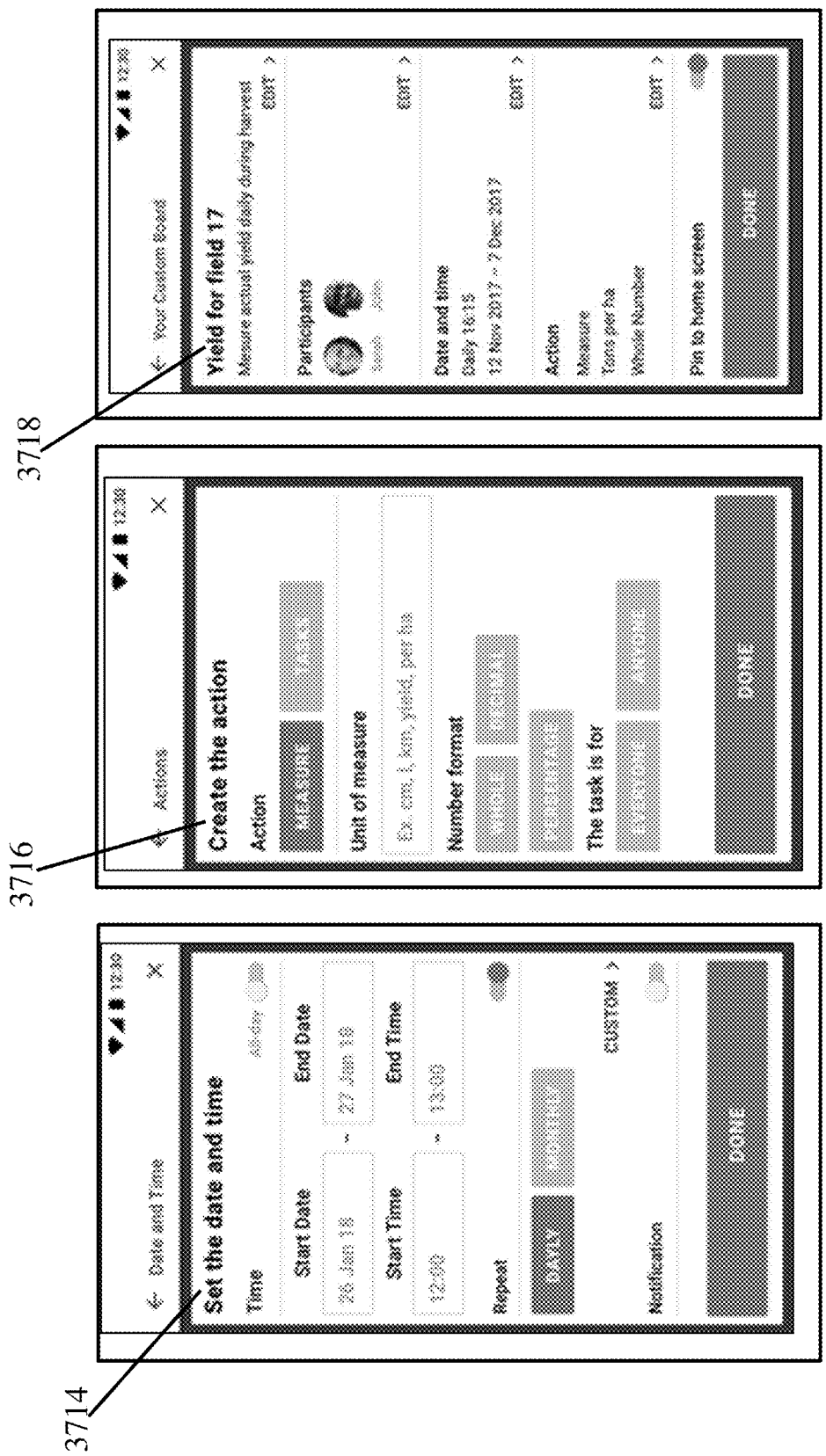
FIG. 37D shows a graphical user interface showing a process for adding date and time in a digital board in a communication application executing on a computing device, according to an embodiment.
FIG. 37E shows a graphical user interface showing a process for adding actions on a digital board in a communication application executing on a computing device, according to an embodiment.
FIG. 37F shows a graphical user interface showing a summary of a digital board in a communication application executing on a computing device, according to an embodiment.
Figure 38B:
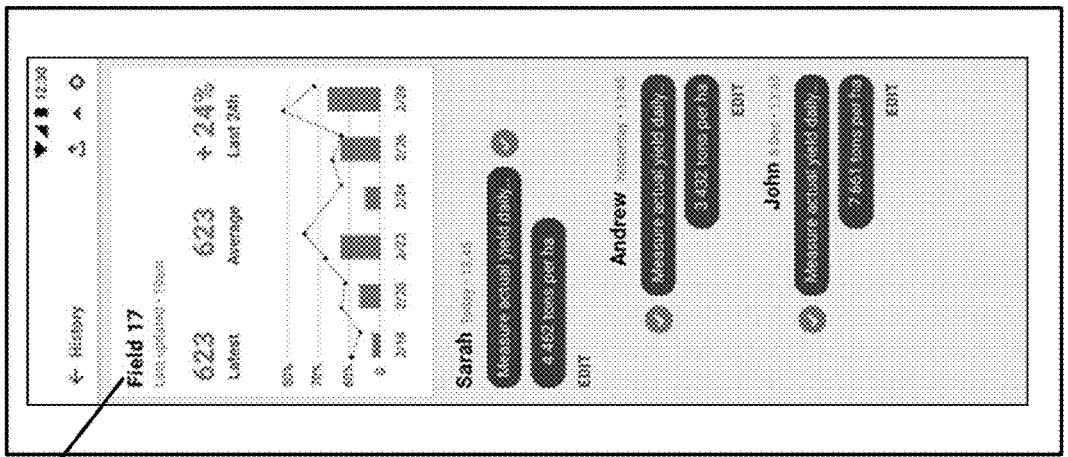
FIG. 38B shows a graphical user interface showing a history of a digital board in a communication application executing on a computing device, according to an embodiment.
Figure 38A:
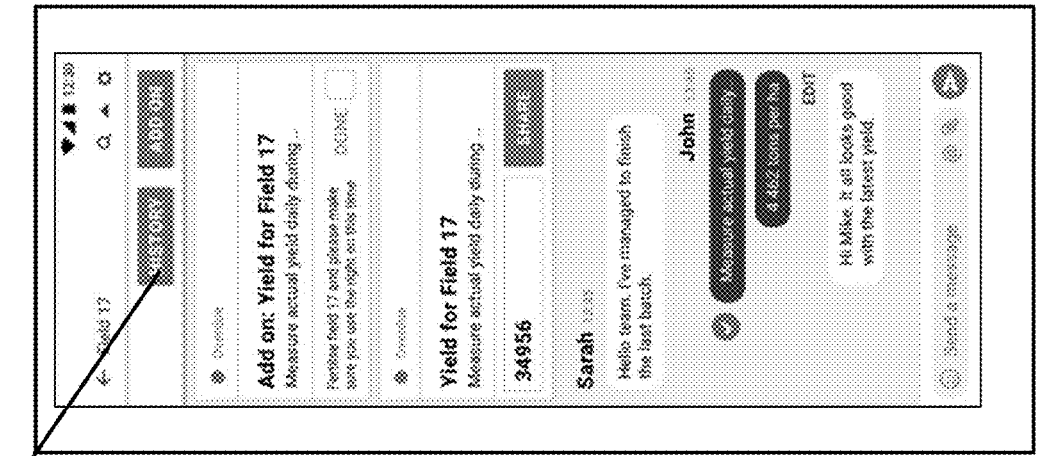
FIG. 38A shows a graphical user interface showing a digital board in a communication application executing on a computing device, according to an embodiment.

Upon the creation of the digital boards, a first user may edit the digital boards, as depicted in the FIG. 37A, to add a board name 3702, to add a list of participants 3704, to add a date and time for tasks 3706, and to add an action task 3708. For example, as shown in the FIG. 37B, a first user may select a name button 3710 on the graphical user interface associated with the communication application being executed on a first computing device 102 to add a name for the created digital board. Then in order to add participants who may have access to the data within the digital board or an ability to share data on the digital board, the first user may select add participant button 3712 on the graphical user interface associated with the communication application, as shown in FIG. 37C, to add the participants for the digital boards. The first user may further use a date/time button 3714 on the graphical user interface associated with the communication application, as shown in FIG. 37D, to add a date and time information for execution of the tasks in the digital boards. The first user may further use an action button 3716 on the graphical user interface associated with the communication application, as shown in FIG. 37E, to add an action (or a task) and detailed information associated with the task in the digital boards. Upon the creation of the digital board, a first user may be provided a summary of the information associated with each digital board. For instance, a first user may select a button 3718 on the graphical user interface associated with the communication application, as shown in FIG. 37F, to view a summary of the digital board (associated with yield for field 17). In some cases, a first user may be provided a history of operations associated with each digital board. For instance, a first user may select a button 3802 on the graphical user interface associated with the communication application, as shown in FIG. 38A, to view a history of summary of the digital board (associated with yield for field 17). Upon the selection of the button 3802 on the graphical user interface associated with of the communication application, then a snapshot 3804 of history is displayed on the digital board presented on the communication application, as depicted in FIG. 38B.

The snapshot 3804 of history may be a graphical user interface that may interactively and graphically display historical data associated with a farming operation. As shown herein, the snapshot 3804 may display daily crop yield of field over a period of time. Within the snapshot 3804, an interactive graph may include a bar chart showing the numerical daily yield over a period of time and a line chart showing the daily change in the yield. At the top of the graph, the snapshot 3804 may include numerical values indicating the latest yield, average yield, and a percentage change in the yield in the past twenty-four hours. The snapshot 3804 is merely exemplary and the system may present historical data in other forms and formats. Furthermore, a user may share data displayed on the snapshot 3804 to other users or entities. In some instances, the other users or other entities may access the data in the snapshot based on permission controls selected by the user. In some instances, the sharing the data may be based upon agreements between the user and the other users and entities. The agreements may be implemented in software at both the application level in the devices and the back-end computer infrastructures. In some embodiments, the sharing of the data may be based upon the conditions for participation. For example, if a new user wants to collaborate with the user, data sharing may be a pre-condition for the new user to participate. In some embodiments, an application provider, i.e., the entity providing the device application and maintaining the back-end computer infrastructure, may also impose these conditions for every user who downloads and uses the application.

The historical data displayed in the snapshot 3804 or any other type of graphical user interface may indicate the overall attributes of a farming operation. For example, the historical data may indicate the volume and characteristics of the yield for different fields and the overall farm. The historical data may indicate the overall health of the livestock in the farm. The historical data may indicate which breed of cattle or which variety of a crop is successful. As another example, the historical data may display the productivity of various workers in the farm. For the farmer, the historical data at the fingertips will enable informed and data driven decisions as opposed to the conventional methods when none of these functionalities were available to the farmer. It should however be understood that the aforementioned examples of historical data are merely illustrative, and other examples of historical data should be considered within the scope of this disclosure.

The historical data may allow other entities to evaluate the overall operation of the farm. For example, a bank willing to provide an expansion loan to the farm may access the historical data to determine whether the farm may be able to pay back the loan. A regulatory entity may access the historical data to ensure that the farm is complaint with the relevant regulations. The regulatory authority may access the historical data in accordance with the user consent and the privacy laws of the jurisdictions where the system 100 is used. An appraiser may access the historical data to properly appraise the farm. In other words, the embodiments disclosed herein leverage the real-time data collection by various workers in the farm to generate an accurate historical profile that can be used to make informed, data-driven decisions.

Upon the creation of digital boards and digital tickets comprising tasks for display in each digital board, the first computing device 102 may electronically transmit task messages containing the tasks to computing devices of recipient users. The task messages may then be displayed on the graphical user interface associated with a farm communication application running on their computing devices in a pre-defined order. The task messages may be displayed on a digital board accessible from the communication application running on the computing devices of the recipient users. In one example, a task displayed in a task message may be a request for the recipient user to go to a specific location in the farm to execute the task. The first computing device 102 may track a current location of the computing device of the recipient user using a Global Positioning System satellite system. The Global Positioning System satellite system is a network of plurality of satellites that is used to determine a location of an antenna of the computing device of the recipient user that receives signals from a number of satellites of the Global Positioning System satellite system. The computing device of the recipient user may itself track its current location using a location services application. The set of tasks displayed in a task message may include a first set of tasks and a second set of tasks. Upon completion of the first set of tasks, the recipient user may obtain instructions for the second set of tasks, and upon completion of the second set of tasks, the recipient user operating the recipient computing device may obtain a reward. Each of the first and second set of tasks may have a separate set of instructions and timelines for execution by the recipient user operating any computing device, for example, the second computing device 104.

FIG. 1B shows a digital board 116, which will be explained in conjunction with a communication system 100 of the FIG. 1A. Embodiments of the communication system 100 may provide a digital ticket functionality to facilitate transactions and information sharing across multiple users. The communication system 100 may provide a digital board functionality where the digital board 116 may be a container for digital tickets 118. The digital board 116 containing the digital tickets 118 may be implemented by the communication system 100 within a communication application. A digital ticket 118 may allow multiple users to share information, data, and/or media and enable transactions. The digital ticket 118 may enable a "request-response" mechanism, wherein a first user may input a request for some information to trigger a second user to respond with the requested information through the ticket 118 initiated by the first user. The first user may manually input data to the digital ticket 118. In addition, a third party may utilize an application programming interface provided by the system to automatically input data to the digital ticket 118.

The digital ticket 118 may represent a unique transaction that may carry a specific dataset of information. Multiple digital tickets 118 may enable multiple transactions as a sequence of tickets 118*a*, 118*b*, 118*c*, 118*d*, 118*e*, 118*f* tied together within the digital board 116. The digital ticket 118 may distribute any type of digital content, data, and/or media. Furthermore, the digital ticket 118 may have a dedicated messaging feature that may enable the users associated with the digital tickets 118 to communicate with each other. The digital ticket 118 may be of one type among multiple types. Some types of the digital ticket 118 are described in the following paragraphs.

A digital ticket 118 may be a measurement ticket, which may provide a functionality of measuring, counting, and keeping track of numbers within the application. For example, a first user (requester) may create the measurement ticket for a second user (receiver) by choosing a name form a list of users previously invited into the application. The first user may name the measurement ticket and may define a specific required unit of measure. Non-limiting examples of the unit of measure include centimeter (cm), liter (1), kilometer (km), and hectare (ha). The first user may also specify a number format such as whole number, percentage, and/or decimal. The first user may also set a time for the measurement, for example, a specific date and hour. The first user may configure the measurement ticket to repeat at predetermined time intervals. For example, the first user may configure the measurement ticket to repeat daily, weekly, or monthly.

The second user may receive a notification of the measurement ticket in the communication application and/or a device running the communication application. The measurement ticket may provide an input field in the "TO DO" screen of the communication application. The second user may input a measurement number in the measurement ticket. The first user may receive a notification of the input, and may view the input in a home screen of the continuation application. Each of the first and the second users may view the historical data records a graph since the creation of the measurement ticket.

A digital ticket 118 may be a checklist ticket, which may be a request of action. A first user may instantiate a checklist ticket to set tasks and to-do lists for other users or for herself. The process steps of creating the checklist ticket may be similar to the process of creating a measurement ticket as described above. The checklist ticket may include identification information of a second user (receiver), name of the ticket, date of the ticket creation, and checklist with description of items. Once the first user creates the checklist ticket the second user may receive a notification on an application or a phone. The second user may view the checklist ticket and the tasks requested to action therein in a "TO DO" screen displayed by the application. The second user may flag each task once completed in the checklist ticket and share the information, via the checklist ticket, with the first user, who will receive a notification in the home screen of the application.

A digital ticket 118 may be an event ticket that may contain a request for a meeting that may be scheduled within a schedule of a "TO-DO" screen. The digital ticket may be a reminder ticket that may allow users to set reminders for themselves or other selected users. The digital ticket 1202 may also be a third party ticket that may allow a user to connect with other sources of data, content, and/or media. The user may have access to third party tickets associated with, for example, weather forecast, news, markets and commodity prices, sensor-powered data feeds, and/or Internet of Things data sources. It should be understood that the aforementioned digital tickets 118 are merely illustrative and other types of digital tickets 118 should be considered within the scope of this disclosure. Other illustrations of digital tickets 118 may include, for example, a purchase request or record, a payment request or request, production of an invoice, and a request for advisory.

As described above, the digital board 116 may be the container of the digital tickets 118. A set of related digital tickets 118 may be attached to a specific digital board 116, which may be repository of data, content, and/or media for a specific subject matter. The user may generate the digital board 116 without any limits on subject, data, industry needs, personal needs, and/or business needs. The digital board 116 may be a framework to connect people with associated transactions. The user may create the digital board 116 by defining a name and adding users to the digital board 116. The user may choose selecting among a group of users previously invited to use the application. The user may also access her phone's contact list to invite other users to the digital board 116. Users participating in the digital board 116 may access data, content, and or media present in the board. Furthermore, the digital board 116 may have a dedicated messaging feature that may enable the participating users to communicate among themselves.

FIGS. 2A-27C show an interactive graphical user interface (or an interactive dashboard) showing a webpage of a communication application executing on a computing device by a user. The computing device may be a portable or a non-portable device, such as, a mobile phone, a laptop computer, a tablet computer, a smart phone, or the like. The computing device may include a processor, which may perform one or more operations according to one or more programming instructions. The computing device may be capable of communicating with a data processing system, through a communications network, using wired or wireless communication capabilities.

The communication application may be a software application installed on the computing device. The communication application may be displayed on a user-centric website accessible via the computing device. A company may generate the communication application as a widget to enable communication between different types of users, such as, farmers working on different field locations. The widget may be displayed on a website of the company, which may be visible to all the users.

The computing device may have access to pre-stored web-based interfaces, such as, webpages, which may include a number of preconfigured sub-interfaces, or containers, that are dynamically populated (e.g., widget box). For example, the webpages associated with the communication application may contain code, such as, Hyper Text Markup Language, presenting a website of a number of webpages having a unique look-and-feel. One or more outputs may display the webpages, which may contain additional code for the containers, where the container code displays the widget of the communication application.

Initially, a user may download and open a communication application (for example, a farm data management application) on a computing device. Upon opening the communication application, webpages 200, 202, and 204 associated with the communication application may be displayed on the graphical user interface of the computing device, as depicted in the FIGS. 2A-2C. The webpages 200, 202, and 204 may display information associated with introduction section of the communication application. The information may include data about all features associated with the communication application.

Figures 3A, 3B:
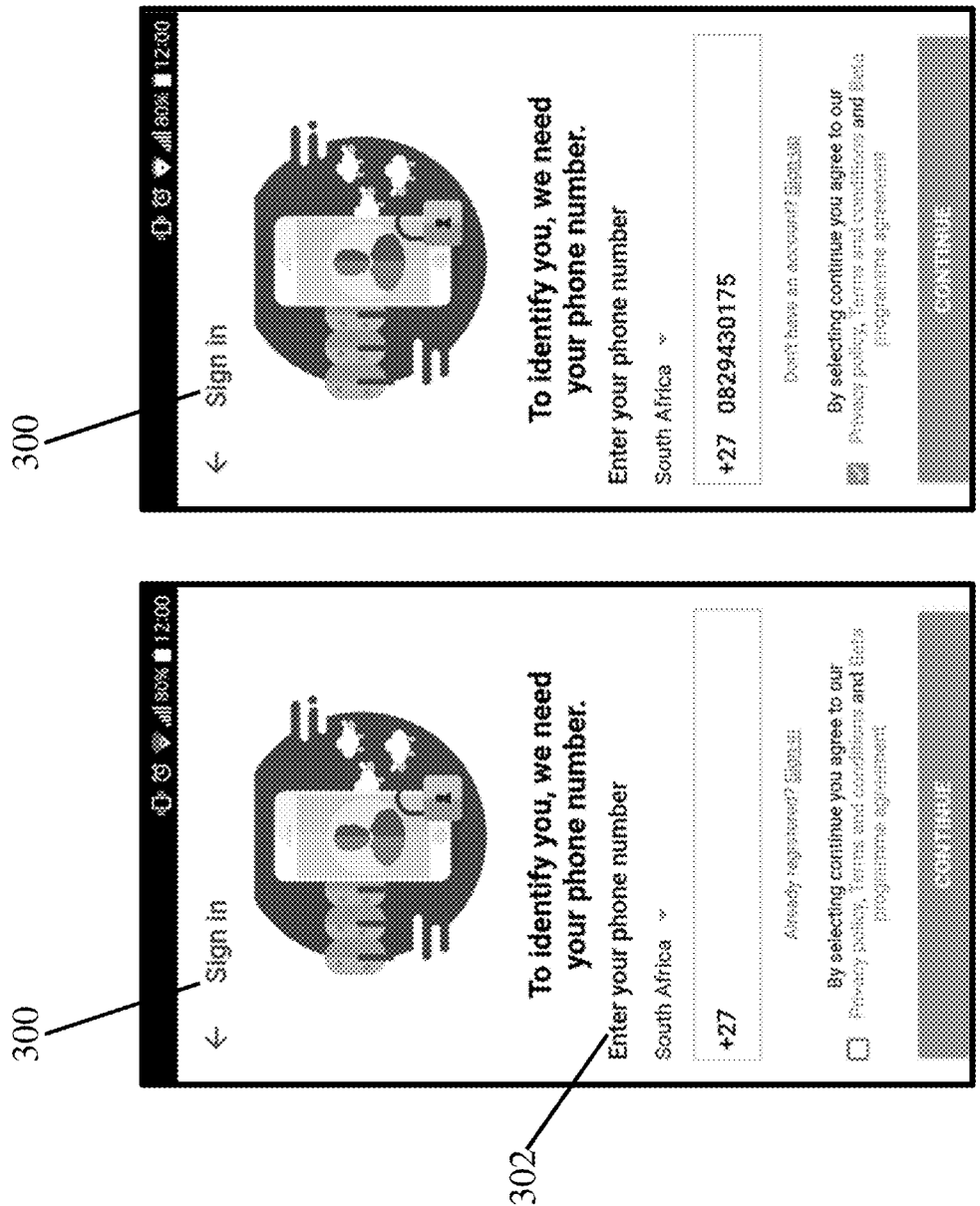
FIG. 3A shows a graphical user interface showing a webpage of a communication application executing on a computing device, according to an embodiment.
FIG. 3B shows a graphical user interface showing a webpage of a communication application executing on a computing device, according to an embodiment.
Figure 4B:
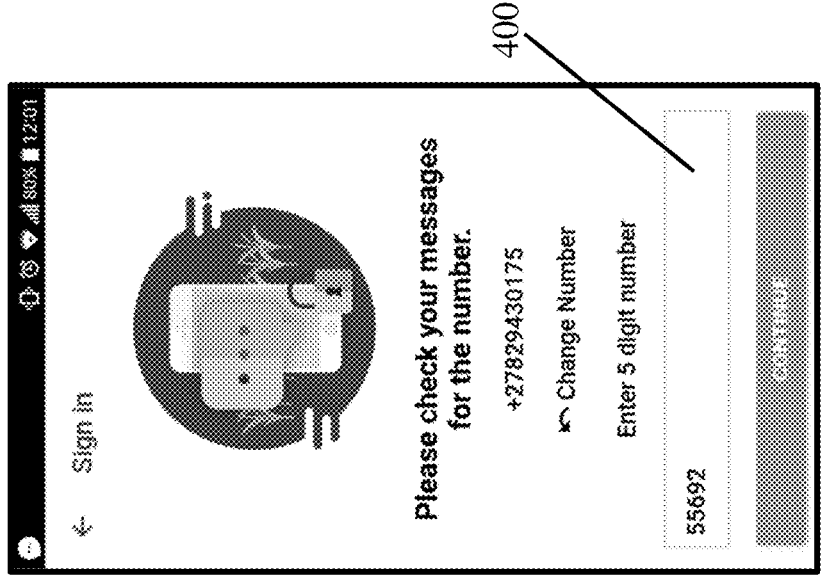
FIG. 4B shows a graphical user interface showing a webpage of a communication application executing on a computing device, according to an embodiment.
Figure 4A:
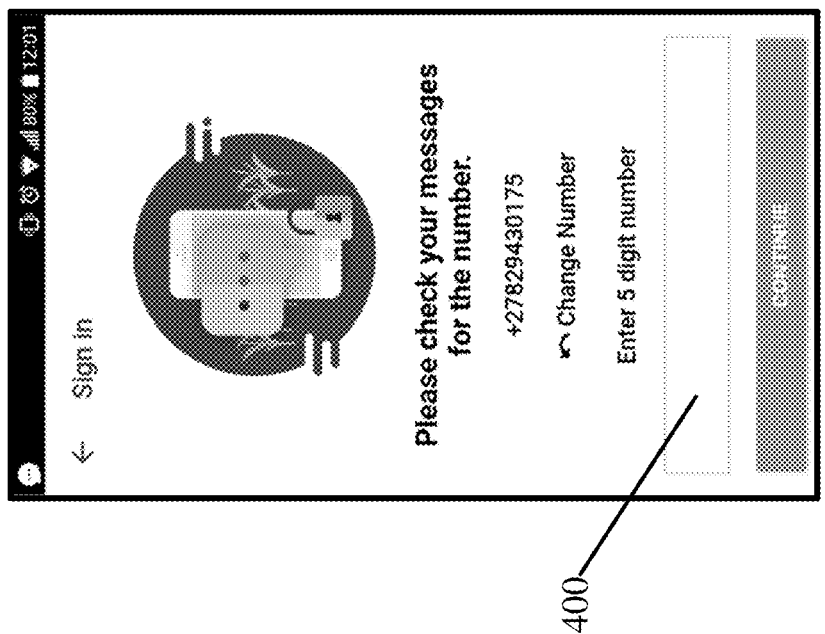
FIG. 4A shows a graphical user interface showing a webpage of a communication application executing on a computing device, according to an embodiment.

The user may not have an account on the communication application. The user may register on the communication application using a "sign in" button 300, as depicted in FIGS. 3A and 3B. The "sign in" button 300 is displayed on a webpage associated with the communication application. The user may register on the communication application using a phone number 302. The user may submit the phone number. A server associated with the communication application may implement a series of security protocols in order to verify the phone number of the user. For instance, in one of the security protocol implemented by the server, the server may generate a security code that may be transmitted to the phone number of the user. The server may request the user to enter the code in a box 400, as depicted in the FIGS. 4A and 4B, on the webpage associated with the communication application. The code may be associated with an expiry time. The expiry time may be included in the code.

Figure 5:
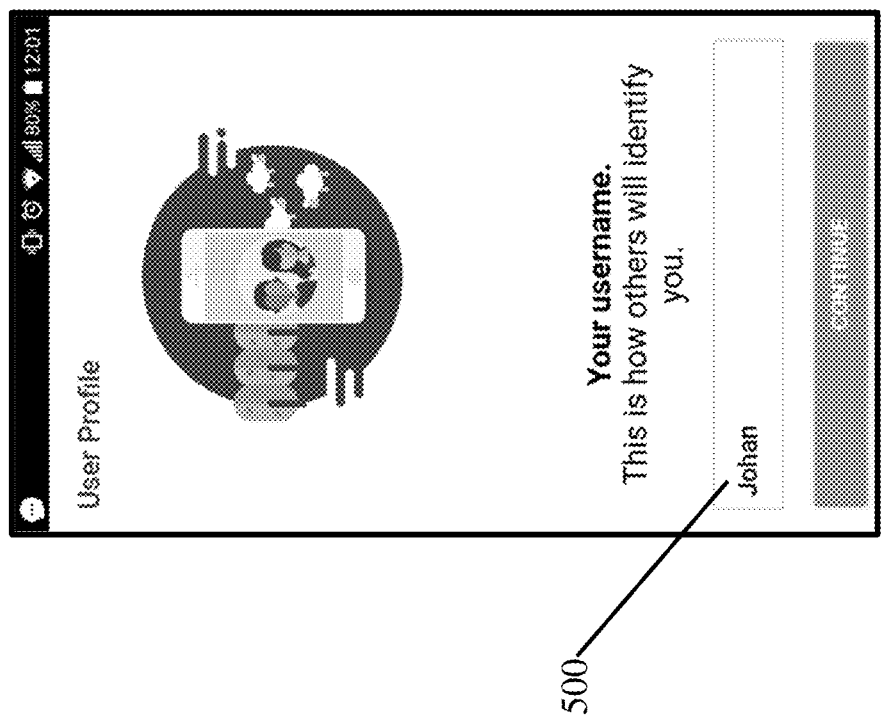
FIG. 5 shows a graphical user interface showing a webpage of a communication application executing on a computing device, according to an embodiment.
Figure 6B:
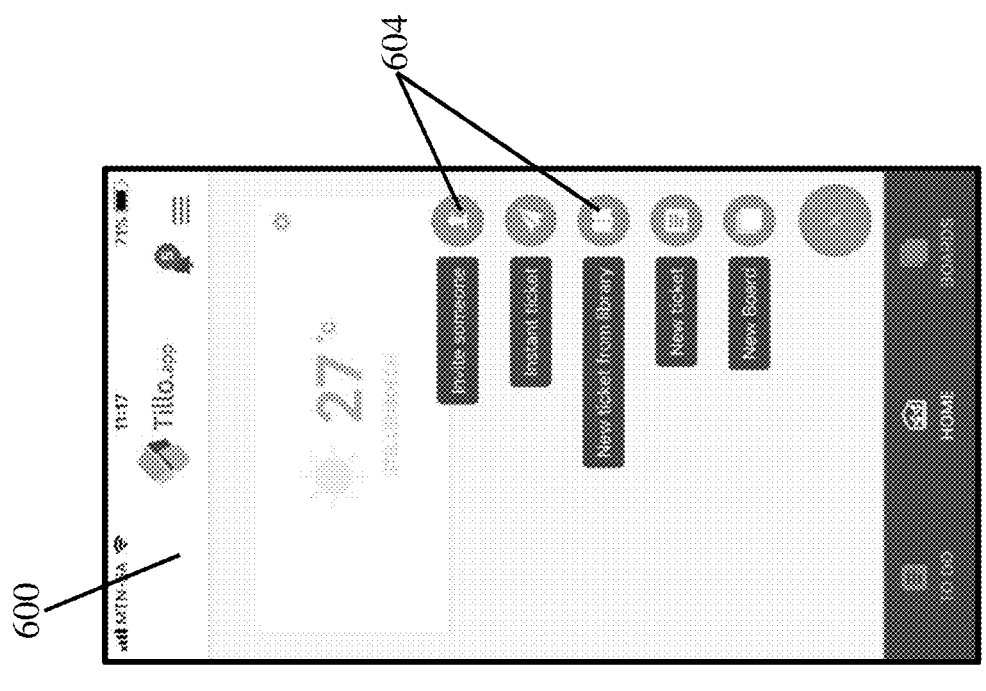
FIG. 6B shows a graphical user interface showing a webpage of a communication application executing on a computing device, according to an embodiment.
Figure 6A:
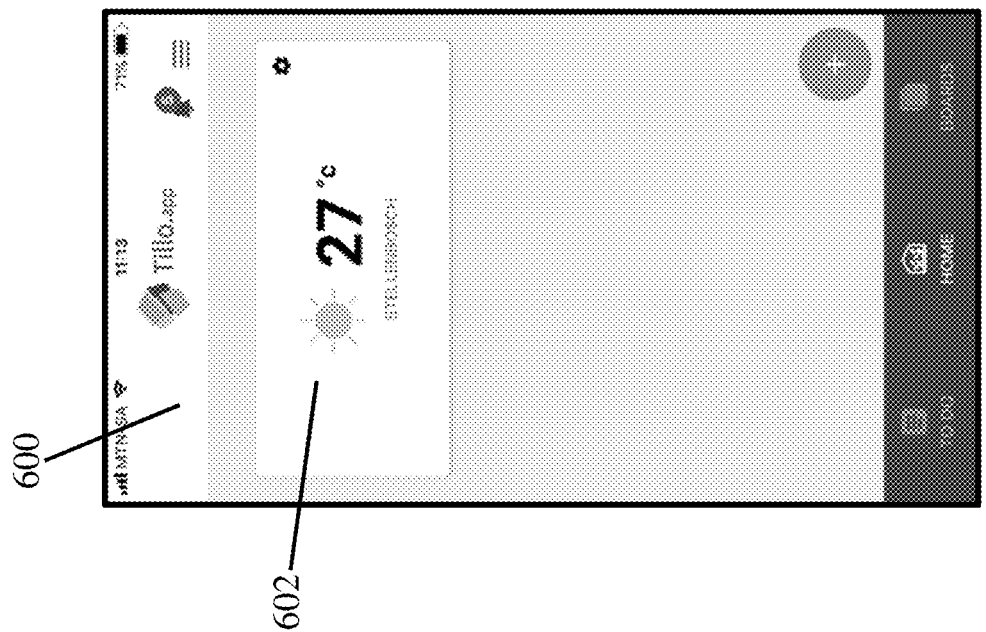
FIG. 6A shows a graphical user interface showing a webpage of a communication application executing on a computing device, according to an embodiment.

User registration process may further include the user submitting a username in a box 500, as depicted in FIG. 5. The box 500 is displayed on the webpage associated with communication application. Upon the user completing the registration and sign in process, a home page 600 of the communication application may be displayed on the computing device, as depicted in FIGS. 6A and 6B. The home page 600 may be a home screen webpage of a user account on the communication application. The home screen webpage may operate as a main navigation page with a "pop-up" menu with multiple selectable graphical components. The user may use the home screen webpage to do certain actions from the home screen webpage, via the selectable graphical components, such as, creating tickets, searching for tickets to submit, create boards, invite members, creating tickets from the user library.

When the user interacts with the multiple selectable graphical components, multiple interactive icons 604 may be displayed on the home page 600. The multiple interactive icons 604 may include an icon to invite someone, an icon for instant ticket, an icon for new ticket from library, an icon for new ticket, and an icon for new board. The user may also be able to enter their location, and have a weather card display 602 on the top of the home screen webpage.

Figures 7A, 7B, 7C:
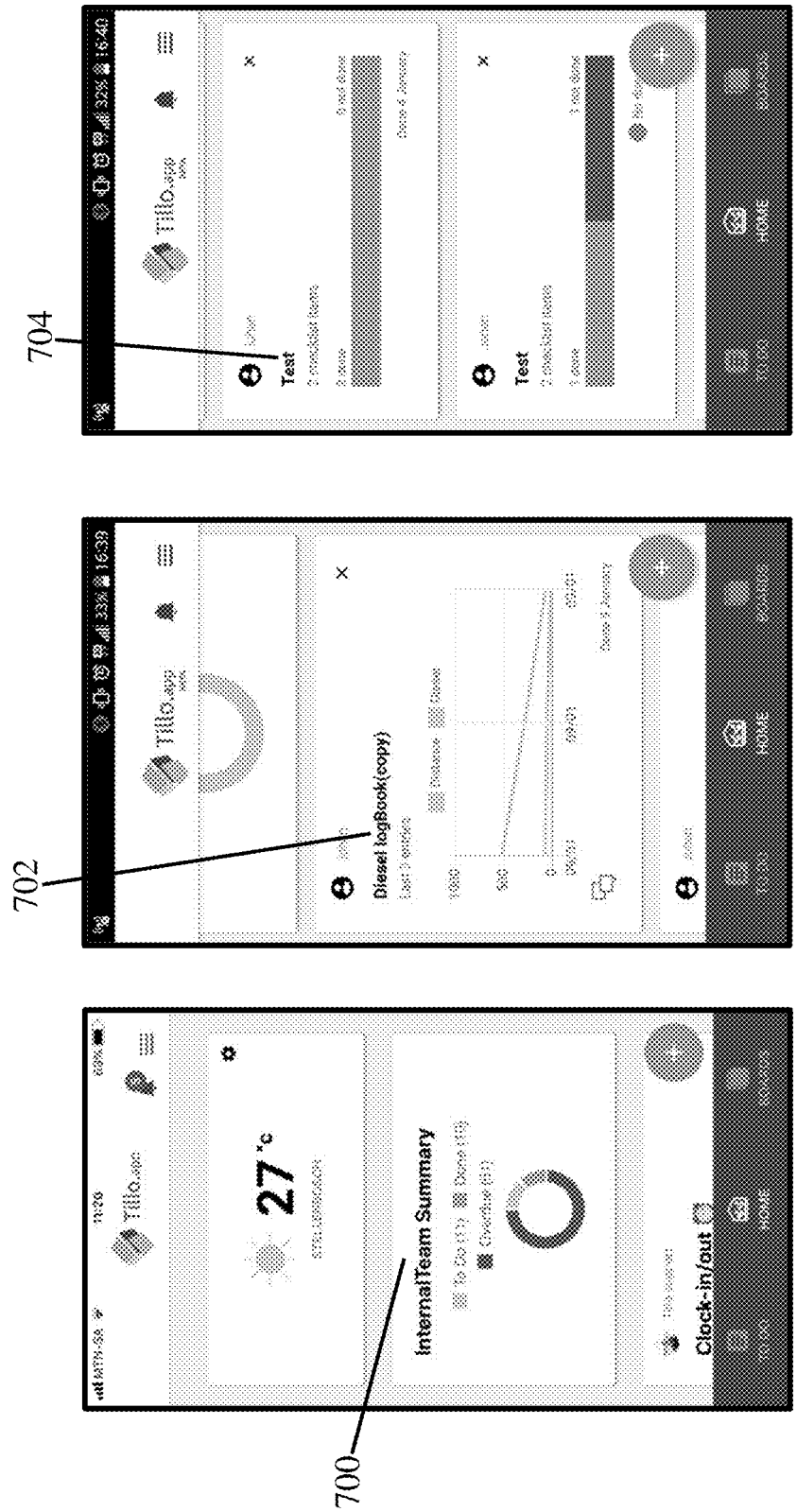
FIG. 7A shows a graphical user interface showing a webpage of a communication application executing on a computing device, according to an embodiment.
FIG. 7B shows a graphical user interface showing a webpage of a communication application executing on a computing device, according to an embodiment.
FIG. 7C shows a graphical user interface showing a webpage of a communication application executing on a computing device, according to an embodiment.

The user may execute instructions on the computing device to interact with the selectable graphical components to customize the dashboard associated with the communication application. During the customization process of the dashboard, the user may include a section 700 for an internal team summary, a section 702 for a log book of the user, and a section 704 for test information of the user, as depicted in FIGS. 7A, 7B, and 7C, in the dashboard. The section 702 may be for a digital recordkeeping.

The user may interact with an interactive icon 800 associated with a field to invite someone, as depicted in the FIG. 8A. The interactive icon 800 is displayed on the webpage associated with the communication application. The user may invite a list of participants (for example, team members) to add to the user's account, using a search button 802, as showed in the FIGS. 8B and 8C. The search button 802 is displayed on the webpage associated with communication application. The computing device may contain a list of contacts. The list of contacts may include one or more of: name of each recipient user, a phone number of each recipient user, a username associated to the recipient user, e-mail address of each recipient user, and account details for each recipient user. The user may select at least some of the contacts from the list of contacts, and add selected list of contacts to their account on the communication application. A list of existing members 804 and new contacts may then be displayed on the dashboard associated with the communication application, as depicted in the FIG. 8D.

Figures 9A, 9B, 9C:
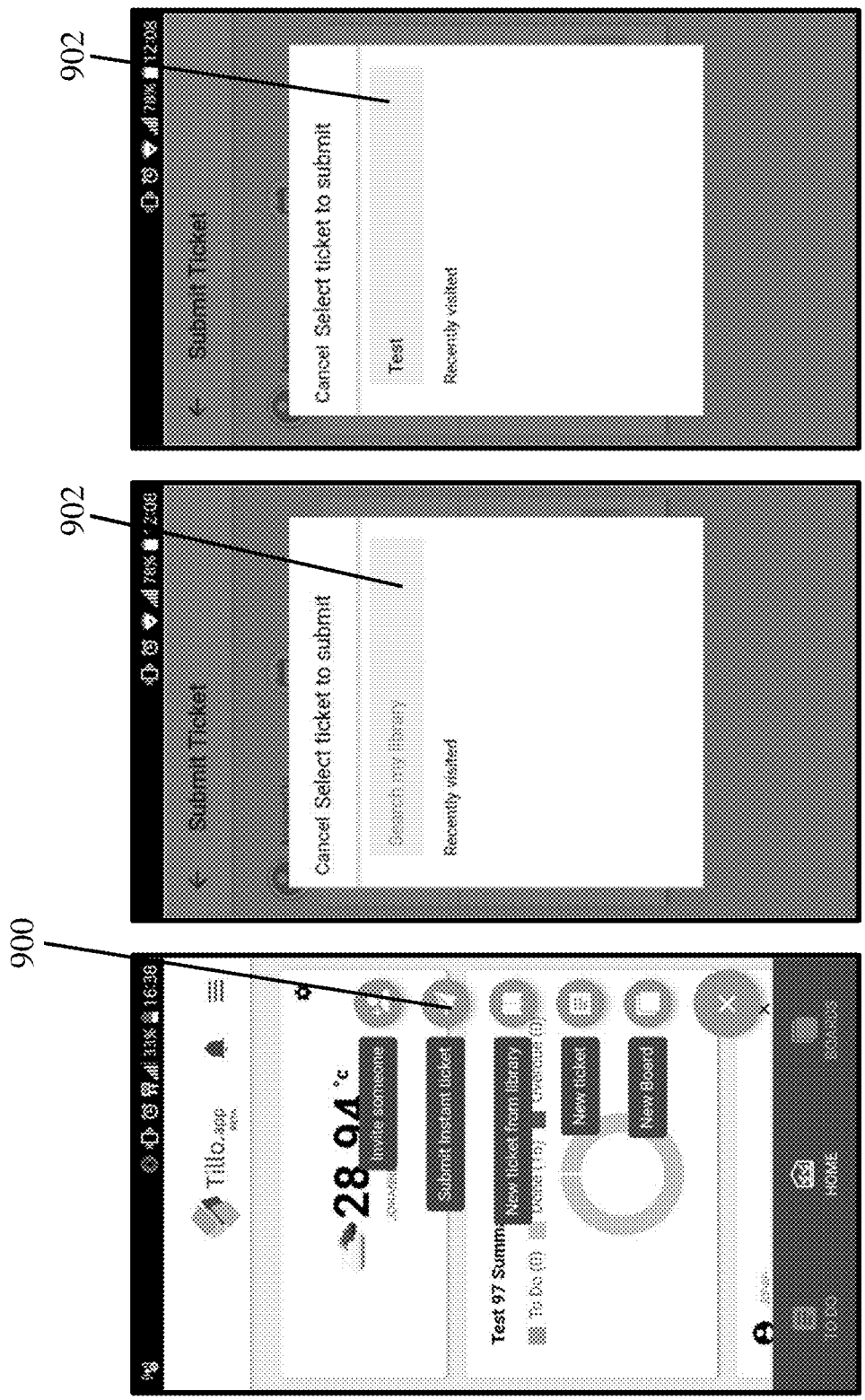
FIG. 9A shows a graphical user interface showing a webpage of a communication application executing on a computing device, according to an embodiment.
FIG. 9B shows a graphical user interface showing a webpage of a communication application executing on a computing device, according to an embodiment.
FIG. 9C shows a graphical user interface showing a webpage of a communication application executing on a computing device, according to an embodiment.

The user may interact with an interactive icon 900 associated with a field for submit an instant ticket, as depicted in the FIG. 9A. The interactive icon 900 is displayed on the webpage associated with the communication application. The submit instant ticket interactive icon 900 may allow a user to select a ticket (an instant ticket) that may be resubmitted. The instant ticket may not have a due data and a schedule, and may be submitted on-demand. A section 902 for searching new tickets may then be displayed on the dashboard associated with the communication application, as depicted in the FIGS. 9B and 9C. The user may use the section 902 to input terms to search for the tickets.

The user may interact with an interactive icon 1000 associated with a field for a new ticket from library, as depicted in the FIG. 10A. The interactive icon 1000 is displayed on the webpage associated with the communication application. A section 1002 for searching new tickets from the library may then be displayed on the dashboard associated with the communication application, as depicted in the FIG. 10B. The user may use the section 1002 to input terms to search for the new tickets from the library. A copy of the new ticket 1004 may then be displayed on the dashboard, as depicted in the FIG. 10C. The information associated with the new ticket 1004 may include names of users assigned to the new ticket 1004.

Figures 11A, 11B, 11C, 11D:
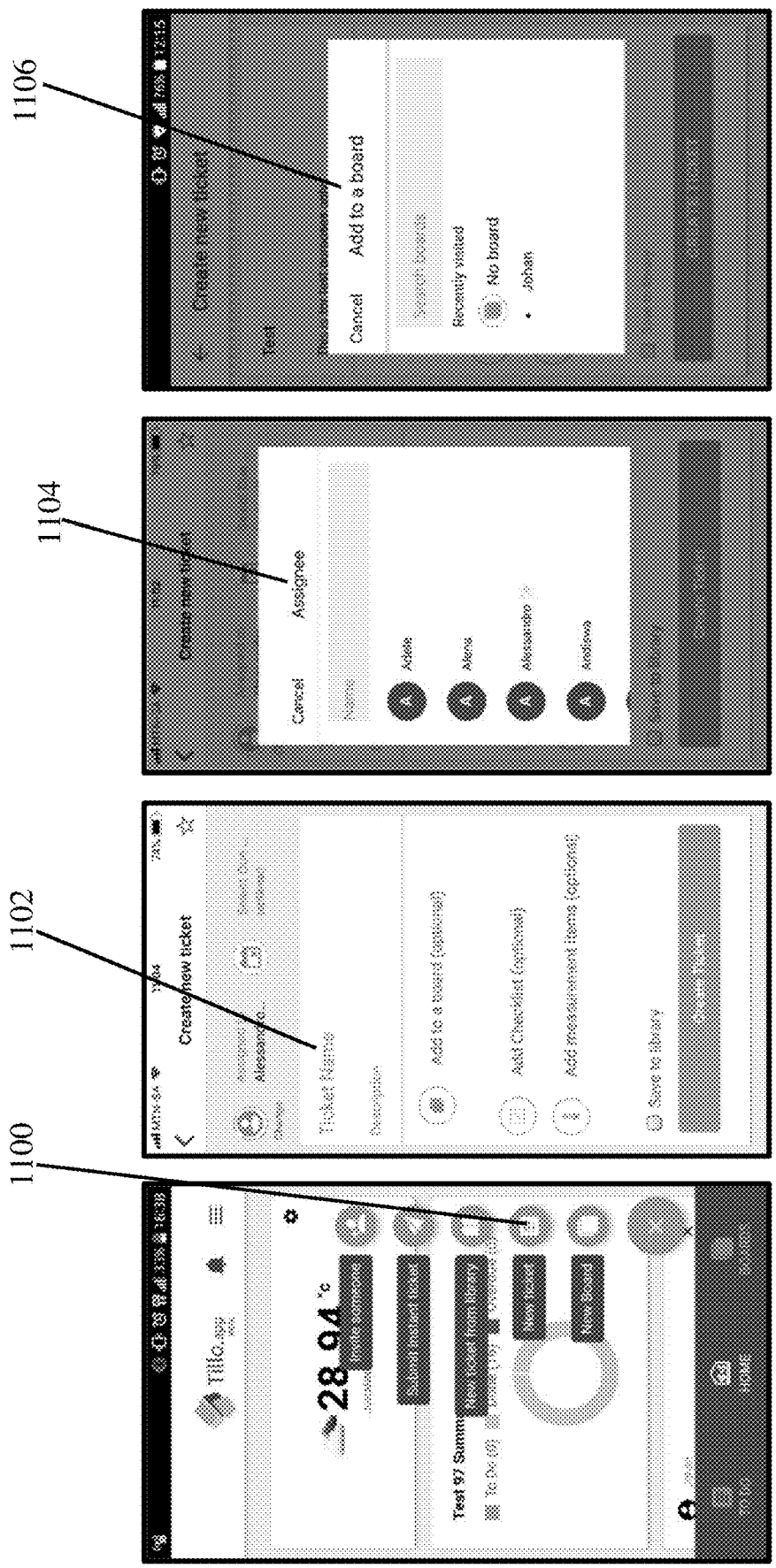
FIG. 11A shows a graphical user interface showing a webpage of a communication application executing on a computing device, according to an embodiment.
FIG. 11B shows a graphical user interface showing a webpage of a communication application executing on a computing device, according to an embodiment.
FIG. 11C shows a graphical user interface showing a webpage of a communication application executing on a computing device, according to an embodiment.
FIG. 11D shows a graphical user interface showing a webpage of a communication application executing on a computing device, according to an embodiment.
Figure 13C:
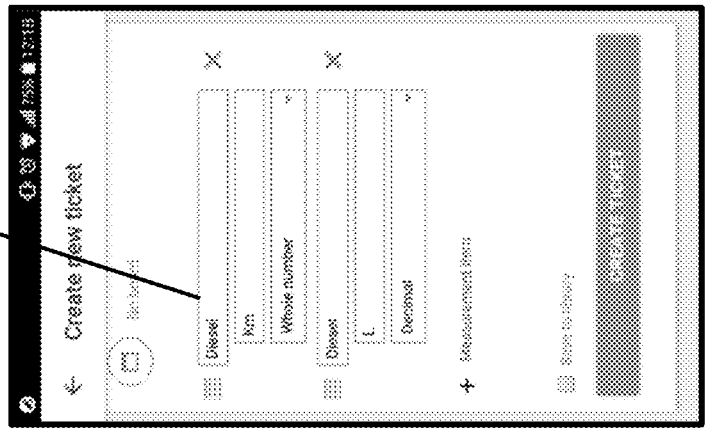
FIG. 13C shows a graphical user interface showing a webpage of a communication application executing on a computing device, according to an embodiment.
Figure 13B:
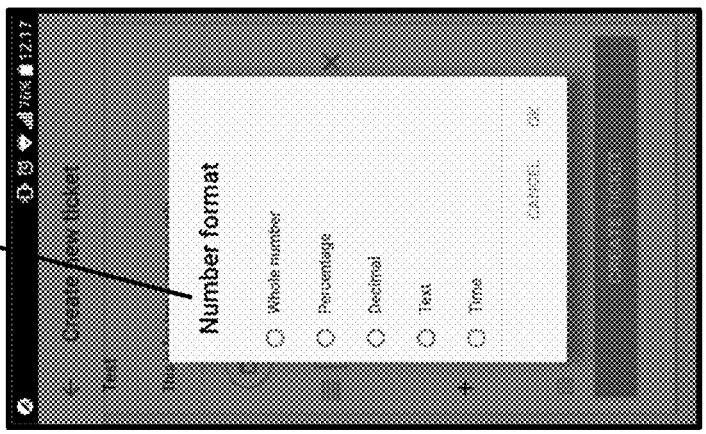
FIG. 13B shows a graphical user interface showing a webpage of a communication application executing on a computing device, according to an embodiment.
Figure 13A:
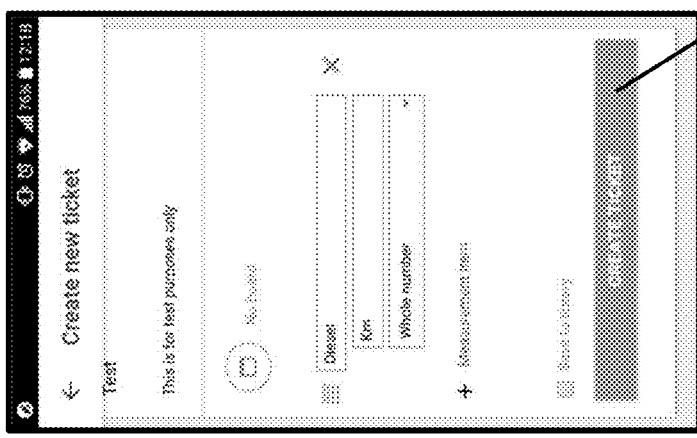
FIG. 13A shows a graphical user interface showing a webpage of a communication application executing on a computing device, according to an embodiment.
Figure 14B:
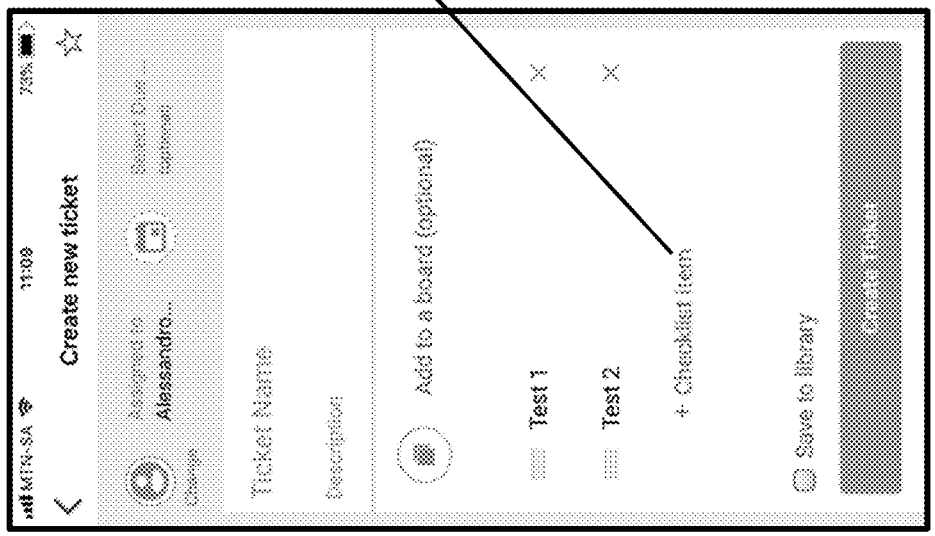
FIG. 14B shows a graphical user interface showing a webpage of a communication application executing on a computing device, according to an embodiment.
Figure 14A:
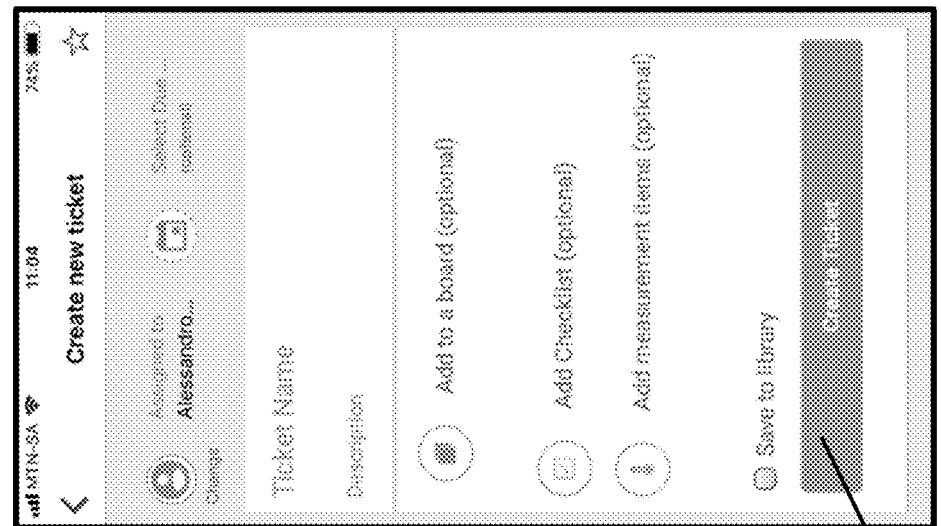
FIG. 14A shows a graphical user interface showing a webpage of a communication application executing on a computing device, according to an embodiment.
Figures 15A, 15B, 15C:
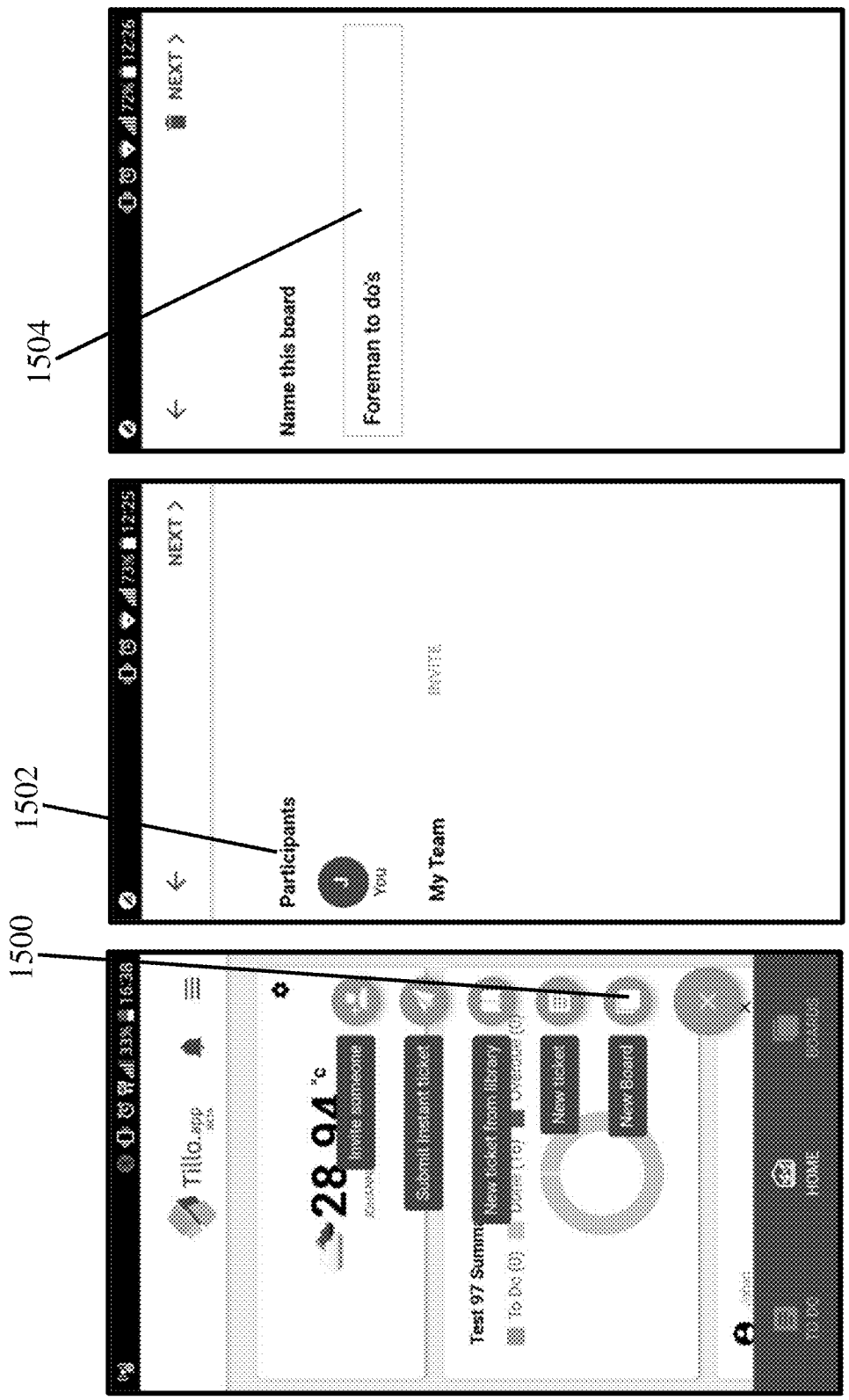
FIG. 15A shows a graphical user interface showing a webpage of a communication application executing on a computing device, according to an embodiment.
FIG. 15B shows a graphical user interface showing a webpage of a communication application executing on a computing device, according to an embodiment.
FIG. 15C shows a graphical user interface showing a webpage of a communication application executing on a computing device, according to an embodiment.

The user may interact with an interactive icon 1100 associated with a field for new ticket, as depicted in the FIG. 11A. The interactive icon 1100 is displayed on the webpage associated with the communication application. The user may then generate new tickets (such as, digital tickets). The new tickets may include information associated with one or more tasks, and instructions associated with the one or more tasks. The one or more tasks maybe assigned to one or more users. A new ticket may be assigned a ticket name 1102, as depicted in the FIG. 11B. The user may store the new ticket in a local database (e.g., a local library) associated with the computing device. The new ticket may be assigned to an assignee name 1104, as depicted in the FIG. 11C. The new ticket may be assigned to a board 1106, as depicted in the FIG. 11D.

After generating the new ticket, the user may generate multiple tasks for multiple users. The user may include information associated with the multiple tasks in the new ticket. The user may assign a date and a time for completion of the multiple tasks. The user may interact with a "time" button 1200 and a "due date" button 1202 to submit the date and the time information associated with the multiple tasks, as depicted in the FIGS. 12A, 12B, and 12C. The "time button" 1200 and the "due date" button 1202 may be displayed on the webpage associated with the communication application. The user may interact with a "repeat" button 1200 to submit information associated with repetition of the multiple tasks, as depicted in the FIGS. 12D and 12E. In one example, the user may configure each ticket to repeat each task at predetermined time intervals. In another example, the user may configure each ticket to repeat daily, weekly, or monthly.

The user may use a "create ticket" button 1300 to create a measurement ticket. The "create ticket" button 1300 is displayed on the webpage associated with the communication application, as depicted in the FIGS. 13A-13C. The measurement ticket may provide a functionality of measuring, counting, and keeping track of numbers within the communication application. The user may create the measurement ticket for a second user by choosing a name from a list of users previously invited into the application. The user may submit a name for the measurement ticket. The user may define a specific required unit of measure. The unit of measure may include centimeter (cm), liter (l), kilometer (km), and hectare (ha). The user may select a number format 1302 for the measurement ticket. The number format 1302 is displayed on the webpage associated with the communication application. Using the number format 1302, the user may specify a format, such as, a whole number, a percentage, or a decimal. The user may set a time for the measurement, for example, a specific date and hour. The user may configure the measurement ticket to repeat at predetermined time intervals. For example, the user may configure the measurement ticket to repeat daily, weekly, or monthly. The new ticket including the measurements 1304 may then be displayed on the dashboard associated with the communication application.

The user may use a "create ticket" button 1400 to create a checklist ticket, which may be a request of an action. The "create ticket" button 1400 is displayed on the webpage associated with the communication application, as depicted in the FIGS. 14A-14B. The user may instantiate the checklist ticket to set tasks and to-do lists for other users or for themselves. The checklist ticket may include identification information of receiver users, a name of the checklist ticket, a date of the checklist ticket creation, and description of checklist items 1402. Once the user creates the checklist tickets the recipient user may receive a notification on their computing device. The recipient user may view the checklist ticket on their computing device.

The user may interact with a "new board" button 1500 from a pop-up menu to create a new board. The "new board" button 1500 is displayed on the webpage associated with the communication application, as depicted in the FIGS. 15A-15C. The new board may include multiple tickets. The new board may include one or more tasks associated with each ticket. The user may have a choice to add participants 1502 to the board. The user may add participants 1502 to the board when required. The user may select a name for the board, and enter the name in a name box 1504.

Figure 16A:
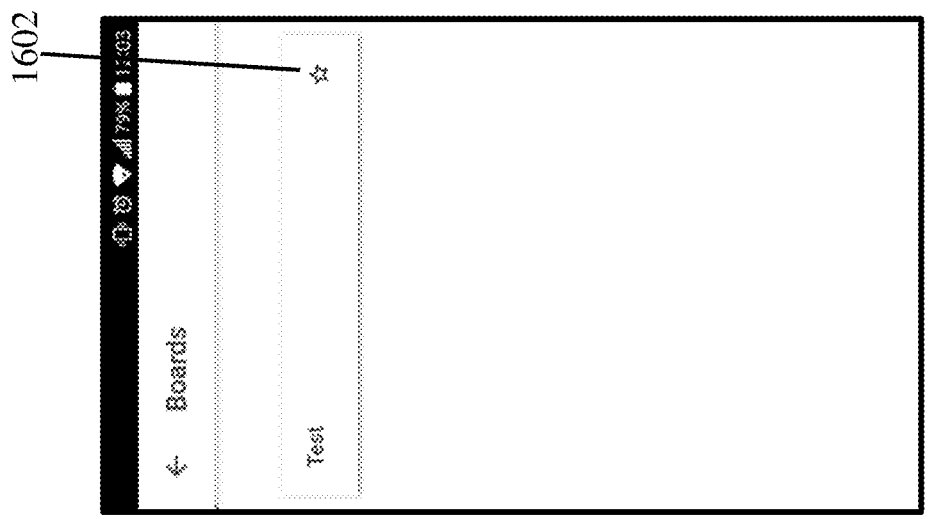
FIG. 16A shows a graphical user interface showing a webpage of a communication application executing on a computing device, according to an embodiment.
Figure 16B:
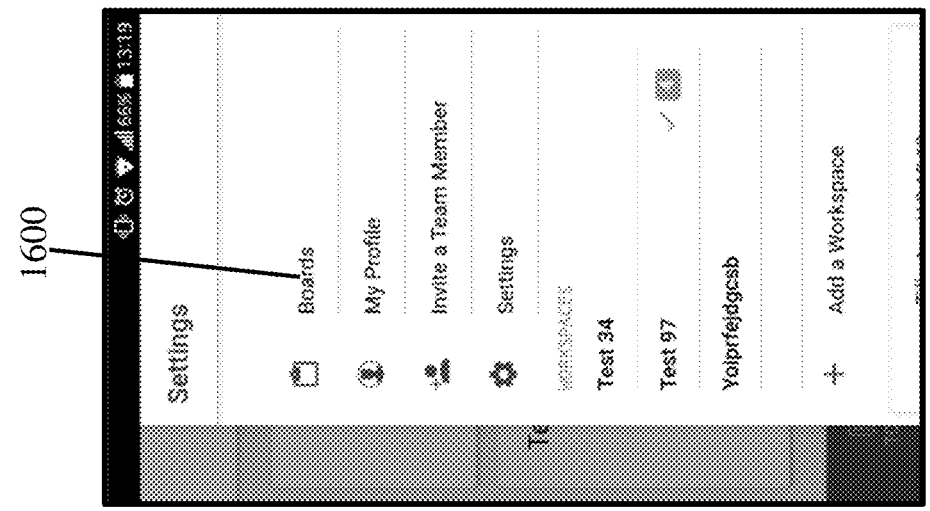
FIG. 16B shows a graphical user interface showing a webpage of a communication application executing on a computing device, according to an embodiment.

The user may be able to view the name of the boards 1600 they are part of, as depicted in the FIGS. 16A-16B. Also, the user may be able to mark the board using the "star" button 1602 that are very important to the user. The marked boards are displayed permanently on a board screen and above the other boards that are created.

Figure 17A:
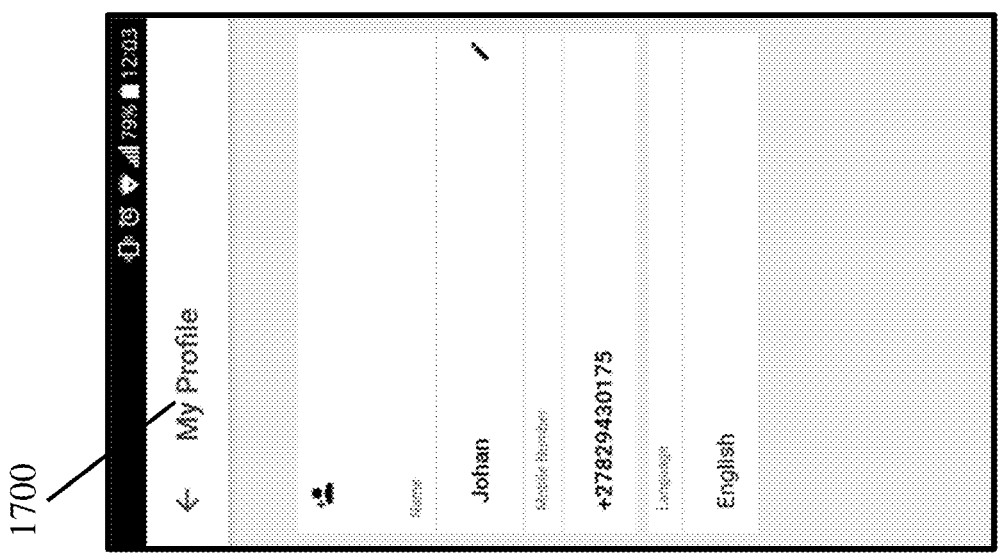
FIG. 17A shows a graphical user interface showing a webpage of a communication application executing on a computing device, according to an embodiment.
Figure 17B:
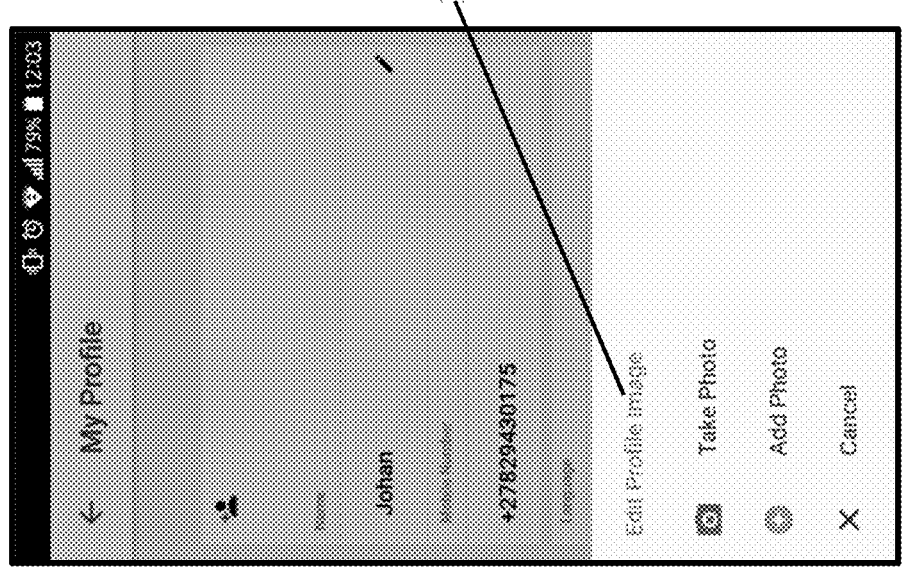
FIG. 17B shows a graphical user interface showing a webpage of a communication application executing on a computing device, according to an embodiment.

The user may interact with a "profile" button 1700 to access their profile information, as depicted in the FIGS. 17A-17B. The "profile" button 1700 is displayed on the webpage associated with the communication application. The profile information may include a name and a phone number. The user may interact with an "edit" button 1702 to edit their profile, such as, the display picture. The user may be able to change the username and the language for the communication application. The "edit" button 1702 is displayed on the webpage associated with the communication application.

Figures 18A, 18B, 18C:
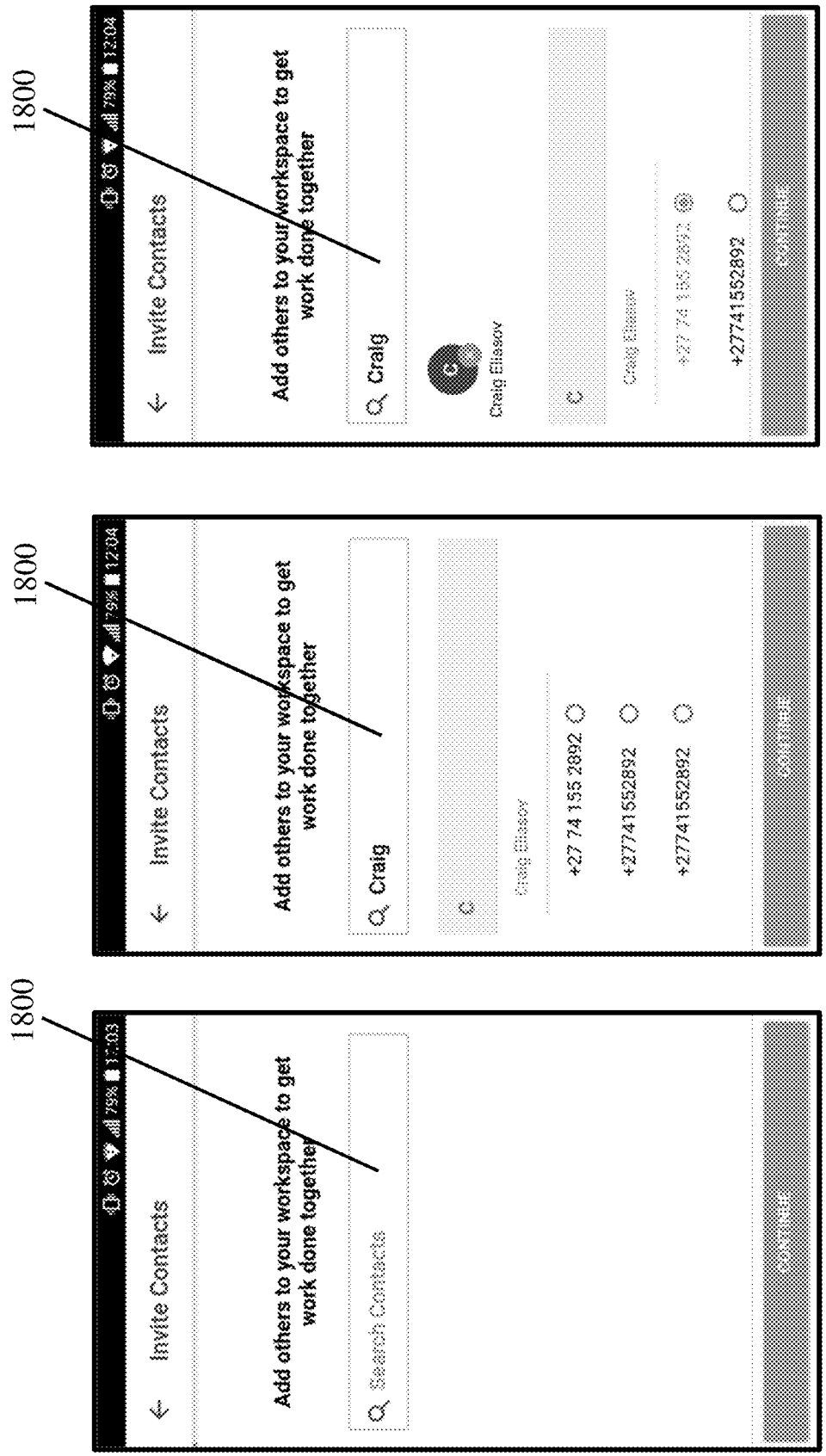
FIG. 18A shows a graphical user interface showing a webpage of a communication application executing on a computing device, according to an embodiment.
FIG. 18B shows a graphical user interface showing a webpage of a communication application executing on a computing device, according to an embodiment.
FIG. 18C shows a graphical user interface showing a webpage of a communication application executing on a computing device, according to an embodiment.
Figures 19A, 19B, 19C, 19D:
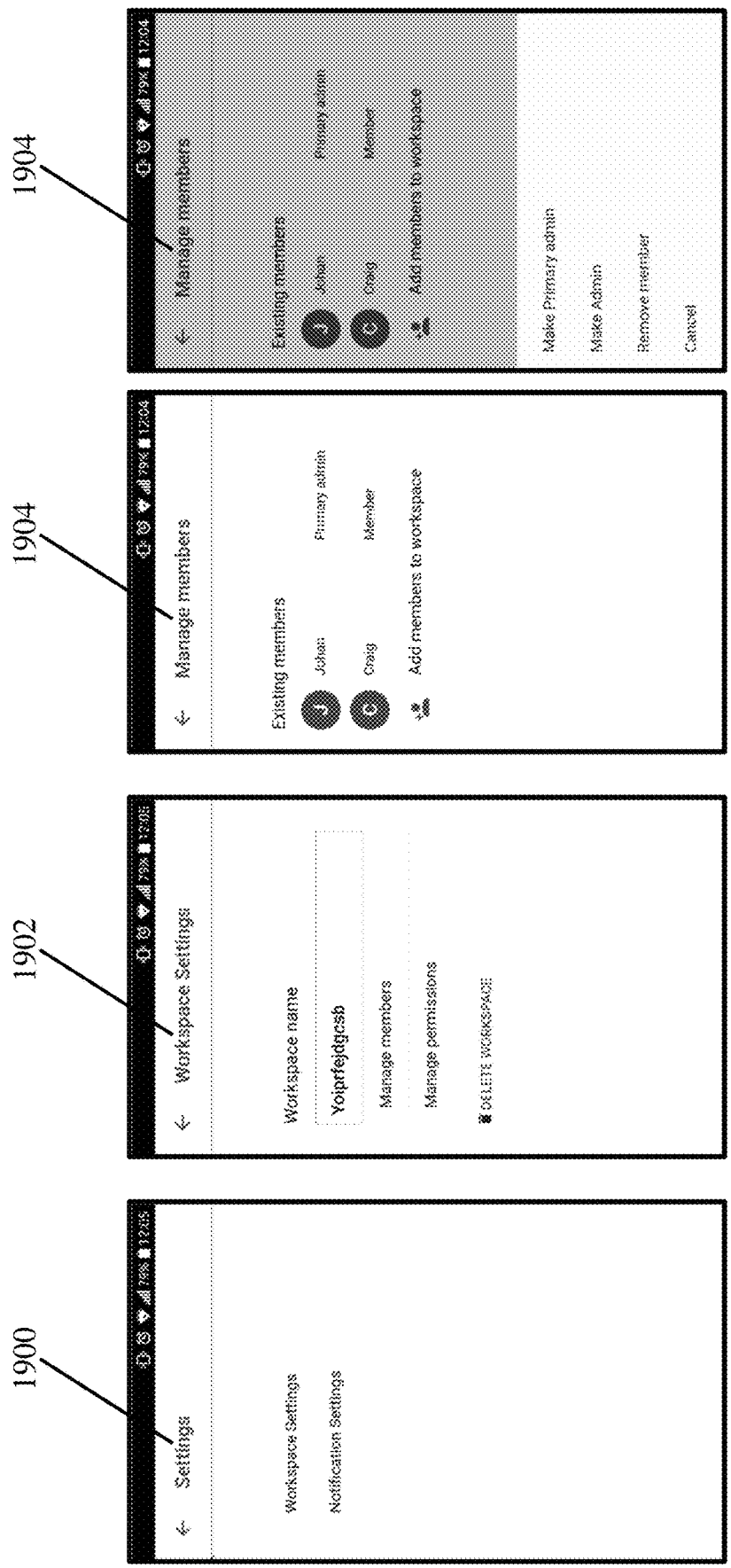
FIG. 19A shows a graphical user interface showing a webpage of a communication application executing on a computing device, according to an embodiment.
FIG. 19B shows a graphical user interface showing a webpage of a communication application executing on a computing device, according to an embodiment.
FIG. 19C shows a graphical user interface showing a webpage of a communication application executing on a computing device, according to an embodiment.
FIG. 19D shows a graphical user interface showing a webpage of a communication application executing on a computing device, according to an embodiment.
Figure 21B:
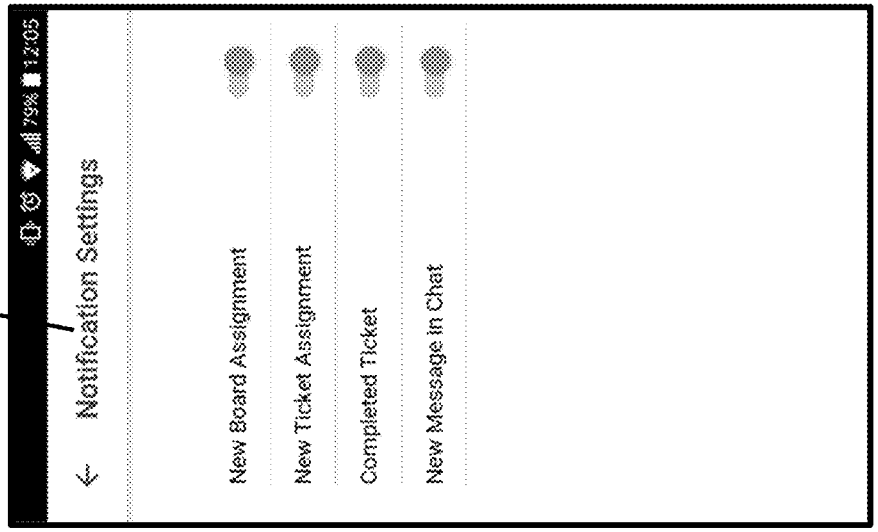
FIG. 21B shows a graphical user interface showing a webpage of a communication application executing on a computing device, according to an embodiment.
Figure 21A:
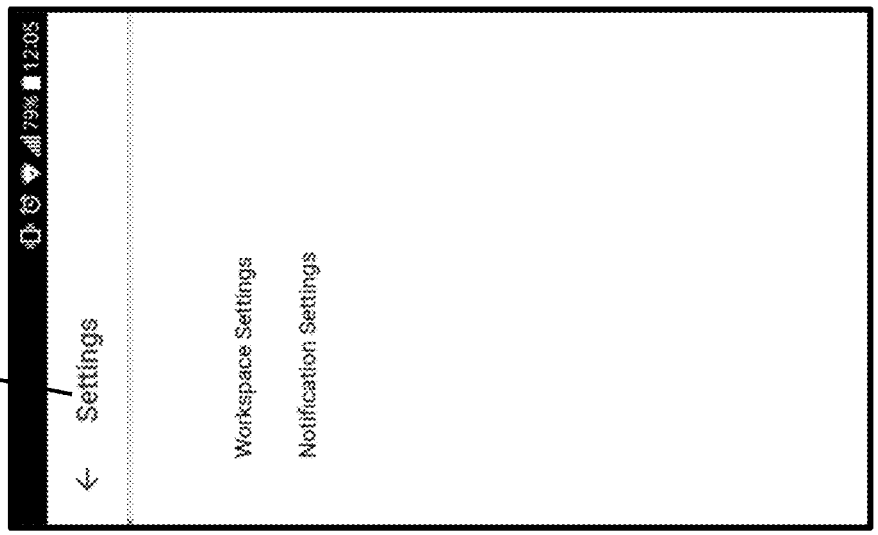
FIG. 21A shows a graphical user interface showing a webpage of a communication application executing on a computing device, according to an embodiment.
Figures 24A, 24B, 24C:
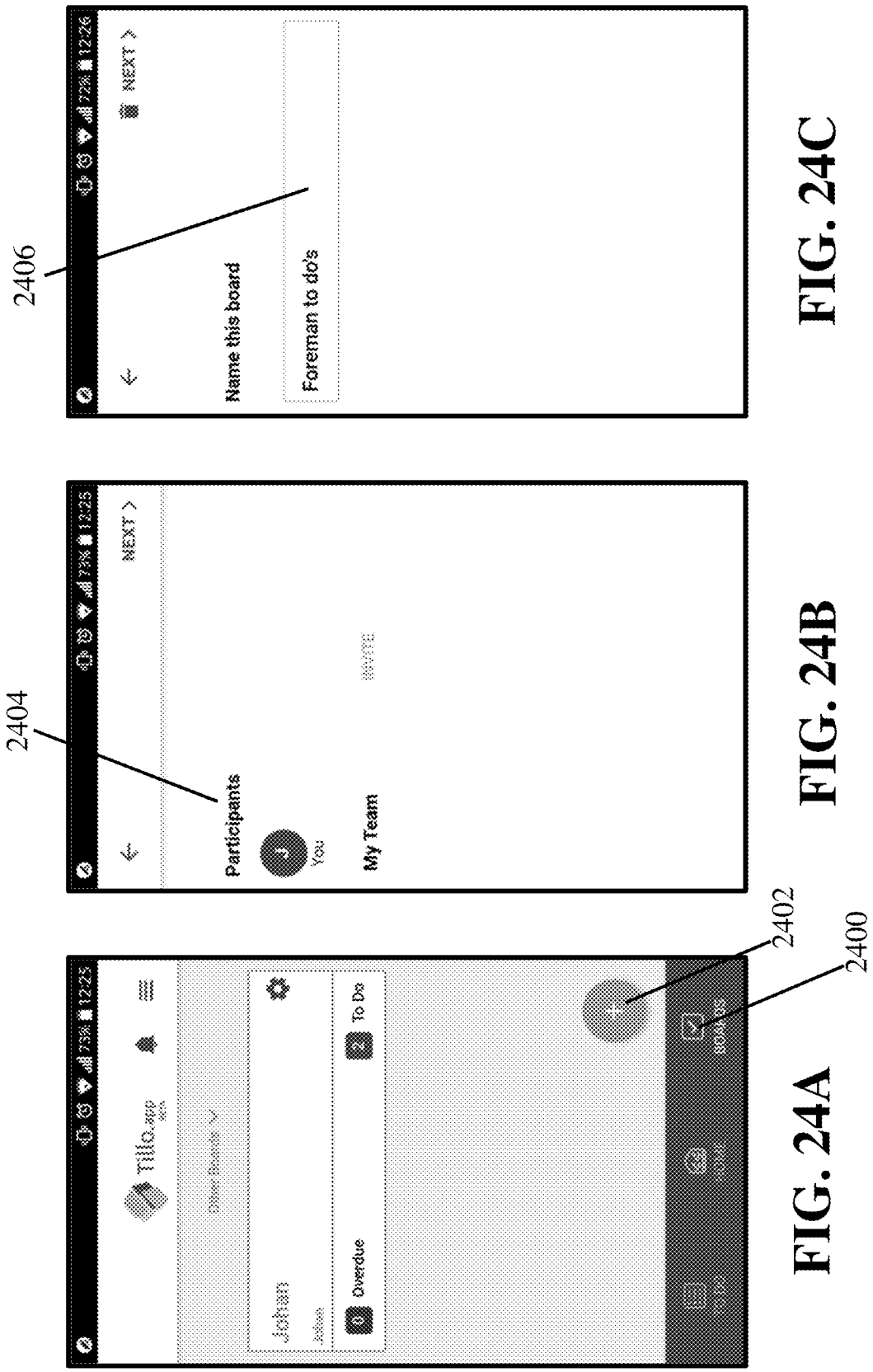
FIG. 24A shows a graphical user interface showing a webpage of a communication application executing on a computing device, according to an embodiment.
FIG. 24B shows a graphical user interface showing a webpage of a communication application executing on a computing device, according to an embodiment.
FIG. 24C shows a graphical user interface showing a webpage of a communication application executing on a computing device, according to an embodiment.
Figure 25C:
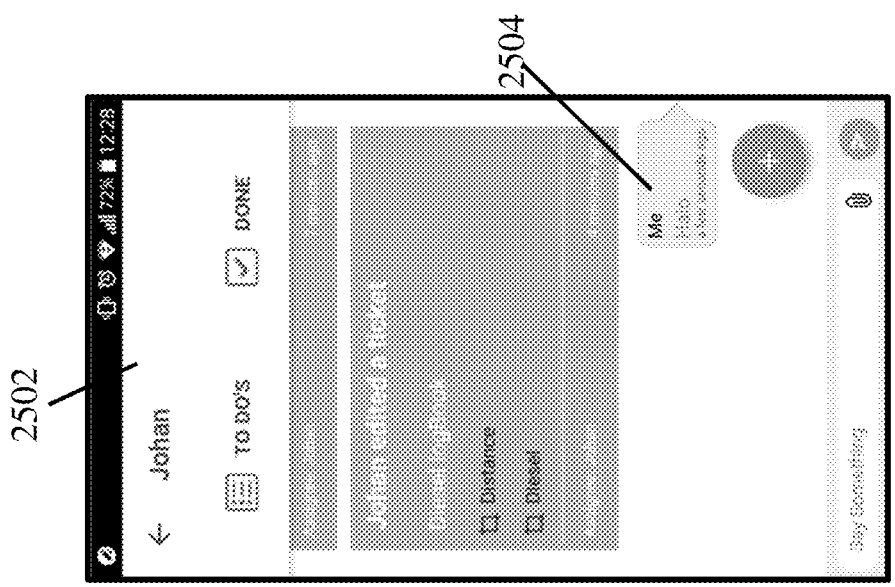
FIG. 25C shows a graphical user interface showing a webpage of a communication application executing on a computing device, according to an embodiment.
Figure 25B:
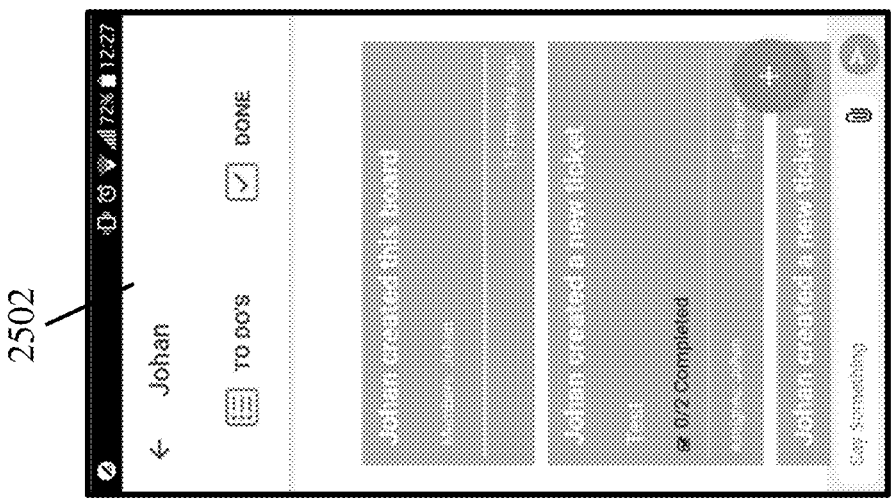
FIG. 25B shows a graphical user interface showing a webpage of a communication application executing on a computing device, according to an embodiment.
Figure 25A:
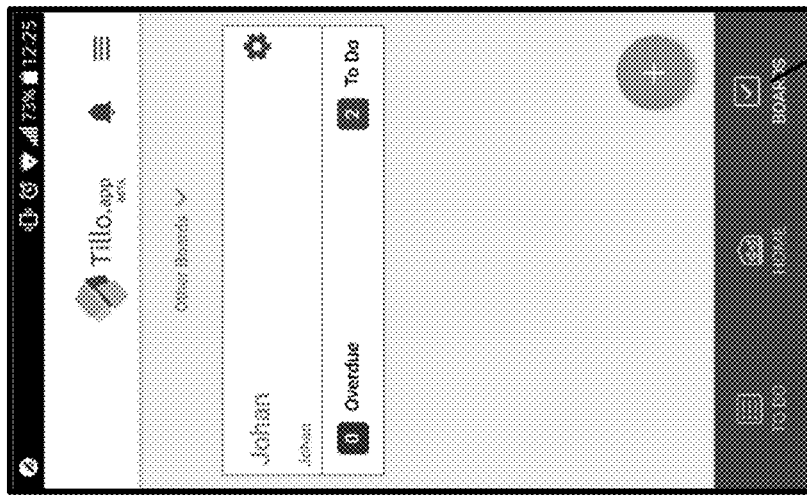
FIG. 25A shows a graphical user interface showing a webpage of a communication application executing on a computing device, according to an embodiment.
Figures 26A, 26B, 26C:
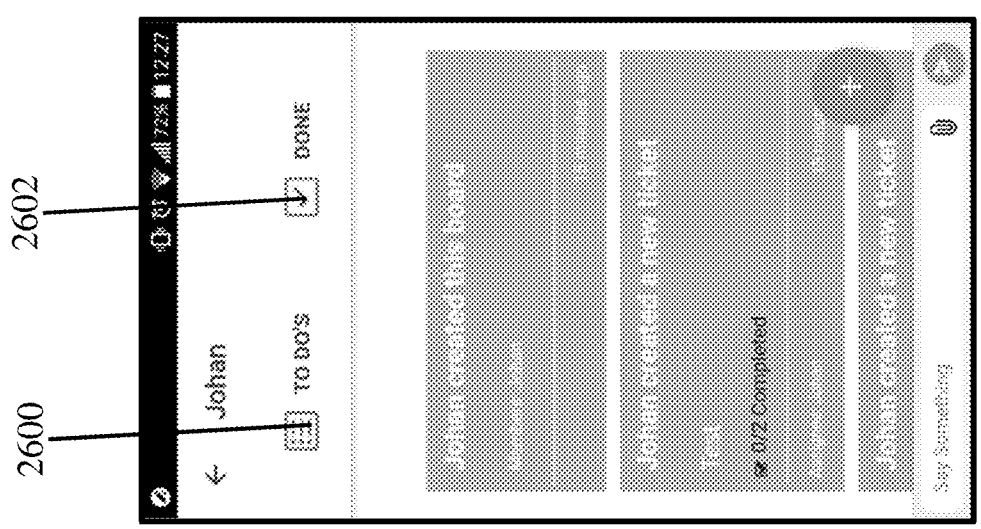
FIG. 26A shows a graphical user interface showing a webpage of a communication application executing on a computing device, according to an embodiment.
FIG. 26B shows a graphical user interface showing a webpage of a communication application executing on a computing device, according to an embodiment.
FIG. 26C shows a graphical user interface showing a webpage of a communication application executing on a computing device, according to an embodiment.
Figures 27A, 27B, 27C, 27D:
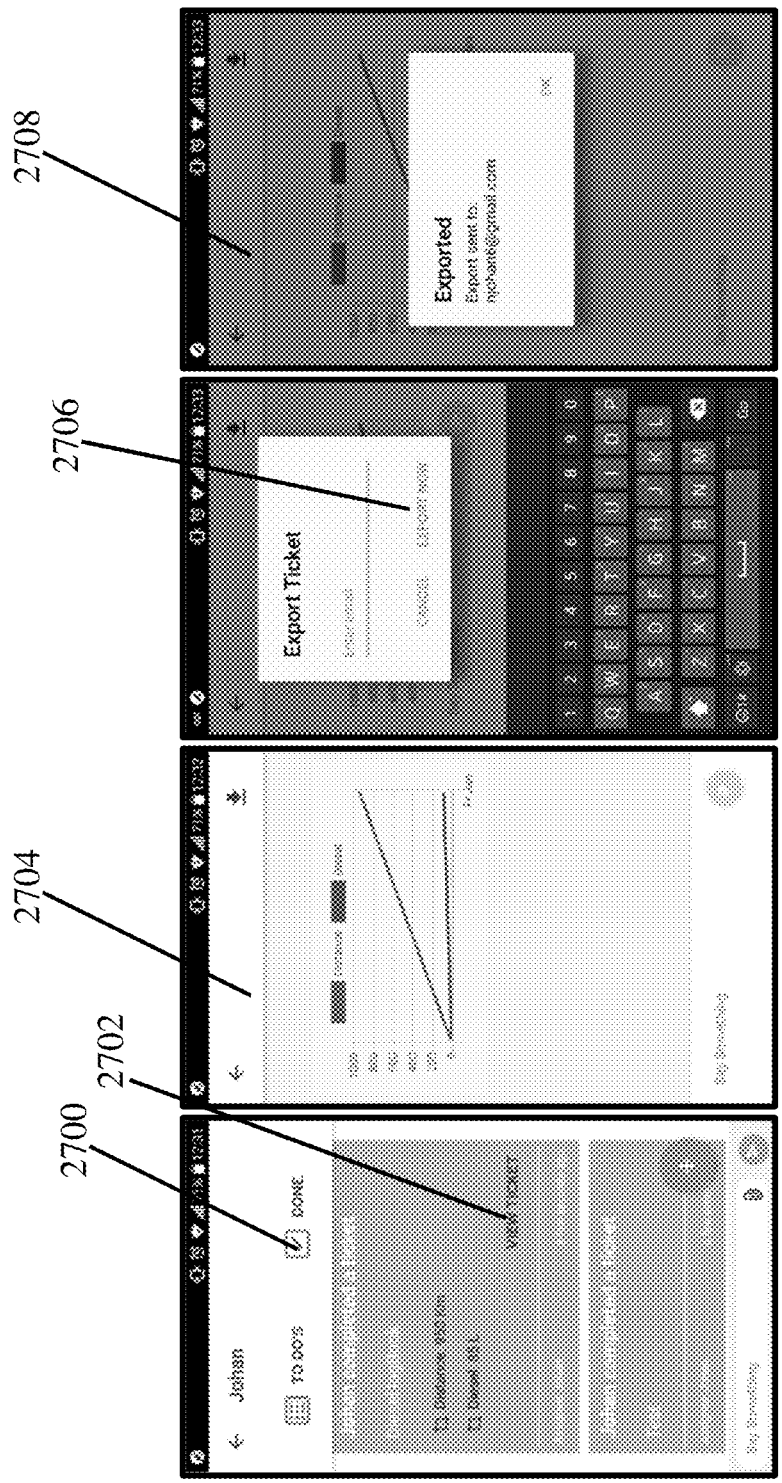
FIG. 27A shows a graphical user interface showing a webpage of a communication application executing on a computing device, according to an embodiment.
FIG. 27B shows a graphical user interface showing a webpage of a communication application executing on a computing device, according to an embodiment.
FIG. 27C shows a graphical user interface showing a webpage of a communication application executing on a computing device, according to an embodiment.
FIG. 27D shows a graphical user interface showing a webpage of a communication application executing on a computing device, according to an embodiment.

The user may be able to add additional users to their account on the communication application, as depicted in the FIGS. 18A-18C. The user may search for the users to be added to their account using a search box 1800. The search box 1800 is displayed on the webpage associated with the communication application.

The user may interact with a "settings" button 1900 to view multiple settings, such as, workspace setting and notification setting. The "settings" button 1900 is displayed on the webpage associated with the communication application, as depicted in the FIGS. 19A-19D. The user may interact with a "workspace setting" button 1902 to assign a name to the workspace, manage members, and manage permission. The "workspace setting" button 1902 is displayed on the webpage associated with the communication application. The user may interact with a "manage members" button 1904 to add members to the workspace, assign members roles, and remove members from the workspace.

The "manage members" button 1904 is displayed on the webpage associated with the communication application.

The user may interact with a "settings" button 2000 to view multiple settings, such as, workspace setting and notification setting. The "settings" button 2000 is displayed on the webpage associated with the communication application, as depicted in the FIGS. 20A-20C. The user may interact with a "workspace setting" button 2002 to assign a name to the workspace, manage members, and manage permissions 2004. The "workspace setting" button 2002 is displayed on the webpage associated with the communication application. The managing of permissions 2004 may include editing the permissions for the users with certain roles within the workspace.

The user may interact with a "settings" button 2100 to view multiple settings, such as, workspace setting and notification setting. The "settings" button 2100 is displayed on the webpage associated with the communication application, as depicted in the FIGS. 21A-21B. The user may interact with a "notification setting" button 2102 to edit the type of notifications the user may receive, and also give the user the ability to turn certain notification setting on or off. The "notification setting" button 2102 is displayed on the webpage associated with the communication application.

The user may interact with an "add workspace" button 2200 to add new workspaces. The "add workspace" button 2200 is displayed on the webpage associated with the communication application, as depicted in the FIGS. 22A-22D. The user may submit the name of the new workspaces in a name box 2202. The name box 2202 is displayed on the webpage associated with the communication application. The user may add new users for each new workspace. The user may search for the new users using a search box 2204. The search box 2204 is displayed on the webpage associated with the communication application.

The user may interact with "to do" button 2300, which may result in displaying all tickets assigned to the user. The "to do" button 2300 is displayed on the webpage associated with the communication application, as depicted in the FIGS. 23A-23D. The user may view information associated with all the tickets on the dashboard 2302 of the computing device. When a particular ticket is displayed on the dashboard 2302, the user may press on a ticket name, and access detailed information associated with the particular ticket. The user may interact with a "manage ticket" button 2304 to manage information associated with any ticket. The "manage ticket" button 2304 is displayed on the webpage associated with the communication application. Upon the interaction with the "manage ticket" button 2304, one or more icons may be displayed on the webpage associated with the communication application. The icons may include an edit ticket icon 2306. The user may select or interact with the edit ticket icon 2306 to edit any information associated with the ticket.

The user may interact with "boards" button 2400, which may result in displaying all boards assigned to the user. The "boards" button 2400 is displayed on the webpage associated with the communication application, as depicted in the FIGS. 24A-24C. The user may interact with "big plus" button 2402 to add new boards, participants 2404 in each new board, and name each board using a name box 2406.

The user may interact with "boards" button 2400, which may result in displaying all boards assigned to the user. The "boards" button 2400 is displayed on the webpage associated with the communication application, as depicted in the FIGS. 25A-25C. A user may select a particular board. All information associated with the particular board may then be displayed on a dashboard 2502. The information may include all tickets placed on the board, the name of users who have completed tasks associated with the tickets, the name of the tasks that have been completed, etc. The information may further include messages 2504 sent by the users to each other.

The user may interact with "to-do" button 2600 and "done" button 2602. The "to-do" button 2600 and the "done" button 2602 may be displayed on the webpage associated with the communication application, as depicted in the FIGS. 26A-26C. When the user interacts with the "to-do" button 2600, all pending tasks are displayed on the dashboard 2604. The tasks are assigned to one or more other users. When the user interacts with the "done" button 2602, all completed tasks are displayed on the dashboard 2606. The tasks are completed by the one or more other users.

When the user completes a task associated with a ticket, a status of the ticked is updated to mention complete. The user interacts with the "done" button 2700 to display the completed ticket on the computing device, as depicted in the FIGS. 27A-27D. The "done" button 2700 may be displayed on the webpage associated with the communication application. The user may further interact a "view ticket" button 2702 to view all the information of the completed task associated with the completed ticket on the dashboard 2704. The "view ticket" button 2702 may be displayed on the webpage associated with the communication application. The user may further interact with an "export now" button 2706 to export the information associated with the completed task. The user may submit the email address to export the information. When the information is exported to the email address, a confirmation message is displayed on the dashboard 2708.

Figure 28:
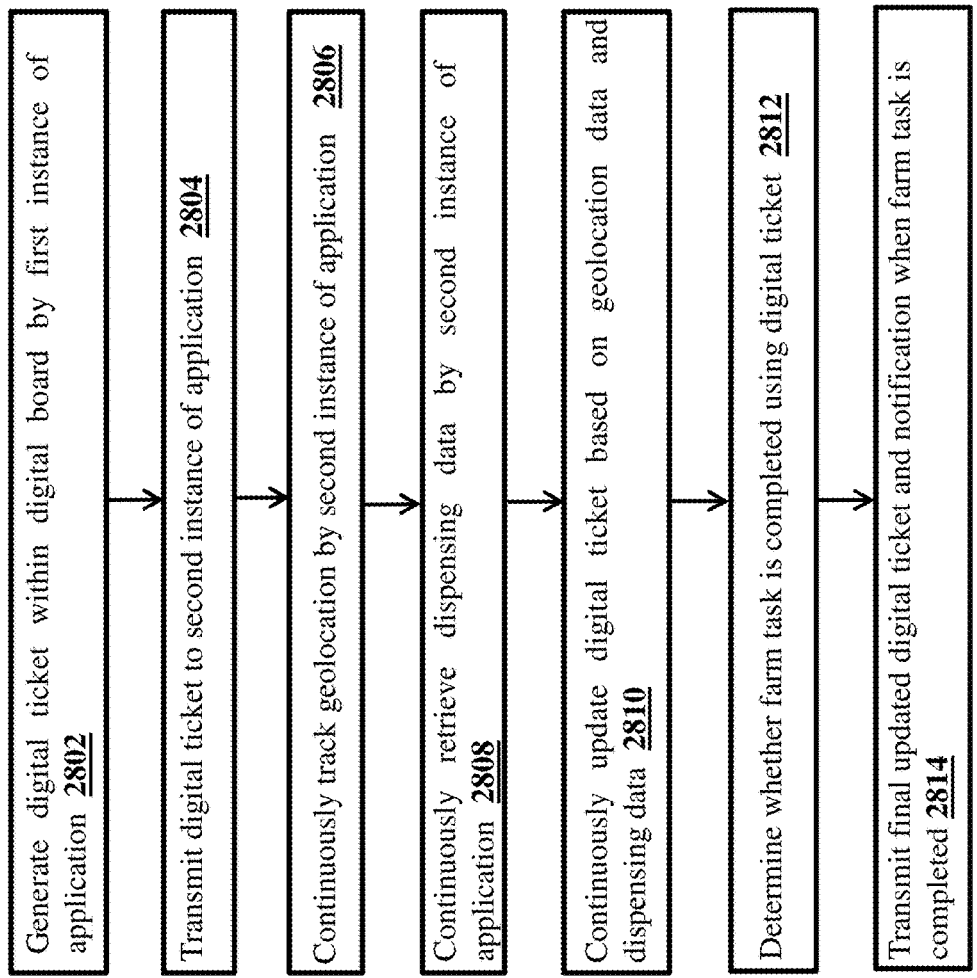
FIG. 28 shows a flowchart for enabling interaction between users executing one or more tasks at one or more locations, according to an embodiment.

FIG. 28 shows execution steps for enabling interaction between users executing one or more tasks at one or more locations, according to a method 2800. The method 2800 shown in FIG. 28 may include execution steps 2802, 2804, 2806, 2808, 2810, 2812, and 2814. However, it should be appreciated that other embodiments may comprise additional or alternative execution steps, or may omit one or more steps altogether. It should also be appreciated that other embodiments may perform certain execution steps in a different order; steps may also be performed simultaneously or near-simultaneously with one another. In addition, the method 2800 of the FIG. 28 is described as being executed by a first computer and a second computer in this embodiment. The first computer and the second computer executing one or more steps may be programmed to execute various other, unrelated essential features.

In a first step 2802, a first computer operated by a first user may generate a digital board. The digital board may be an information sharing platform. The digital board may be associated with a farm project within a workspace associated with a first type of farm operation. The first type of farm operation may be a field fertilizing operation. The farm project may be associated with pouring two specific types of fertilizers in the field. The two specific types of the fertilizers may be a first fertilizer and a second fertilizer.

The first computer may include a first instance of an application. The first instance of the application may be a mobile or a desktop version of the application installed on the first computer. The application may be a communication application for enabling interactions between the users working at one or more locations. The application may be a software program. The users may be farmers working in one or more farms.

The first user of the first computer may submit a first set of instructions to the application on the first computer. The application may process the first set of instructions. The application may then generate the digital board associated with the farm project. The user of the first computer may submit a second set of instructions to the application on the first computer. The application may process the second set of instructions. The application may then generate a digital ticket within the digital board. The digital ticket may be associated with a farm task. The farm task may be associated with the farm project. The farm task may be to pour the two specific types of fertilizers in the farm field at a particular time of the day. For example, the farm task may be to pour the first fertilizer in the field at 2 PM and 5 PM each day, and to pour the second fertilizer in the field at 1 PM and 3 PM each day. The farm task may further include information associated with an amount of the first fertilizer and the second fertilizer to be poured each day in the farm field.

The digital ticket may include a data template. The data template may be configured to receive data records associated with the farm task. The data records may be submitted by the first user of the first computer. The data records may include the name of the fertilizers to be poured into the farm field, the name of the users assigned to pour the fertilizers in the farm field, the quantity of the fertilizers to be poured in the farm field, and the date and time at which the fertilizers have to be poured in the farm field. The first computer may store the information associated with the digital ticket in a local database associated with the first computer. The first computer may further store the digital board, which may include the digital ticket in the local database.

In a next step 2804, the application associated with the first computer may transmit the digital ticket to the application in a second computer. The application in the first computer and the second computer is a same computer application. In one embodiment, the first user of the first computer may generate and execute a third set of instructions, which may result in the application of the first computer transmitting the digital ticket to the application in the second computer over the wireless network. In another embodiment, when the first user generates the digital ticket, the first computer may parse information within the digital ticket. Based on review of the parsed information, the first computer may instruct its application to transmit the digital ticket to the application running on the second computer over the wireless network.

The second computer may be operated by a second user. The second computer may include a second instance of the application. The second instance of the application may be a mobile or a desktop version of the application installed on the second computer. The application may be a software program. The application may be the communication application for enabling interactions between users (the first user and the second user) located at different locations.

In a next step 2806, the application associated with the second computer may receive the digital ticket transmitted by the application in the first computer. The second computer may store the digital ticket in a local database associated with the second computer. The second computer may parse information within the digital ticket. The second computer may then determine all the information associated with the digital ticket. The information may include the name of the fertilizers to be poured into the farm field, the quantity of the fertilizers to be poured in the farm field, the date and time at which the fertilizers have to be poured in the farm field, and the location coordinates of the farm field.

When the application in the second computer receives the digital ticket, the application in the first computer may activate the digital ticket. In some embodiments, when the application in the second computer receives the digital ticket, the second user may execute instructions to activate the digital ticket. When the digital ticket is activated, the application in the second computer may start to continuously track geolocation data of the second computer when the second user moves along with the second computer. A processor of the second computer may store the geolocation data associated with the second computer in the local database. The second computer may compare the geolocation data associated with the second computer with the location coordinates of the farm field present in the digital ticket. Based on the comparison, when the second computer may determine that the second computer is at the location coordinates of the farm field, the application of the second computer may generate a notification. The notification may indicate that the second user operating the second computer is at the location of the farm field. The second computer may store the notification in the local database.

The second computer may include a global positioning system receiver or other similar component for determining the geolocation of the second computer. The global positioning system receiver in the second computer may enable the application, which is location-aware to allow the second user to search for information based on their location, to find their place in a map, or to share their location with other users (such as first user) associated with the application.

The global positioning system receiver may be kept engaged to continuously update the location of the second computer while the second user carry the second computer to various places within the workspace. The continuously engaged global positioning system receiver may allow the application to utilize the real-time location of the second computer. The real-time location of the second computer, which may be the location of the second user, may be continuously tracked and shared, rather than other users (such as the first user) manually checking in the location of the second user intermittently.

In a next step 2808, the application associated with the second computer may continuously retrieve dispensing data through an application programming interface of a farm machinery associated with the farm task. In some embodiments, the farm machinery may continuously transmit the dispensing data to the application in the second computer when any dispensing activity occurs.

The farm machinery may be a machine, which may be used to dispense the first fertilizer and the second fertilizer in the farm field. A same machine may be used to dispense the first fertilizer and the second fertilizer in the farm field. The same machine may have two compartments to store each of the first fertilizer and the second fertilizer, which may dispended in the farm field. In some cases, two separate machines may be used to dispense the first fertilizer and the second fertilizer in the farm field. A first machine may be used to dispense the first fertilizer in the farm field. A second machine may be used to dispense the second fertilizer in the farm field.

The machine may be an electronic dispenser. The electronic dispenser may include a dispensing application. The dispensing application may be a software program. The dispensing application may be linked to the application on the second computer. The dispensing application may be linked to the application on the first computer. The linking between the dispensing application and the application on the second computer may result in sharing of data between both the dispensing application and the application on the first computer. The linking between the dispensing application and the application on the first computer may result in sharing of data between both the dispensing application and the application on the first computer. The data may include a name of the fertilizer being dispensed out of the electronic dispenser. The data may include an amount of fertilizer being dispensed out of the electronic dispenser. The data may further include a timestamp at which the fertilizer was dispensed out of the electronic dispenser.

The data may further include location information at which the fertilizer was dispensed out of the electronic dispenser. In some embodiments, the machine may be a diesel pump and the application in the second computer may retrieve the diesel dispensing data from the diesel pump.

In a next step 2810, the application associated with the second computer may receive the dispensing data from the dispensing application associated with the farm machinery. The second computer may store the dispensing data from in the local database. The application associated with the second computer may process information associated with the dispensing data and the geolocation data. The application associated with the second computer may update the digital ticket based on the processing of the information associated with the dispensing data and the geolocation data. For example, the application associated with the second computer may update the digital ticket to include information associated with the farm task. The information may include a date and a time at which the second computer operated by the second user was present at the location of the field, which is associated with the farm task. The information may further include the amount of fertilizers dispensed at the field by the second user. The server computer may store updated digital ticket in the local database.

In a next step 2812, the application associated with the second computer may determine a status of the farm task associated with the digital ticket based upon the continuous updates to the digital ticket. The application associated with the second computer may retrieve the updated digital ticket from the database. The application associated with the second computer may parse data associated with the updated digital ticket. The application associated with the second computer may compare the parsed data with the information associated with the farm task.

When the application associated with the second computer may determine that the second user has completed the farm task based on the results of the comparison operation, in a next step 2814, the application associated with the second computer may generate a final updated digital ticket. The final updated digital ticket may include a message that the farm task is completed by the second user. The message may include information associated with the completed farm task. The application associated with the second computer may further generate a notification for the first user that the farm task is finished. The application associated with the second computer may transmit the notification and the final updated digital ticket to the application associated with the first computer. The application associated with the second computer may transmit the notification to a phone number associated with the first computer. The application associated with the second computer may transmit the notification to an electronic mail associated with the first user. The first user may review the notification, which is displayed on the display screen of the first computing device. The first user may generate and execute instructions on the first computing device to close the digital ticket on verifying that the farm task is completed by the second user.

The updates to the digital ticket may be used for electronic recordkeeping. For example, in the embodiments where the farm machinery is a diesel pump, a computer (e.g., the first computer, the second computer, or the server) may generating a digital log of diesel consumption. An illustrative digital log for diesel consumption is shown in FIG. 7B.

An illustrative mobile application may further provide a map view mode. A user may select a map view mode at a navigation menu at the bottom of an interface of the mobile application. Based upon such selection, the mobile application may display the captured data for a workspace and the geolocations of members associated with the workspace on a map. The mobile application may dynamically update the map as new data is captured at various locations by the members.

The mobile application may further enable electronic transactions. For example, the mobile application may generate transmit a stock-take digital ticket associated with a stock re-order to a predefined set of suppliers. As another example, the mobile application may generate a get-a-quote digital ticket. The user may send the get-a-quote digital ticket for a purchase as a part of a transaction within the mobile application. To complete the transaction within the mobile application, the mobile application may update the get-a-quote digital ticket with the corresponding invoice and payment.

The mobile application may also provide a workflow management platform. A back-end system associated with the mobile application may structure recorded data according to a workflow defined by the user, where the different tickets combine together to form the workflow. The mobile application may access the data according to different steps of the workflow and may generate different digital tickets within the workflow.

Although certain non-limiting embodiments have been presented, various changes, substitutions, permutations, and alterations may be made without departing from the scope of the appended claims. Further, the steps of the methods described herein may be carried out in any suitable order, or simultaneously where appropriate. Thus, the scope of the disclosure should not necessarily be limited by this description.

Unless specifically stated otherwise as apparent from the following discussion, it is appreciated that throughout the description, discussions utilizing terms such as "processing," "computing," "transmitting," "receiving," "determining," "displaying," "identifying," "presenting," "establishing," or the like, may refer to the action and processes of a data processing system, or similar electronic device that manipulates and transforms data represented as physical (electronic) quantities within the system's registers and memories into other data similarly represented as physical quantities within the system's memories or registers or other such information storage, transmission or display devices. The system or portions thereof may be installed on an electronic device.

The embodiments may relate to an apparatus for performing one or more of the functions described herein. This apparatus may be specially constructed for the required purposes, or it may comprise a special purpose computer selectively activated or reconfigured by a computer program stored in the computer. Such a computer program may be stored in a machine (e.g., computer) readable storage medium, such as, but is not limited to, any type of disk including floppy disks, optical disks, CD-ROMs and magnetic-optical disks, read only memories (ROMs), random access memories (RAMs) erasable programmable ROMs (EPROMs), electrically erasable programmable ROMs (EEPROMs), magnetic or optical cards, or any type of media suitable for storing electronic instructions for operations on a processor, and each coupled to a bus.

The embodiments described herein are described as software executed on at least one server, though it is understood that embodiments may be configured in other ways and retain functionality. The embodiments may be implemented on known devices such as a personal computer, a special purpose computer, cellular telephone, personal digital assistant ("PDA"), a digital camera, a digital tablet, an electronic gaming system, a programmed microprocessor or microcontroller and peripheral integrated circuit element(s), and ASIC or other integrated circuit, a digital signal processor, a hard-wired electronic or logic circuit such as a discrete element circuit, a programmable logic device. In general, any device capable of implementing the processes described herein may be used to implement the systems and techniques according to this disclosure.

The embodiments may relate to an apparatus for performing one or more of the functions described herein. This apparatus may be specially constructed for the required purposes or be selectively activated or reconfigured by computer executable instructions stored in non-transitory computer memory medium or non-transitory computer-readable storage medium.

It is to be appreciated that the various components of the technology may be located at distant portions of a distributed network or the Internet, or within a dedicated secured, unsecured, addressed/encoded or encrypted system. Thus, it should be appreciated that the components of the system may be combined into one or more devices or co-located on a particular node of a distributed network, such as a telecommunications network. As will be appreciated from the description, and for reasons of computational efficiency, the components of the system may be arranged at any location within a distributed network without affecting the operation of the system. Moreover, the components could be embedded in a dedicated machine.

Furthermore, it should be appreciated that the various links connecting the elements may be wired or wireless links, or any combination thereof, or any other known or later developed element(s) that is capable of supplying or communicating data to and from the connected elements. The term "module" as used herein may refer to any known or later developed hardware, software, firmware, or combination thereof that is capable of performing the functionality associated with that element.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the subject matter (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context. The use of all examples, or language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Presently preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation may be combined with one or more features of any other implementation.

What is claimed is:

1. A computer-implemented method comprising:
generating, by a first instance of an application in a first mobile computing device, a digital board associated with a project within a workspace associated with a first type of operation;
generating, by the first instance of the application in the first mobile computing device, a dynamic digital ticket within the digital board, the dynamic digital ticket configured for a task associated with the project, and the dynamic digital ticket including a data template configured to receive data records associated with the task;
transmitting using a messaging protocol, by the first instance of the application in the first mobile computing device, the dynamic digital ticket to a second instance of the application in a second mobile computing device;
receiving using the messaging protocol, by the second instance of the application in the second mobile computing device, the dynamic digital ticket transmitted by the first instance of the application in the first mobile computing device;
in response to the second instance of the application in the second mobile computing device receiving an indication to activate the dynamic digital ticket, (a) continuously tracking, by the second instance of the application in the second mobile computing device, geolocation of the second mobile computing device, (b) continuously retrieving, by the second instance of the application in the second mobile computing device, dispensing data through an application programming interface of machinery associated with the task, and (c) continuously updating, by the second instance of the application in the second mobile computing device, the dynamic digital ticket based on the continuously tracked geolocation and continuously retrieved dispensing data;
using the messaging protocol, sharing in real-time the continuously tracked geolocation and continuously retrieved dispensing data by the second instance of the application in the second mobile computing device with the first instance of the application in the first mobile computing device thereby dynamically updating the dynamic digital ticket on both the first mobile computing device and the second mobile computing device;
determining, by the second instance of the application in the second mobile computing device, whether the task is completed based upon continuous updates to the dynamic digital ticket; and
using the messaging protocol, transmitting, by the second instance of the application in the second mobile computing device to the first instance of the application in the first mobile computing device, a final updated dynamic digital ticket and a notification that the task is completed.

2. The computer-implemented method of claim 1, further comprising displaying, by the first mobile computing device, the final updated dynamic digital ticket on an interactive graphical user interface of the first mobile computing device.

3. The computer-implemented method of claim 2, further comprising parsing, by the first mobile computing device, information associated with the final updated dynamic digital ticket displayed on the interactive graphical user interface to analyze parsed information and verify that the task is competed.

4. The computer-implemented method of claim 3, further comprising executing, by the first mobile computing device, one or more instructions to close final updated dynamic digital ticket.

5. The computer-implemented method of claim 1, further comprising transmitting, by the first mobile computing device, the notification to a telephone number of the first mobile computing device.

6. The computer-implemented method of claim 5, further comprising executing, by the first mobile computing device, one or more instructions to close the final updated dynamic digital ticket when the a request to close the final updated dynamic digital ticket is generated by way of the first instance of the application.

7. The computer-implemented method of claim 1, wherein the machinery may comprise one or more machines to execute the task.

8. The computer-implemented method of claim 7, wherein each machine comprises a dispensing application, and wherein the dispensing application is a mobile computing device software program.

9. The computer-implemented method of claim 8, wherein the dispensing application is linked to the application of the first mobile computing device and the second mobile computing device.

10. A system comprising:
a first mobile computing device having a first instance of an application, wherein the first instance of the application in the first mobile computing device is configured to: (a) generate a digital board associated with a project within a workspace associated with a first type of operation; (b) generate a dynamic digital ticket within the digital board, the dynamic digital ticket configured for a task associated with the project, and the dynamic digital ticket including a data template configured to receive data records associated with the task; and (c) using a messaging protocol, transmit the dynamic digital ticket to a second instance of the application in a second mobile computing device, a second mobile computing device having a second instance of the application, wherein the second instance of the application in the second mobile computing device is configured to: (a) using the messaging protocol, receive the dynamic digital ticket transmitted by the first instance of the application in the first mobile computing device; and (b) in response to the second instance of the application in the second mobile computing device receiving an indication to activate the dynamic digital ticket, (i) continuously track geolocation of the second mobile computing device, (ii) continuously retrieve dispensing data through an application programming interface of a machinery associated with the task, (iii) continuously update the dynamic digital ticket based on the continuously tracked geolocation and continuously retrieved dispensing data, (iv) using the messaging protocol, share in real-time the continuously tracked geolocation and continuously retrieved dispensing data by the second instance of the application in the second mobile computing device with the first instance of the application in the first mobile computing device to thereby dynamically update the dynamic digital ticket on both the first mobile computing device and the second mobile computing device, and (v) determine that the task is complete based upon continuous updates to the dynamic digital ticket; and (c) using the messaging protocol, transmit to the first instance of the application in the first mobile computing device, a final updated dynamic digital ticket and a notification that the task is complete.

11. The system of claim 10, wherein the first mobile computing device is further configured to display the final updated dynamic digital ticket on an interactive graphical user interface of the first mobile computing device.

12. The system of claim 11, wherein the first mobile computing device is further configured to parse information associated with the final updated dynamic digital ticket displayed on the interactive graphical user interface to analyze parsed information and verify that the task is completed.

13. The system of claim 12, wherein the first mobile computing device is further configured to execute one or more instructions to close final updated dynamic digital ticket.

14. The system of claim 10, wherein the first mobile computing device is further configured to transmit the notification to a telephone number of the first mobile computing device.

15. The system of claim 14, wherein the first mobile computing device is further configured to execute one or more instructions to close the final updated dynamic digital ticket when the first user requests to close the final updated dynamic digital ticket.

16. The system of claim 10, wherein the machinery may comprise one or more machines to execute the task.

17. The system of claim 16, wherein each machine comprises a dispensing application, and wherein the dispensing application is a mobile computing device software program.

18. The system of claim 17, wherein the dispensing application is linked to the application of the first mobile computing device and the second mobile computing device.

19. A non-transitory computer readable storage medium having an application comprising computer readable instructions that when executed by first and second mobile computing devices cause the first and second mobile devices to effect:

generating, by a first instance of the application in the first mobile computing device, a digital board associated with a project within a workspace associated with a first type of operation;

generating, by the first instance of the application in the first mobile computing device, a dynamic digital ticket within the digital board, the dynamic digital ticket configured for a task associated with the project, and the dynamic digital ticket including a data template configured to receive data records associated with the task;

transmitting using a messaging protocol, by the first instance of the application in the first mobile computing device, the dynamic digital ticket to a second instance of the application in the second mobile computing device;

receiving using the messaging protocol, by the second instance of the application in the second mobile computing device, the dynamic digital ticket transmitted by the first instance of the application in the first mobile computing device;

in response to the second instance of the application in the second mobile computing device receiving an indication to activate the dynamic digital ticket, (a) continuously tracking, by the second instance of the application in the second mobile computing device, geolocation of the second mobile computing device, (b) continuously retrieving, by the second instance of the application in the second mobile computing device, dispensing data through an application programming interface of machinery associated with the task, and (c) continuously updating, by the second instance of the application in the second mobile computing device, the dynamic digital ticket based on the continuously tracked geolocation and continuously retrieved dispensing data;

using the messaging protocol, sharing in real-time the continuously tracked geolocation and continuously retrieved dispensing data by the second instance of the application in the second mobile computing device with the first instance of the application in the first mobile computing device thereby dynamically updating the dynamic digital ticket on both the first mobile computing device and the second mobile computing device;

determining, by the second instance of the application in the second mobile computing device, whether the task is completed based upon continuous updates to the dynamic digital ticket; and using the messaging protocol, transmitting, by the second instance of the application in the second mobile computing device to the first instance of the application in the first mobile computing device, a final updated dynamic digital ticket and a notification that the task is completed.

* * * * *